(12) United States Patent
Zhang et al.

(10) Patent No.: US 12,010,707 B2
(45) Date of Patent: Jun. 11, 2024

(54) METHODS AND APPARATUSES FOR TRANSMITTING AND RECEIVING CONTROL SIGNALING, AND METHOD FOR DETERMINING INFORMATION

(71) Applicant: ZTE CORPORATION, Guangdong (CN)

(72) Inventors: Shujuan Zhang, Shenzhen (CN); Yu Ngok Li, Shenzhen (CN); Bo Gao, Shenzhen (CN); Chuangxin Jiang, Shenzhen (CN); Nan Zhang, Shenzhen (CN); Hao Wu, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/147,039

(22) Filed: Dec. 28, 2022

(65) Prior Publication Data

US 2023/0199790 A1 Jun. 22, 2023

Related U.S. Application Data

(63) Continuation of application No. 17/002,474, filed on Aug. 25, 2020, now Pat. No. 11,564,218, which is a (Continued)

(30) Foreign Application Priority Data

Feb. 26, 2018 (CN) .......................... 201810160248.2

(51) Int. Cl.
*H04W 72/23* (2023.01)
*H04L 5/00* (2006.01)
(Continued)

(52) U.S. Cl.
CPC ............ *H04W 72/23* (2023.01); *H04L 5/0048* (2013.01); *H04W 72/20* (2023.01); *H04W 72/56* (2023.01)

(58) Field of Classification Search
CPC ..... H04W 72/23; H04W 72/20; H04W 72/56; H04L 5/0023; H04L 5/0048
(Continued)

(56) References Cited

U.S. PATENT DOCUMENTS

2017/0201968 A1   7/2017   Nam et al.
2018/0302842 A1  10/2018   Sugirtharaj et al.
(Continued)

FOREIGN PATENT DOCUMENTS

CN   106559879 A   4/2017
CN   107342852 A  11/2017
(Continued)

OTHER PUBLICATIONS

Extended European Search Report for EP Appl. No. 19757789.3 dated Mar. 4, 2021 (12 pages).
(Continued)

*Primary Examiner* — Rownak Islam
(74) *Attorney, Agent, or Firm* — Foley & Lardner LLP

(57) ABSTRACT

Provided are methods and apparatuses for transmitting and receiving control signaling and for determining information. The method include determining second information according to first information, where the second information includes at least one of the following: the number N of bits used in first control signaling to notify a first transmission parameter, a correspondence mapping table between an index value referenced by the first transmission parameter in the first control signaling and the value of the first transmission parameter, the type of the first transmission parameter notified by a predetermined indication field in the first (Continued)

control signaling, or position information of the bits used in the first control signaling to notify the first transmission parameter; and where the first information includes a relationship between a transmission time interval between the first control signaling and a first signal and a predetermined threshold K, where N and K are non-negative integers; and transmitting the first control signaling.

17 Claims, 16 Drawing Sheets

Related U.S. Application Data continuation of application No. PCT/CN2019/076207, filed on Feb. 26, 2019.

(51) Int. Cl.
*H04W 72/20* (2023.01)
*H04W 72/56* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2019/0260445 | A1* | 8/2019 | John | H04L 5/0007 |
| 2020/0267710 | A1 | 8/2020 | Zhang et al. | |
| 2020/0288479 | A1 | 9/2020 | Xi et al. | |
| 2020/0359407 | A1 | 11/2020 | Takeda et al. | |
| 2020/0374060 | A1 | 11/2020 | Wang et al. | |
| 2020/0383096 | A1* | 12/2020 | Yang | H04W 72/20 |
| 2020/0404690 | A1 | 12/2020 | Lee et al. | |
| 2021/0126677 | A1 | 4/2021 | Park et al. | |

FOREIGN PATENT DOCUMENTS

| | | | | |
|---|---|---|---|---|
| CN | 107733611 A | 2/2018 | | |
| CN | 108199819 A | 6/2018 | | |
| WO | WO-2016114868 A1 * | 7/2016 | ........... | H04B 7/0626 |
| WO | WO-2019/130571 A1 | 7/2019 | | |

OTHER PUBLICATIONS

Intel Corporation: "On beam management issues for multi-CC operation" 3GPP TSG RAN WG1 Meeting #92; R1-1802393; Mar. 2, 2018; Athens, Greece (7 pages).
International Search Report for PCT Appl. No. PCT/CN2019/076207 dated Apr. 29, 2019 (with English translation, 5 pages).
Mediatek Inc.: "Offline Summary for Remaing issues on Beam Failure Recovery" 3GPP TSG RAN WG1 Meeting #AH1801; R1-1801197; Jan. 26, 2018; Vancouver, California (10 pages).
Non-Final Office Action on U.S. Appl. No. 17/002,474 dated Mar. 11, 2022.
Notice of Allowance on U.S. Appl. No. 17/002,474 dated Sep. 29, 2022.
Session Chair (Samsung): "RAN1 session notes for agenda item 7.2 (MIMO)" 3GPP TSG RAN WG1 Meeting AH 1801; R1-1801130; Jan. 26, 2018 (32 pages).
Zte et al. "Details and Evaluation Results on Beam Indication" 3GPP TSG RAN WGJ Meeting #91, RI-1719538, Nov. 18, 2017 (Nov. 18, 2017 Reno, USA (pp. 1-11).
Ericsson, "Remaining details on beam management", 3GPP TSG RAN WG1 Meeting #92, R1-1802743, Mar. 2, 2018, Athens, Greece (12 pages).
First Office Action for JP Appl. No. 2020-544797, dated Mar. 7, 2023 (with English translation, 15 pages).
Zte et al., "Remaining details on beam management", 3GPP TSG RAN WG1 Meeting #92, R1-1801581, Mar. 2, 2018, Athens, Greece (6 pages).
Ericsson, "Corrections related to Qcl", 3GPP TSG RAN WG1 Meeting AH 1801, R1-1800710, Jan. 26, 2018, Vancouver, Canada (2 pages).
Huawei et al., "On NR carrier aggregation", 3GPP TSG RAN WG1 NR Ad-Hoc Meeting, R1-1709975, Jun. 30, 2017, Qingdao, China (6 pages).
Mediatek Inc., "Remaining issues on TRS", 3GPP TSG-RAN WG1 Meeting #92, R1-1801670, Mar. 2, 2018, Athens, Greece (7 pages).
Nokia et al., "On cross-carrier scheduling and joint UCI design", 3GPP TSG RAN WG1 NR#2, R1-1710885, Jun. 30, 2017, Qingdao, China (6 pages).
Oppo, "Text Proposal for QCL", 3GPP TSG RAN WG1 Meeting #92, R1-1802131, Mar. 2, 2018, Athens, Greece (3 pages).
Qualcomm Incorporated, "Remaining Details on QCL", 3GPP TSG RAN WG1 Meeting #92, R1-1802832, Mar. 2, 2018, Athens, Greece (12 pages).
Samsung, "Issues on QCL", 3GPP TSG RAN WG1 Meeting AH 1801, R1-1800440, Jan. 26, 2018, Vancouver, Canada (2 pages).
Vivo, "Remaining issues on QCL", 3GPP TSG RAN WG1 #92, R1-1801529, Mar. 2, 2018, Athens, Greece (4 pages).
Extended European Search Report for EP Appl. No. 23194567.6, dated Dec. 12, 2023.
Mediatek Inc., "Offline Summary for Remaining issues on Beam Failure Recovery", 3GPP TSG RAN WG1 Meeting #AH1801, R1-1801197, Jan. 26, 2018, Vancouver, CA (10 pages).
Nokia et al., "Summary of QCL", 3GPP TSG RAN WG1 Meeting AH 1801, R1-1801054, Jan. 26, 2018, Vancouver, Canada (25 pages).
Session Chair (Samsung), "RAN1 session notes for agenda item 7.2 (MIMO)", 3GPP TSG RAN WG1 Meeting AH 1801, R1-1801130, Jan. 26, 2018, Vancouver, Canada (32 pages).
Notice of Allowance for JP Appl. No. 2020-544797, dated Sep. 26, 2023 (3 pages).
ZTE, "Discussion on draft CRs on beam management", 3GPP TSG RAN WG1 Meeting #95, R1-1812266, Nov. 16, 2018, Spokane, USA (7 pages).

* cited by examiner

Determine second information according to first information — S1002
FIG. 10
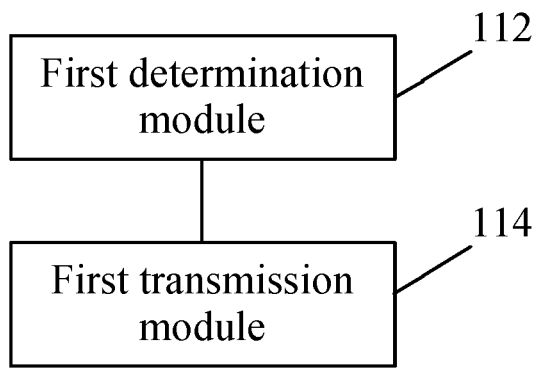
FIG. 11
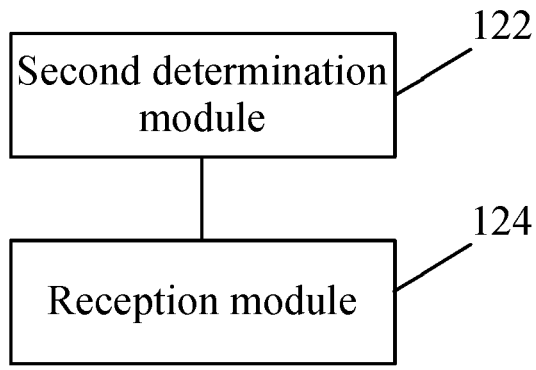
FIG. 12
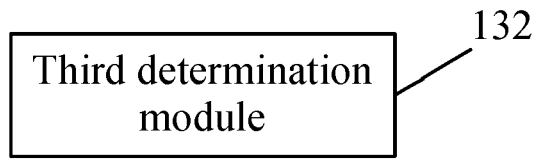
FIG. 13

METHODS AND APPARATUSES FOR TRANSMITTING AND RECEIVING CONTROL SIGNALING, AND METHOD FOR DETERMINING INFORMATION

This application claims priority to U.S. patent application Ser. No. 17/002,474, filed Aug. 25, 2020 which claims priority to Chinese Patent Application No. 201810160248.2 filed with the CNIPA on Feb. 26, 2018, the content of which is incorporated herein by reference in its entirety.

TECHNICAL FIELD

The present application relates to the field of communications, for example, to methods and apparatuses for transmitting and receiving control signaling, and a method for determining information.

BACKGROUND

As one of the core technologies of the 5th generation wireless systems (5G), a high-frequency communication provides strong support for a high speed and a large bandwidth of the communication in the future. However, a core problem of the high-frequency communication is that the path loss is relatively great. Meanwhile, the size of an antenna is relatively small as well. In view of this, multiple antennas may be used for forming a beam to resist the path loss.

To improve system efficiency, resist beam blockage scenarios, fast link recovery, and a beam of a downlink signal may be notified by physical layer dynamic control signaling. In the case where the interval between the control signaling and the downlink signal is less than a predetermined threshold, a terminal cannot acquire the receive beam of the downlink signal through information notified by the physical layer dynamic control signaling.

In the related new radio (NR) protocol, in the case where the interval between physical layer dynamic control signaling and a downlink signal is less than a predetermined threshold, a beam of a control resource set (CORESET) having the minimum control resource set identification (CORESET ID) in the closest slot is used for caching data.

There are two situations in the preceding solution. The first situation is that in the case where the interval between the physical layer dynamic control signaling and the downlink signal is less than the predetermined threshold, the bit field for notifying the beam in the physical layer dynamic control signaling is not fully utilized. The second situation is that the downlink signal needs to be cached before the physical layer dynamic control signaling is decoded; however, actually, the downlink signal may not be scheduled by a base station; if a terminal needs to cache the dynamically-scheduled potential downlink signal according to the CORESET with the closest CORESET ID and according to a rule and a previously scheduled signal may exist at the position where the potential downlink signal is located, then in the case where the beam of the previously scheduled downlink signal and the beam of the potential downlink signal cannot be generated by the terminal simultaneously, the base station and the terminal need to agree on the behavior to guarantee the effectiveness of communication.

No effective solution has yet been proposed for the preceding technical problem in the related art.

SUMMARY

Embodiments of the present application provide methods and apparatuses for transmitting and receiving control signaling and for determining information to overcome the following defects in the related art: in the case where the interval between physical layer dynamic control signaling and a downlink signal is less than a predetermined threshold, the bit field for notifying a beam in the physical layer dynamic control signaling is not fully utilized so that the resource utilization is relatively low; and a previously scheduled signal may exist at the position where a potential downlink signal is located, and in the case where the beam of the previously scheduled downlink signal and the beam of the potential downlink signal cannot be generated by the terminal simultaneously, the communication effectiveness cannot be guaranteed.

According to an embodiment of the present application, a method for transmitting control signaling is provided. The method includes the following step: second information is determined according to first information, where the second information includes at least one of the following: the number N of bits used in first control signaling to notify a first transmission parameter, a correspondence mapping table between an index value referenced by the first transmission parameter in the first control signaling and the value of the first transmission parameter, the type of the first transmission parameter notified by a predetermined indication field in the first control signaling, or position information of the bits used in the first control signaling to notify the first transmission parameter; and where the first information includes a relationship between a transmission time interval between the first control signaling and a first signal and a predetermined threshold K, and where N and K are non-negative integers; and the first control signaling is transmitted. In an embodiment, the first control signaling is transmitted according to the determined second information.

According to another embodiment of the present application, a method for determining information is provided. The method includes the following step: second information is determined according to first information, where the second information includes at least one of the following: a quasi co-location (QCL) parameter of a first signal, a manner of transmitting the first signal at a time-domain position where a second signal is located, or a manner of receiving the first signal at the time-domain position where the second signal is located; and where the first information includes at least one piece of the following information: whether the second signal exists in a predetermined time window after a specified control resource set (CORESET), a relationship between an interval between the first signal and a specified CORESET and a predetermined threshold X1, a relationship between a time interval between the second signal and a specified CORESET and a predetermined threshold X2, a relationship between a time interval between the first signal and first control signaling and the predetermined threshold X1, a relationship between a time interval between the second signal and second control signaling and the predetermined threshold X2, or a relationship between a first Spatial receiver (Rx) parameter corresponding to the first signal and a second Spatial Rx parameter corresponding to the second signal, where X1 and X2 are real numbers. In an embodiment, the first signal is transmitted or received according to the determined second information.

According to another embodiment of the present application, a method for receiving control signaling is provided. The method includes the following step: second information is determined according to first information; and first control signaling is received according to the second information, where the second information includes at least one of the following: the number N of bits used in the first control signaling to notify a first transmission parameter, a correspondence mapping table between an index value referenced by the first transmission parameter in the first control signaling and the value of the first transmission parameter, the type of the first transmission parameter notified by a predetermined indication field in the first control signaling, or position information of the bits used in the first control signaling to notify the first transmission parameter; where the first information includes a relationship between a transmission time interval between the first control signaling and a first signal and a predetermined threshold K; and where N and K are non-negative integers.

According to another embodiment of the present application, a method for determining a QCL reference signal is provided. The method includes at least one of the following: in the case where the number A of time units occupied by one signal is greater than 1, a QCL reference signal of the one signal is determined according to at least one of signaling information or a predetermined rule; or N signals at the same time satisfy a QCL relationship with respect to Spatial Rx parameters, where N is a positive integer greater than or equal to 2.

According to another embodiment of the present application, an apparatus for transmitting control signaling is provided. The apparatus is applied to a first communication node and includes a first determination module and a first transmission module. The first determination module is configured to determine second information according to first information, where the second information includes at least one of the following: the number N of bits used in first control signaling to notify a first transmission parameter, a correspondence mapping table between an index value referenced by the first transmission parameter in the first control signaling and the value of the first transmission parameter, the type of the first transmission parameter notified by a predetermined indication field in the first control signaling, or position information of the bits used in the first control signaling to notify the first transmission parameter; where the first information includes a relationship between a transmission time interval between the first control signaling and a first signal and a predetermined threshold K; and where N and K are non-negative integers. The first transmission module is configured to transmit the first control signaling. In an embodiment, the first control signaling is transmitted according to the determined second information.

According to another embodiment of the present application, an apparatus for determining information is provided. The apparatus is applied to a first communication node and includes a second determination module. The second determination module is configured to determine second information according to first information, where the second information includes at least one of the following: a quasi co-location (QCL) parameter of a first signal, a manner of transmitting the first signal at a time-domain position where a second signal is located, or a manner of receiving the first signal at the time-domain position where the second signal is located; and where the first information includes at least one piece of the following information: whether the second signal exists in a predetermined time window after a specified CORESET, a relationship between an interval between the first signal and a specified CORESET and a predetermined threshold X1, a relationship between a time interval between the second signal and a specified CORESET and a predetermined threshold X2, a relationship between a time interval between the first signal and first control signaling and the predetermined threshold X1, a relationship between a time interval between the second signal and second control signaling and the predetermined threshold X2, or a relationship between a first Spatial Rx parameter corresponding to the first signal and a second Spatial Rx parameter corresponding to the second signal, where X1 and X2 are real numbers. In an embodiment, the first signal is transmitted or received according to the determined second information.

According to another embodiment of the present application, an apparatus for receiving control signaling is provided. The apparatus is applied to a second communication node and includes a third determination module and a reception module. The third determination module is configured to determine second information according to first information. The reception module is configured to receive first control signaling according to the second information. The second information includes at least one of the following: the number N of bits used in the first control signaling to notify a first transmission parameter, a correspondence mapping table between an index value referenced by the first transmission parameter in the first control signaling and the value of the first transmission parameter, the type of the first transmission parameter notified by a predetermined indication field in the first control signaling, or position information of the bits used in the first control signaling to notify the first transmission parameter; and the first information includes a relationship between a transmission time interval between the first control signaling and a first signal and a predetermined threshold K, where N and K are non-negative integers.

According to another embodiment of the present application, a storage medium is further provided. The storage medium stores a computer program. The computer program is configured to, when executed, perform the steps of any one of the preceding method embodiments.

According to another embodiment of the present application, an electronic device is further provided. The electronic device includes a memory and a processor. The memory stores a computer program and the processor is configured to execute the computer program to perform the steps of any one of the preceding method embodiments.

BRIEF DESCRIPTION OF DRAWINGS

The drawings described herein are used for providing a further understanding of the present application and form a part of the present application. The illustrative embodiments and the description thereof in the present application are used for explaining the present application and not to limit the present application improperly. In the drawings:

FIG. 10 is a flowchart of a method for determining information according to an embodiment of the present application;

FIG. 11 is a block diagram illustrating the structure of an apparatus for transmitting control signaling according to an embodiment of the present application;

FIG. 12 is a block diagram illustrating the structure of an apparatus for receiving control signaling according to an embodiment of the present application;

FIG. 13 is a block diagram illustrating the structure of an apparatus for determining information according to an embodiment of the present application;

DETAILED DESCRIPTION

The present application will be described hereinafter in detail with reference to drawings and in conjunction with embodiments.

It is to be noted that the terms such as "first" and "second" in the description, claims and drawings of the present application are used for distinguishing between similar objects and are not necessarily used for describing a particular order or sequence.

Embodiment One

Figure 1:
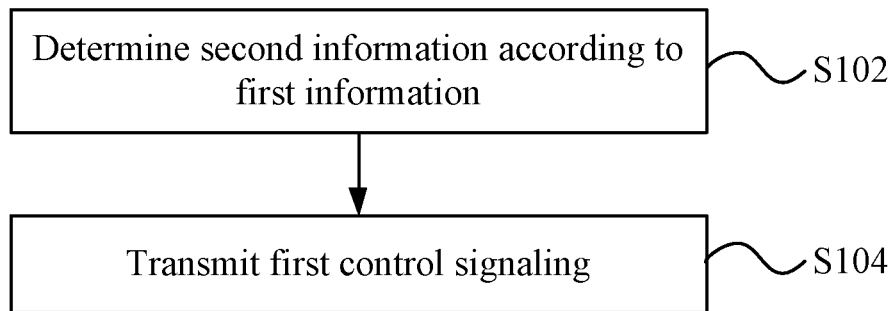
FIG. 1 is a flowchart of a method for transmitting control signaling according to an embodiment of the present application.

This embodiment provides a method for transmitting control signaling. FIG. 1 is a flowchart of a method for transmitting control signaling according to an embodiment of the present application. As shown in FIG. 1, this process includes step S102 and step S104 described below.

In step S102, second information is determined according to first information.

The second information includes at least one of the following: the number N of bits used in first control signaling to notify a first transmission parameter, a correspondence mapping table between an index value referenced by the first transmission parameter in the first control signaling and the value of the first transmission parameter, the type of the first transmission parameter notified by a predetermined indication field in the first control signaling, or position information of the bits used in the first control signaling to notify the first transmission parameter; and the first information includes a relationship between a transmission time interval and a predetermined threshold K, where the transmission time interval is an interval between the first control signaling and a first signal, and where N and K are non-negative integers.

In step S104, the first control signaling is transmitted.

In an embodiment, the first control signaling is transmitted according to the determined second information.

In the preceding steps, the second information is determined according to the first information, where the second information includes at least one of the following: the number N of the bits used in the first control signaling to notify the first transmission parameter, the correspondence mapping table between the index value referenced by the first transmission parameter in the first control signaling and the value of the first transmission parameter, the type of the first transmission parameter notified by the predetermined indication field in the first control signaling, or the position information of the bits used in the first control signaling to notify the first transmission parameter; where the first information includes the relationship between the transmission time interval between the first control signaling and the first signal and the predetermined threshold K; and where N and K are non-negative integers; and the first control signaling is transmitted. That is, the format of control signaling is determined according to the second information, and then new control signaling is transmitted. In this way, the following defect in the related art is overcome: in the case where the interval between physical layer dynamic control signaling and a downlink signal is less than a predetermined threshold, the bit field for notifying a beam in the physical layer dynamic control signaling is not fully utilized so that the resource utilization is relatively low; and the following technical effect is achieved: the resource utilization of the control signaling is improved.

In an embodiment, the preceding steps may, but not be limited to, be executed by a base station.

In an embodiment, step S102 and step S104 may be executed in a reverse order, that is, step S104 may be executed before step S102.

In an embodiment, in the case where the relationship between the transmission time interval between the first control signaling and the first signal and the predetermined threshold K is a first relationship, the value of N includes N1; in the case where the relationship between the transmission time interval between the first control signaling and the first signal and the predetermined threshold K is a second relationship, the value of N includes N2, where N1 and N2 are integers.

The relationship between N1 and N2 satisfies at least one of the following: N1 is greater than N2; the difference between N1 and N2 is less than or equal to the number of bits occupied by a transmission configuration indication (TCI) field; or the difference between N1 and N2 is less than or equal to the number of bits required to notify information about a second transmission parameter.

In an embodiment, in the case where the relationship between the transmission time interval between the first control signaling and the first signal and the predetermined threshold K is the first relationship, the correspondence mapping table is a first correspondence mapping table; in the case where the relationship between the transmission time interval between the first control signaling and the first signal and the predetermined threshold K is the second relationship, the correspondence mapping table is a second correspondence mapping table.

In an embodiment, any one of the first correspondence mapping table, the second correspondence mapping table, transmission parameter value set one and transmission parameter value set two is determined in at least one of the following manners: in manner one, the content included in transmitted signaling information; or in manner two, a rule pre-agreed by a transmitting end and a receiving end. The transmission parameter value set one corresponds to a value set of the first transmission parameter included in the first correspondence mapping table and the transmission parameter value set two corresponds to a value set of the first transmission parameter included in the second correspondence mapping table.

In an embodiment, in the case where the type of the first transmission parameter is a TCI, a downlink reference signal (DL-RS) set formed by DL-RSs associated with Spatial Rx parameters in each state in the first correspondence mapping table includes only one DL-RS; in the case where the type of the first transmission parameter is the TCI, each two DL-RSs in the DL-RS set formed by the DL-RSs associated with the Spatial Rx parameters in each state in the first correspondence mapping table satisfy a QCL relationship with respect to the Spatial Rx parameters.

In the case where the type of the first transmission parameter is the TCI, the DL-RSs in the DL-RS set formed by the DL-RSs associated with the Spatial Rx parameters in each state in the first correspondence mapping table are able to be received by a first communication node simultaneously; in the case where the type of the first transmission parameter is the TCI, the DL-RS set formed by the DL-RSs associated with the Spatial Rx parameters in each state in the first correspondence mapping table is an empty set. The first communication node is a communication node for receiving at least one of the first signal or the first control signaling.

In an embodiment, the type of the first transmission parameter includes one or more transmission parameter types, except for a transmission parameter type of a TCI, included in the first control signaling; or the type of the first transmission parameter is a transmission parameter of a TCI.

In an embodiment, the first transmission parameter satisfies at least one of the following: the first transmission parameter is the transmission parameter of the first signal; or the first transmission parameter is the transmission parameter of a second signal.

In an embodiment, the first signal or the second signal includes at least one of the following signals: a demodulation reference signal, a measurement reference signal, a control channel signal, or a data channel signal; and the first control signaling is physical layer control signaling.

In an implementation, the first information further includes at least one piece of the following information: information included in second control signaling; information about whether a transmission configuration indication present in downlink control information (TCI-PresentInDCI) corresponding to a CORESET where the first control signaling is located is enabled; a relationship between a carrier frequency where the first signal or the second signal is located and a predetermined threshold G; a supported frequency range capability fed back by the first communication node; whether the predetermined threshold K is 0; whether at least one CORESET configured with Spatial Rx parameters exists in a CORESET required to be detected by the first communication node; whether at least one CORESET configured with Spatial Rx parameters exists in a CORESET associated with a dedicated search space required to be detected by the first communication node; whether a CORESET having the minimum control resource set identification (CORESET ID) in a time unit closest to the first signal or the second signal is configured with Spatial Rx parameters; whether a CORESET having the minimum CORESET ID in a time-domain symbol closest to the first signal or the second signal is configured with Spatial Rx parameters; whether at least one TCI state exists in a TCI state pool associated with the first signal or the second signal, where a QCL parameter corresponding to a reference signal (RS) set in the TCI state includes a Spatial Rx parameter; or whether at least one TCI state exists in an activation TCI state pool associated with the first signal or the second signal, where the QCL parameter corresponding to the RS set in the TCI state includes a Spatial Rx parameter. The first communication node is a communication node for receiving at least one of the first signal or the second signal.

In an embodiment, the first control signaling includes at least one piece of the following signaling: physical layer control signaling, medium access control (MAC) control element (CE) (MAC-CE) control signaling, or radio resource control (RRC) signaling; the second control signaling includes at least one of the following signaling: physical layer control signaling, MAC-CE control signaling, or RRC signaling.

In an embodiment, in the case where the relationship between the transmission time interval between the first control signaling and the first signal and the predetermined threshold K is the first relationship, the type of the first transmission parameter notified by the predetermined indication field in the first control signaling is a first type of transmission parameter; in the case where the relationship between the transmission time interval between the first control signaling and the first signal and the predetermined threshold K is the second relationship, the type of the first transmission parameter notified by the predetermined indication field in the second control signaling is a second type of transmission parameter.

In an embodiment, in the case where the transmission time interval between the first control signaling and the first signal is less than the predetermined threshold K, the relationship between the transmission time interval between the first control signaling and the first signal and the predetermined threshold K is the first relationship; in the case where the transmission time interval between the control signaling and the first signal is greater than or equal to the predetermined threshold K, the relationship between the transmission time interval between the first control signaling and the first signal and the predetermined threshold K is the second relationship. Alternatively, in the case where the transmission time interval between the control signaling and the first signal is less than or equal to the predetermined threshold K, the relationship between the transmission time interval between the first control signaling and the first signal and the predetermined threshold K is the first relationship; in the case where the transmission time interval between the control signaling and the first signal is greater than the predetermined threshold K, the relationship between the transmission time interval between the first control signaling and the first signal and the predetermined threshold K is the second relationship. Alternatively, in the case where the transmission time interval between the control signaling and the first signal is greater than or equal to the predetermined threshold K, the relationship between the transmission time interval between the first control signaling and the first signal and the predetermined threshold K is the first relationship; in the case where the transmission time interval between the control signaling and the first signal is less than the predetermined threshold K, the relationship is the second relationship.

The present embodiment will be described below by way of example in conjunction with exemplary embodiments.

Exemplary Embodiment One

In the beam-based communication, the beam of a PDSCH may be notified by downlink control information (DCI). In the case where the interval between the DCI and the PDSCH is less than K, the terminal needs the radio frequency to receive and cache the PDSCH before decoding the DCI, so in the related NR, it is stipulated that in the case where the interval between the DCI and the PDSCH is less than the predetermined threshold K, a QCL parameter of a demodulation reference signal (DMRS) of the PDSCH is acquired according to a QCL parameter corresponding to the minimum CORESET ID in the closest slot; in the case where the interval between the DCI and the PDSCH is greater than or equal to the predetermined threshold K, the QCL parameter of the DMRS of the PDSCH is acquired by using QCL information indicated in the DCI. However, to reduce the complexity of blind detecting a physical downlink control channel (PDCCH) by the terminal, the load of the PDCCH in the case where the interval between the DCI and the PDSCH is less than K is the same as the load of the PDCCH in the case where the interval between the DCI and the PDSCH is greater than or equal to K. In this way, in the case where the interval between the DCI and the PDSCH is less than K, the TCI notification field of 3 bits (the TCI notification field is used for notifying the QCL parameter of the DMRS of the PDSCH) in the DCI exists but is not used. In the related NR version, the TCI notification field occupies 3 bits. Therefore, the enhanced solution below is proposed.

In the case where the interval between the DCI and the PDSCH is less than K, the TCI notification field of 3 bits in the DCI may notify one or more transmission parameters (that is, the first transmission parameter), except for the transmission parameter of the TCI, in the DCI, and the transmission parameters in the related NR DCI format_1 are shown in Table 1 in order. As shown in Table 1, the interval between the DCI and the PDSCH may be determined according to information indicated in transmission parameter indicator 5.

TABLE 1

| Transmission Parameter Indicator Number | Transmission Parameter | Number of Occupied Bits |
|---|---|---|
| 1 | Carrier indicator | |
| 2 | Identifier for DCI formats | |
| 3 | Bandwidth part (BWP) indicator | |
| 4 | Frequency domain resource assignment indicator | |
| 5 | Time domain resource assignment indicator | |
| 6 | virtual resource block to physical resource block (VRB-to-PRB) mapping indicator | |
| 7 | PRB bundling size indicator | |
| 8 | Rate matching indicator | |
| 9 | Coding rate in a modulation and coding scheme (MCS), new data indication (NDI), and redundancy version (RV) indicators for transport block 1 (For transport block 1 (MCS, NDI, RV)) | |
| 10 | Coding rate in an MCS, NDI, and RV indicators for transport block 2 (For transport block 2 (MCS, NDI, RV)) | |
| 11 | Hybrid automatic repeat request (HARQ) process number indicator | |
| 12 | Downlink assignment index indicator | |
| 13 | Transmit power control (TPC) command for scheduled physical uplink control channel (PUCCH) indicator | |
| 14 | PUCCH resource indicator | 2 bits |
| 15 | PDSCH-to-HARQ_feedback timing indicator | |
| 16 | Antenna port(s) indicator, primary demodulation reference signal indicator | |
| 17 | TCI field which is used for indicating the demodulation of PDSCH | 3 bits |
| 18 | Trigger signaling of uplink reference signal (sounding reference signal (SRS) request) | |
| 19 | Code block group (CBG) transmission information (CBGTI) | |
| 20 | CBG flushing out information (CBGFI) | |
| 21 | DMRS sequence initialization value | |

For example, the first transmission parameter is the transmission parameter numbered 14 in Table 1. In the case where the interval between the DCI and the PDSCH is less than K, the PUCCH resource indicator may indicate one PUCCH resource selected from at most 32 PUCCH resources by using a total of 5 bits of the bit field numbered 14 and the bit field numbered 17 in Table 1. In an embodiment, in the case where it is determined that the PUCCH set is set 0 according to the uplink control information (UCI) load, the indexes of the PUCCH resources in set 0 may be jointly indicated by using the two bit fields; in the case where it is determined that the PUCCH set is not set 0 according to the UCI load, even though the interval is less than K, the PUCCH resources may be notified only by using the bit field numbered 14 in Table 1 rather than jointly indicated by using the bit field numbered 14 and the bit field numbered 17 in Table 1 for the reason that the maximum number of the PUCCH resources included in these sets is 8. In the case where the interval between the DCI and the PDSCH is greater than or equal to K, the PUCCH resources may be indicated in the manner that one PUCCH resource selected from at most 4 PUCCH resources only by using the indicator numbered 14 in Table 1. In the case where the interval between the DCI and the PDSCH is less than K, the sequence of the indicators in the DCI may follow the sequence in Table 1 and only the indicator 14 and the indicator 17 jointly form the PUCCH resource indicator. Alternatively, the sequence of the transmission parameter indicators as shown in Table 2 may also be used. Compared with Table 1, in Table 2, the change is that the transmission parameter indicator 17 is canceled and the number of bits of the transmission parameter indicator 14 becomes 5 bits.

TABLE 2

| Transmission Parameter Indicator Number | Transmission Parameter | Number of Occupied Bits |
|---|---|---|
| 1 | Carrier indicator | |
| 2 | Identifier for DCI formats | |
| 3 | Bandwidth part indicator | |
| 4 | Frequency domain resource assignment indicator | |
| 5 | Time domain resource assignment indicator | |
| 6 | VRB-to-PRB mapping indicator | |
| 7 | PRB bundling size indicator | |
| 8 | Rate matching indicator | |
| 9 | Coding rate in an MCS, NDI, and RV indicators for transport block 1 (For transport block 1 (MCS, NDI, RV)) | |
| 10 | Coding rate in an MCS, NDI, and RV indicators for transport block 2 (For transport block 2 (MCS, NDI, RV)) | |
| 11 | HARQ process number indicator | |
| 12 | Downlink assignment index indicator | |
| 13 | TPC command for scheduled PUCCH indicator | |
| 14 | PUCCH resource indicator | 5 bits |
| 15 | PDSCH-to-HARQ_feedback timing indicator | |
| 16 | Antenna port(s) indicator, primary demodulation reference signal indicator | |
| 18 | Trigger signaling of uplink reference signal (SRS request) | |
| 19 | CBG transmission information (CBGTI) | |
| 20 | CBG flushing out information (CBGFI) | |
| 21 | DMRS sequence initialization value | |

In this way, in the case where the interval between the DCI and the PDSCH is less than the predetermined threshold K, the dynamic selection may be performed on 32 PUCCH resources for the DCI, as shown in Table 3; in the case where the transmission interval between the DCI and the PDSCH is greater than or equal to the predetermined threshold K, the dynamic selection may be performed on only 4 PUCCH resources for the DCI, as shown in Table 4.

TABLE 3

| Index Value of PUCCH Resource Selection Parameter in DCI | PUCCH Resource |
|---|---|
| 0 | PUCCH resource 1 |
| 1 | PUCCH resource 2 |
| 2 | PUCCH resource 3 |
| 3 | PUCCH resource 4 |
| ... | ... |
| 31 | PUCCH resource 32 |

TABLE 4

| Indication Value of PUCCH Resource Selection Parameter in DCI | PUCCH Resource |
|---|---|
| 0 | PUCCH resource 1 |
| 1 | PUCCH resource 2 |
| 2 | PUCCH resource 3 |
| 3 | PUCCH resource 4 |

In Table 3 and Table 4, 4 PUCCH resources in Table 4 are the same as the first 4 PUCCH resources in Table 3. In this way, when the base station performs notification, only 32 PUCCH resources need to be notified. Of course, the present embodiment does not exclude the case where the PUCCH resources in Table 3 are different from the PUCCH resources in Table 4. In this way, when the base station performs notification by using high-layer signaling, the PUCCH resources in Table 3 and Table 4 are notified separately.

In the present embodiment, the interval between the DCI and the PDSCH may be at least one of the following intervals: the interval between the ending time-domain symbol of the DCI and the starting time-domain symbol of the PDSCH; the interval between the starting time-domain symbol of the DCI and the starting time-domain symbol of the PDSCH; the interval between the latest time-domain symbol in the ending symbols of the CORESET in the slot where the DCI is located and the starting time-domain symbol of the PDSCH; the interval between the earliest time-domain symbol of the CORESET in the slot where the DCI is located and the starting time-domain symbol of the PDSCH; the interval between the ending time-domain symbol of the DCI and the starting time-domain symbol in each of multiple slots occupied by the PDSCH; or the interval between the starting time-domain symbol of the DCI and the starting time-domain symbol in each of multiple slots occupied by the PDSCH.

In the preceding description, in the case where the interval between the DCI and the PDSCH is less than the predetermined threshold K, the TCI field is used for the indication of the PUCCH resources. Similarly, it is also possible that in the case where the interval between the DCI and the PDSCH is less than a predetermined threshold, the TCI field is used for the rate mating indicator. Similarly, when the rate mating information is configured through the high-layer signaling, two sets of rate mating parameters need to be configured, such as one set of parameters used for establishing a table similar to Table 3 and the other set of parameters used for establishing a table similar to Table 4. Alternatively, one set of parameters is used, all entries in this set of parameters are used for establishing a table similar to Table 3, and the agreed part of entries (such as the first M entries or the last M entries) are used for establishing a table similar to Table 4. In this case, Table 3 and Table 4 show the correspondence between the index values and the rate mating information, and the number of states in Table 3 and the number of states in Table 4 changes. For example, the high-layer-configured rate-match-PDSCH-resource-set includes 2 resources; in the case where the interval between the DCI and the PDSCH is less than the predetermined threshold, the rate mating information is obtained with reference to Table 5, and there are $2^{(1+3)}=16$ index values in Table 5 in total, where the index values are jointly indicated by the transmission parameter indicator 8 and the transmission parameter indicator 17 in Table 1; in the case where the transmission time interval between the DCI and the PDSCH is greater than or equal to the predetermined threshold, the rate mating information is obtained with reference to Table 6, and there are $2^{(1)}=2$ states in Table 6, where the states are indicated by the transmission parameter indicator 8 in Table 1.

TABLE 5

| Index Value of Rate Mating Information in DCI | Rate Mating Information |
| --- | --- |
| 0 | High-layer-configured rate mating information 1 |
| 1 | High-layer-configured rate mating information 2 |
| 2 | High-layer-configured rate mating information 3 |

TABLE 5-continued

| Index Value of Rate Mating Information in DCI | Rate Mating Information |
| --- | --- |
| 3 | High-layer-configured rate mating information 4 |
| ... | ... |
| 15 | High-layer-configured rate mating information 16 |

TABLE 6

| Indication Value of PUCCH Resource Selection Parameter in DCI | PUCCH Resource |
| --- | --- |
| 0 | High-layer-configured rate mating information 1 |
| 1 | High-layer-configured rate mating information 2 |

Similarly, in the case where the interval between the DCI and the PDSCH is less than the predetermined threshold K, a TCI field may be used for one or more transmission parameters in 20 parameters except for the transmission parameter of the TCI in Table 1. For example, in the case where the interval between the DCI and the PDSCH is less than the predetermined threshold K, the first bit in the 3 bits of the TCI field is used for the notification of the rate mating information and the last 2 bits are used for the notification of zero power channel state information reference signal (ZP-CSI-RS) information. Alternatively, in the case where the interval between the DCI and the PDSCH is less than the predetermined threshold, the type of the transmission parameter indicated by the TCI field or the type of the transmission parameter indicated by each bit of the TCI field is determined according to an agreed rule or signaling information. For example, the base station indicates through signaling that in the case where the interval between the DCI and the PDSCH is less than the predetermined threshold K, the first bit of the TCI field is used for the notification of the rate mating information and the last 2 bits of the TCI field are used for the notification of the ZP-CSI-RS information. Alternatively, the base station indicates through signaling that in the case where the interval between the DCI and the PDSCH is less than the predetermined threshold K, all the 3 bits of the TCI field are used for the notification of the rate mating information. Alternatively, the base station notifies through the signaling that in the case where the interval between the DCI and the PDSCH is less than the predetermined threshold K, the first 2 bits of the TCI field are used for the notification of the PDSCH frequency-domain resource and the last 1 bit of the TCI field is used for the notification of the ZP-CSI-RS information.

In the preceding embodiment, in the case where the interval between the DCI and the PDSCH is less than K, the TCI field is used for indicating transmission parameters of other types except for the transmission parameter of the TCI in Table 1, and may also be used for indicating transmission parameter types which do not exist in Table 1. For example, the TCI field is used for indicating CSI information (where the CSI information is used for triggering the reporting of at least one of aperiodic CSI-RS or aperiodic CSI). In this way, in the case where the interval between the DCI and the PDSCH is less than K, the TCI field in the DCI is used for indicating CSI triggering information; in the case where the interval between the DCI and the PDSCH is greater than K, the TCI field is used for indicating TCI information, and in this case, the CSI information cannot be indicated in the DCI.

Exemplary Embodiment Two

In this embodiment, according to a relationship between the transmission interval between the physical layer dynamic control signaling and the first signal and the predetermined threshold, at least one piece of the following information is determined: a transmission parameter type indicated by a specified indicator of the physical layer dynamic control signaling or whether the physical layer dynamic control signaling includes indication information indicating a specified transmission parameter type.

In an embodiment, in the case where the relationship between the transmission time interval between the first control signaling and the first signal and the predetermined threshold K is relationship one, the specified indicator of the physical layer dynamic control signaling is used for indicating a first type of transmission parameter; in the case where the relationship between the transmission time interval between the first control signaling and the first signal and the predetermined threshold K is relationship two, the specified indicator of the physical layer dynamic control signaling is used for indicating a second type of transmission parameter.

In an embodiment, in the case where the relationship between the transmission time interval between the first control signaling and the first signal and the predetermined threshold K is the relationship one, the physical layer dynamic control signaling includes the indication information indicating the specified transmission parameter type; in the case where the relationship between the transmission time interval between the first control signaling and the first signal and the predetermined threshold K is the relationship two, the physical layer dynamic control signaling does not include the indication information indicating the specified transmission parameter type.

In an embodiment, the relationship one is that the transmission interval between the physical layer dynamic control signaling and the first signal is less than the predetermined threshold, and the relationship two is that the transmission interval between the physical layer dynamic control signaling and the first signal is greater than or equal to the predetermined threshold. Alternatively, the relationship one is that the transmission interval between the physical layer dynamic control signaling and the first signal is less than or equal to the predetermined threshold, and the relationship two is that the transmission interval between the physical layer dynamic control signaling and the first signal is greater than the predetermined threshold.

In an embodiment, the transmission parameter may be the transmission parameter of the first signal or the transmission parameter of the second signal.

In an embodiment, in the case where the transmission time interval between the DCI and the PDSCH (the first signal) is less than K, the indicator numbered 17 in the DCI in Table 1 is used for indicating rate mating indication information; in the case where the transmission time interval between the DCI and the PDSCH is greater than or equal to K, the indicator numbered 17 in the DCI in Table 1 is used for indicating TCI information.

Alternatively, in the case where the transmission time interval between the DCI and the PDSCH (the first signal) is less than K, the indicator numbered 17 in the DCI in Table 1 is used for indicating CSI request information; in the case where the transmission time interval between the DCI and the PDSCH is greater than or equal to K, the indicator numbered 17 in the DCI in Table 1 is used for indicating the TCI information (that is, information about the QCL parameter of the DMRS of the PDSCH). That is, in the case where the interval between the DCI and the PDSCH is less than K, the DCI of DL-Grant includes CSI request indication information; in the case where the interval between the DCI and the PDSCH is greater than or equal to K, the DCI of DL-Grant does not include the CSI request indication information.

Exemplary Embodiment Three

In the preceding exemplary embodiment one and exemplary embodiment two, the number of candidate parameter values included in the value set of the first transmission parameter changes according to the first relationship. For example, in the case where the interval between the DCI and the PDSCH is less than K, the value set of the first transmission parameter includes X1 values; in the case where the interval between the DCI and the PDSCH is greater than K, the value set of the first transmission parameter includes X2 values. Alternatively, in the case where the interval between the DCI and the PDSCH is less than K, the correspondence mapping table between the index value referenced by the index value of the first transmission parameter indicated by the control signaling in the DCI and the first transmission value is table one (such as Table 3); in the case where the interval between the DCI and the PDSCH is greater than K, the correspondence mapping table between the index value referenced by the index value of the first transmission parameter indicated by the control signaling in the DCI and the first transmission value is table two (such as Table 4).

In an embodiment, whether the TCI field exists in the DCI is also configured by per CORESET. It is configured that the TCI field does not exist in the DCI in CORESET1, that is, the DCI in the CORESET1 does not include the transmission parameter indicator numbered 17 in Table 1. It is configured that the TCI field exists in the DCI in CORESET2, that is, the DCI in the CORESET2 includes the transmission parameter indicator numbered 17 in Table 1. Moreover, it is agreed that in the case where the transmission interval between the DCI and the PDSCH is less than an agreed threshold (such as K), the TCI field in the DCI is used for indicating the rate mating information. Therefore, the index value referenced by the rate mating information indicated in the DCI transmitted in the CORESET2 and the rate mating information are shown in two tables, Table 5 and Table 6. In the case where the interval between the DCI and the PDSCH is less than the predetermined threshold, Table 5 is referenced; in the case where the interval between the DCI and the PDSCH is greater than or equal to the predetermined threshold, Table 6 is referenced, and the index value referenced by the rate mating information indicated in the DCI in the CORESET1 and rating information also reference Table 6. Alternatively, the index value referenced by the rate mating information indicated in the DCI in the CORESET1 and the rating information reference a table different from Table 6, such as Table 6-2, that is, in this case, there are three tables referenced by the rate mating information. In this way, when the base station notifies the rate mating information through high-layer signaling, the base station needs to notify the rate mating information for each table, or the high layer notifies the information of Table 6 and Table 5 through one piece of signaling and notifies the information of Table 6-2 through another piece of signaling.

That is, in the case where the transmission interval between the DCI and the PDSCH is less than K, the table referenced by the index information of the rate mating information indicated in the DCI is Table 5. In other cases, the table referenced by the index information of the rate mating information indicated in the DCI is Table 6. In the case where the TCI field does not exist in the DCI, the table referenced by the index information of the rate mating information indicated in the DCI is Table 6, or the table referenced by the index information of the rate mating information indicated in the DCI is Table 6-2.

In the preceding implementation, there are Y tables referenced by the rate mating information indicated in the DCI. Similarly, there may be Y tables referenced by other transmission parameter types indicated in the DCI. Y is a number greater than 1, such as Y=2 or Y=3 in the preceding implementation.

Exemplary Embodiment Four

In the preceding embodiment, the second information is determined according to the first information. The second information includes at least one piece of the following information: the number N of bits used in the control signaling to notify the first transmission parameter, the correspondence table between the referenced index value for notifying information about first transmission parameter in the control signaling and the value of the first transmission parameter, the type of the first transmission parameter notified by the predetermined indication field in the control signaling, or position information of the bits used in the control signaling to notify the first transmission parameter. The first information includes the relationship between the transmission time interval between the control signaling and the first signal and the predetermined threshold.

In this embodiment, the first information further includes at least one piece of the following information from information one to information ten.

Information one: Information included in the second control signaling. For example, the base station transmits the signaling information to the terminal and in the signaling information, at least one piece of the following information is notified: whether the TCI field may be used for the notification of other transmission parameter types, the transmission parameter type that the TCI field is able to be used for notifying, or the transmission parameter type which bit of the TCI field is able to be used for notifying. The information notified in the second control signaling is used for determining the second information.

Information two: TCI-PresentInDCI parameter associated with the CORESET where the first control signaling is located. The TCI-PresentInDCI is used for configuring whether the TCI field exists in the DCI of the DL-Grant transmitted in the CORESET, that is, whether the indicator numbered 17 in Table 1 exists. For example, in the case where the TCI-PresentInDCI associated with the CORESET is not enabled, the TCI field does not exist in the DCI in the CORESET and the number of the bits used by the first transmission parameter does not change as whether the transmission time interval between the DCI and the PDSCH is less than the predetermined threshold K.

Information three: Whether the carrier frequencies where the signal is located are less than the predetermined threshold K. For example, in the case where the PDSCH is below 6 GHz, the mechanism in which the second information is determined according to the first information is not initiated. Alternatively, information three: the terminal transmits the frequency domain range that the terminal is able to process, and in the case where the capability of the terminal to process the frequency domain is FR1 (that is, the frequency domain range that the terminal is able to process is less than the predetermined threshold, such as less than 6 GHz), the mechanism in which the second information is determined according to the first information is not initiated.

Information four: Whether at least one CORESET configured with Spatial Rx parameters exists in a CORESET set required to be detected by the first communication node. For example, in the case where the CORESET configured with the Spatial Rx parameters does not exist in the CORESET set required to be detected by the terminal, the mechanism in which the second information is determined according to the first information is not initiated.

Information five: Whether at least one CORESET configured with Spatial Rx parameters exists in a CORESET set associated with a dedicated search space required to be detected by the first communication node. For example, in the case where the CORESET configured with the Spatial Rx parameters does not exist in the CORESET set associated with the dedicated search space required to be detected by the terminal, the mechanism in which the second information is determined according to the first information is not initiated.

Information six: Whether the CORESET having the minimum CORESET ID in the time unit closest to the signal is configured with Spatial Rx parameters. For example, in the case where the CORESET having the minimum CORESET ID in the time unit closest to the PDSCH/aperiodic CSI-RS (AP-CSI-RS) is not configured with the Spatial Rx parameters, the mechanism in which the second information is determined according to the first information is not initiated.

Information seven: Whether the CORESET having the minimum CORESET ID in the time-domain symbol closest to the signal is configured with Spatial Rx parameters. For example, in the case where the CORESET having the minimum CORESET ID in the time-domain symbol closest to the PDSCH/AP-CSI-RS is not configured with the Spatial Rx parameters, the mechanism in which the second information is determined according to the first information is not initiated.

Information eight: Whether at least one TCI state exists in the TCI state pool associated with the signal. The QCL parameter corresponding to the RS set in the TCI state includes the Spatial Rx parameter. For example, in the case where a TCI state does not exist in TCI state pool 1 configured by the RRC associated with the PDSCH, and the QCL parameter corresponding to one DL-RS in the TCI state includes the Spatial Rx parameter, the mechanism in which the second information is determined according to the first information is not initiated.

Information nine: Whether at least one TCI state exists in the activation TCI state pool associated with the signal. The QCL parameter corresponding to the RS set in the TCI state includes the Spatial Rx parameter. For example, in the case where a TCI state does not exist in the MAC-CE activation TCI state pool associated with the PDSCH or the TCI state pool formed by the TCI states that the TCI field in the DCI is able to indicate, and the QCL parameter corresponding to one DL-RS in the TCI state includes the Spatial Rx parameter, the mechanism in which the second information is determined according to the first information is not initiated.

Information ten: Information about the capability of processing the frequency domain range reported by the first communication node. For example, in the case where the frequency domain range that the terminal is able to process reported by the terminal is FR1 (that is, the frequency domain range which is able to be processed is less than 6 GHz), the mechanism in which the second information is determined according to the first information is not initiated; in the case where the frequency domain range that the terminal is able to process reported by the terminal is FR2 (that is, the frequency domain range which is able to be processed is greater than or equal to 6 GHz), the mechanism in which the second information is determined according to the first information is initiated.

Exemplary Embodiment Five

In this embodiment, the table referenced by the TCI field notified in the DCI is determined according to the relationship between the interval between the DCI and the PDSCH and the predetermined threshold K.

In an embodiment, in the case where the interval between the DCI and the PDSCH is less than the predetermined threshold K, the table referenced by the TCI in the DCI is Table 7; in the case where the interval between the DCI and the PDSCH is greater than or equal to the predetermined threshold K, the table referenced by the TCI in the DCI is Table 8. TCI state 10 to TCI state 17 and TCI state 20 to TCI state 27 are configured by different high-layer control signaling. The high-layer control signaling includes at least one of RRC signaling or MAC-CE signaling.

In an embodiment, in the case where the interval between the DCI and the PDSCH is less than K, the Spatial Rx parameter of the DMRS of the PDSCH is obtained according to an agreed rule (for example, the Spatial Rx parameter of the DMRS of the PDSCH is acquired according to the configuration of the Spatial Rx parameter of the CORESET having the minimum CORESET ID in the closest slot), and other QCL parameter information of the DMRS of the PDSCH is obtained according to the TCI field in the DCI and with reference to Table 7. Alternatively, all QCL parameters of the DMRS of the PDSCH are obtained according to information indicated by the TCI field in the DCI and with reference to Table 7, and the configuration of Table 7 is limited. In the case where the interval between the DCI and the PDSCH is greater than or equal to K, all QCL parameters of the DMRS of the PDSCH are obtained according to information indicated by the TCI field in the DCI and with reference to Table 8.

TABLE 7

| Index Value of TCI Field in DCI | Value of TCI State |
| --- | --- |
| 0 | TCI state 10 |
| 1 | TCI state 11 |
| 2 | TCI state 12 |
| 3 | TCI state 13 |
| 4 | TCI state 14 |
| 5 | TCI state 15 |
| 6 | TCI state 16 |
| 7 | TCI state 17 |

TABLE 8

| Index Value of TCI Field in DCI | Value of TCI State |
| --- | --- |
| 0 | TCI state 20 |
| 1 | TCI state 21 |
| 2 | TCI state 22 |
| 3 | TCI state 23 |
| 4 | TCI state 24 |
| 5 | TCI state 25 |
| 6 | TCI state 26 |
| 7 | TCI state 27 |

One state is used for establishing an association relationship between Q DMRS groups of the PDSCH and Q DL-RS sets, where Q is an integer greater than or equal to 1. As shown in Table 9, the association between (DMRS group1, DL-RS set1) and (DMRS group2, DL-RS set2) is established in TCI state-n, where DL-RS set1 includes {DL-RS1, DL-RS2}, and DL-RS set2 includes DL-RS3. In DMRS group1, a QCL relationship exists with respect to the QCL parameter in QCL-type1 and DL-RS 1, and each QCL-Type includes at least one of the following parameters: a Doppler shift, a Doppler spread, an average delay, a delay spread, an average gain, or a Spatial Rx parameter. The DL-RS may be the CSI-RS/Synchronization Signal and physical broadcast channel (PBCH) block (SSB)/DMRS of a PBCH, where the DMRS group may be referred to as a QCL target reference signal and the DL-RS may also be referred to as a QCL reference signal.

TABLE 9

| TCI State-n | DMRS group 1 | (DL-RS 1, QCL-Type 1) |
| --- | --- | --- |
| | | (DL-RS 2, QCL-Type 2) |
| | DMRS group 2 | (DL-RS 3, QCL-Type 1) |

In an embodiment, the QCL-Type associated with each TCI state in Table 7 includes the Spatial Rx parameter, and the DL-RS set formed by this QCL parameter has a predetermined restriction condition. The restriction condition includes at least one of the following: this DL-RS set includes only one DL-RS; each two DL-RSs in this set are of QCL with respect to the Spatial Rx parameters; the DL-RSs in this set may be received by the terminal simultaneously; this DL-RS set is an empty set; or the DL-RSs in this set belong to one group, where the group may be allocated by the base station, or may be reported by the terminal. In an embodiment, for example, the associated QCL-Type in 8 states in Table 7 includes the DL-RSs of the Spatial Rx parameter, which includes {DL-RS100, DL-RS101, DL-RS102, DL-RS103, DL-RS104, DL-RS105, DL-RS106, DL-RS107} (that is, the DMRS group in state i and DL-RS 10i satisfy the QCL relationship with respect to at least the Spatial Rx parameter, where i=0, 1, ..., 7). Each two DL-RSs in this set are of QCL with respect to the Spatial Rx parameters, or these DL-RSs may be received by the terminal simultaneously, or all the DL-RSs of the Spatial Rx parameter included in the associated QCL-Type in the 8 states in Table 7 are DL-R100, or all the QCL-Types associated with the DL-RSs in the 8 states in Table 7 do not include the Spatial Rx parameter. In this case, it is agreed that the Spatial Rx parameter of the DMRS of the PDSCH is obtained according to an agreed rule, for example, it is agreed that in this case, the DMRS of the PDSCH and the DMRS in the minimum CORESET ID are of QCL with respect to the Spatial Rx parameter.

In an embodiment, in the case where the interval between the DCI and the PDSCH is less than the predetermined threshold K, the table referenced by the TCI field included in the DCI is Table 7; in the case where the interval between the DCI and the PDSCH is greater than or equal to the predetermined threshold K, the table referenced by the TCI field in the DCI is Table 8. The configuration of the DL-RSs associated with the Spatial Rx parameter in the TCI state in Table 7 is limited, that is, one or a finite number of beams associated with these TCI states exist, so that in this case, the terminal has not decoded the DCI, and the terminal needs to know the Spatial Rx parameter of the PDSCH before the DCI is decoded. However, in Table 8, such limit does not exist. Therefore, both Table 7 and Table 8 are required.

Figure 5:
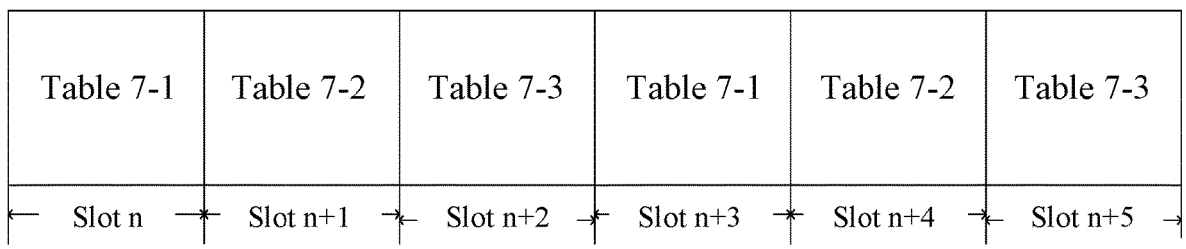
FIG. 5 is a schematic diagram illustrating that multiple tables corresponding to an index value and a transmission parameter value correspond to different time-domain positions according to an embodiment of the present application.

The configuration of Table 7 is configured through the high-layer signaling. In order to implement that different beams may be used at different times, even though the transmission time interval between the DCI and the PDSCH is less than K, multiple Tables 7 may be configured. The effective time-domain pattern of each Table 7 is configured. For example, a period and a period offset of Table 7-1 are configured, and a period and a period offset of Table 7-2 are configured. Alternatively, there are two Tables 7, Table 7-1 and Table 7-2. The period and the period offset of Table 7-1 are configured. For other slots, Table 7-2 is referenced. That is, in the case where the DCI falls into the slot shown in Table 7-1, the TCI field notified in the DCI references Table 7-1; in the case where the DCI falls into other slots, the TCI field notified in the DCI references Table 7-2. Alternatively, three Tables 7 may be configured such as Table 7-1, Table 7-2, and Table 7-3, the period and the period offset of Table 7-1 are configured, the period and the period offset of Table 7-2 may also be configured, and a period and a period offset of Table 7-3 are not configured. In the case where the DCI falls into the slot where Table 7-1 is located, the TCI field in the DCI references Table 7-1; in the case where the DCI falls into the slot where Table 7-2 is located, the TCI field in the DCI references Table 7-2; in the case where the DCI falls into other slots, the TCI field in the DCI references Table 7-3. To sum up, in the case where the interval between the DCI and the PDSCH is less than the predetermined threshold, the QCL information of the PDSCH is obtained according to the TCI indication information indicated in the DCI and with reference to the table referenced by the corresponding TCI in the slot where the PDSCH is located. FIG. 5 shows the time-domain patterns corresponding to Table 7-1 to Table 7-3. In the case where the PDSCH falls into slot n and the interval between the PDSCH and the DCI is less than the predetermined threshold K, the QCL parameter of the DMRS of the PDSCH is obtained according to the TCI information indicated in the DCI and with reference to Table 7-1; in the case where the PDSCH falls into slot n+1 and the interval between the PDSCH and the DCI is less than the predetermined threshold K, the QCL parameter of the DMRS of the PDSCH is obtained according to the TCI information indicated in the DCI and with reference to Table 7-2; in the case where the PDSCH falls into slot n and the interval between the PDSCH and the DCI is greater than or equal to the predetermined threshold K, the QCL parameter of the DMRS of the PDSCH is obtained according to the TCI information indicated in the DCI and with reference to Table 8.

Similarly, the table corresponding to the TCI parameter of the AP-CSI-RS is determined according to the relationship between the interval between the DCI and the AP-CSI-RS and the predetermined threshold.

In an exemplary embodiment, the TCI indication information is used for indicating the QCL relationship between the DMRS group/CSI-RS port group and the DL-RS set, that is, one piece of TCI index information corresponds to one state; one state includes the correspondence between Q DMRS groups and Q DL-RS sets; one DL-RS set includes one or more DL-RSs; and each DL-RS associates with one QCL parameter set, indicating that the reference signal in the DMRS group/CSI-RS port group and one DL-RS in the DL-RS set associated with the DMRS group/CSI-RS port group satisfy the QCL relationship with respect to the QCL parameter set. Two reference signals satisfy the QCL relationship with respect to one QCL parameter, indicating that the QCL parameter of one reference signal may be acquired through the QCL parameter of two reference signals. The QCL parameter includes at least one of the following parameters: a Doppler shift, a Doppler spread, an average delay, a delay spread, an average gain or a Spatial Rx parameter.

In this exemplary embodiment, two reference signals are of QCL, indicating that the two reference signals are of QCL with respect to at least the Spatial Rx parameter and whether the two reference signals are of QCL with respect to other QCL parameters is not limited.

In an exemplary embodiment, a channel may also be a signal, that is, the signal is transmitted in the channel. For example, a data signal is transmitted in a data channel.

In an exemplary embodiment, different CCs may be associated through different serving cell IDs.

Figure 9:
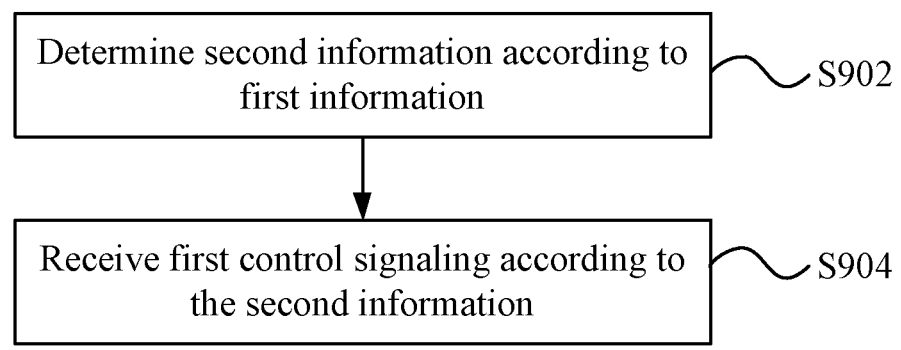
FIG. 9 is a flowchart of a method for receiving control signaling according to an embodiment of the present application.

In this embodiment, a method for receiving control signaling is further provided. FIG. 9 is a flowchart of a method for transmitting control signaling according to an embodiment of the present application. As shown in FIG. 9, this process includes step S902 and step S904 described below.

In step S902, second information is determined according to first information.

In step 904, first control signaling is received according to the second information.

The second information includes at least one of the following: the number N of bits used in a first control signaling to notify a first transmission parameter, a correspondence mapping table between an index value referenced by the first transmission parameter in the first control signaling and the value of the first transmission parameter, the type of the first transmission parameter notified by a predetermined indication field in the first control signaling, or position information of the bits used in the first control signaling to notify the first transmission parameter; and the first information includes a relationship between a transmission time interval between the first control signaling and a first signal and a predetermined threshold K, where N and K are non-negative integers.

In an embodiment, in the case where the relationship between the transmission time interval between the first control signaling and the first signal and the predetermined threshold K is a first relationship, the value of N includes N1; in the case where the relationship between the transmission time interval between the first control signaling and the first signal and the predetermined threshold K is a second relationship, the value of N includes N2, where N1 and N2 are integers.

The relationship between N1 and N2 satisfies at least one of the following: N1 is greater than N2; the difference between N1 and N2 is less than or equal to the number of bits occupied by a transmission configuration indication (TCI) field; or the difference between N1 and N2 is less than or equal to the number of bits required to notify information about a second transmission parameter.

In an embodiment, in the case where the relationship between the transmission time interval between the first control signaling and the first signal and the predetermined threshold K is the first relationship, the correspondence mapping table is a first correspondence mapping table; in the case where the relationship between the transmission time interval between the first control signaling and the first signal and the predetermined threshold K is the second relationship, the correspondence mapping table is a second correspondence mapping table.

In an embodiment, any one of the first correspondence mapping table, the second correspondence mapping table, transmission parameter value set one and transmission parameter value set two is determined in at least one of the following manners: in manner one, the content included in transmitted signaling information; or in manner two, a rule pre-agreed by a transmitting end and a receiving end. The transmission parameter value set one corresponds to a value set of the first transmission parameter included in the first correspondence mapping table and the transmission parameter value set two corresponds to a value set of the first transmission parameter included in the second correspondence mapping table.

In an implementation, in the case where the type of the first transmission parameter is a TCI, a DL-RS set formed by DL-RSs associated with Spatial Rx parameters in each state in the first correspondence mapping table includes only one DL-RS; in the case where the type of the first transmission parameter is the TCI, each two DL-RSs in the DL-RS set formed by the DL-RSs associated with the Spatial Rx parameters in each state in the first correspondence mapping table satisfy a QCL relationship with respect to the Spatial Rx parameters.

In the case where the type of the first transmission parameter is the TCI, the DL-RSs in the DL-RS set formed by the DL-RSs associated with the Spatial Rx parameters in each state in the first correspondence mapping table are able to be received by a first communication node simultaneously; in the case where the type of the first transmission parameter is the TCI, the DL-RS set formed by the DL-RSs associated with the Spatial Rx parameters in each state in the first correspondence mapping table is an empty set. The first communication node is a communication node for receiving at least one of the first signal or the first control signaling.

In an embodiment, the type of the first transmission parameter includes one or more transmission parameter types, except for a transmission parameter type of the TCI, included in the first control signaling; or the type of the first transmission parameter is a transmission parameter of the TCI.

In an embodiment, the first transmission parameter satisfies at least one of the following: the first transmission parameter is the transmission parameter of the first signal; or the first transmission parameter is the transmission parameter of a second signal.

In an embodiment, the first signal or the second signal includes at least one of the following signals: a demodulation reference signal, a measurement reference signal, a control channel signal, or a data channel signal; and the first control signaling is physical layer control signaling.

In an implementation, the first information further includes at least one piece of the following information: information included in second control signaling; information about whether a TCI-PresentInDCI corresponding to a CORESET where the first control signaling is located is enabled; a relationship between a carrier frequency where the first signal or the second signal is located and a predetermined threshold G; a supported frequency range capability fed back by the first communication node; whether the predetermined threshold K is 0; whether at least one CORESET configured with Spatial Rx parameters exists in a CORESET required to be detected by the first communication node; whether at least one CORESET configured with Spatial Rx parameters exists in a CORESET set associated with a dedicated search space required to be detected by the first communication node; whether a CORESET having the minimum CORESET ID in a time unit closest to the first signal or the second signal is configured with Spatial Rx parameters; whether a CORESET having the minimum CORESET ID in a time-domain symbol closest to the first signal or the second signal is configured with Spatial Rx parameters; whether at least one TCI state exists in a TCI state pool associated with the first signal or the second signal, where a QCL parameter corresponding to an RS set in the TCI state includes a Spatial Rx parameter; or whether at least one TCI state exists in an activation TCI state pool associated with the first signal or the second signal, where the QCL parameter corresponding to the RS set in the TCI state includes a Spatial Rx parameter. The first communication node is a communication node for receiving at least one of the first signal or the second signal.

In an embodiment, in the case where the relationship between the transmission time interval between the first control signaling and the first signal and the predetermined threshold K is the first relationship, the type of the first transmission parameter notified by the predetermined indication field in the first control signaling is a first type of transmission parameter; in the case where the relationship between the transmission time interval between the first control signaling and the first signal and the predetermined threshold K is the second relationship, the type of the first transmission parameter notified by the predetermined indication field in the second control signaling is a second type of transmission parameter.

In an embodiment, in the case where the transmission time interval between the first control signaling and the first signal is less than the predetermined threshold K, the relationship between the transmission time interval between the first control signaling and the first signal and the predetermined threshold K is the first relationship; in the case where the transmission time interval between the control signaling and the first signal is greater than or equal to the predetermined threshold K, the relationship between the transmission time interval between the first control signaling and the first signal and the predetermined threshold K is the second relationship. Alternatively, in the case where the transmission time interval between the control signaling and the first signal is less than or equal to the predetermined threshold K, the relationship between the transmission time interval between the first control signaling and the first signal and the predetermined threshold K is the first relationship; in the case where the transmission time interval between the control signaling and the first signal is greater than the predetermined threshold K, the relationship between the transmission time interval between the first control signaling and the first signal and the predetermined threshold K is the second relationship. Alternatively, in the case where the transmission time interval between the control signaling and the first signal is greater than or equal to the predetermined threshold K, the relationship between the transmission time interval between the first control signaling and the first signal and the predetermined threshold K is the first relationship; in the case where the transmission time interval between the control signaling and the first signal is less than the predetermined threshold K, the relationship is the second relationship.

According to the description of the preceding implementations, it is apparent to those skilled in the art that the methods in the preceding embodiments may be implemented by software plus a necessary general-purpose hardware platform, or may of course be implemented by hardware. However, in many cases, the former is a preferred implementation. Based on this understanding, the technical solution of the present application substantially, or the part contributing to the related art, may be embodied in the form of a software product. The computer software product is stored on a storage medium (such as a read-only memory (ROM)/random-access memory (RAM), a magnetic disk or an optical disk) and includes several instructions for enabling a terminal device (which may be a mobile phone, a computer, a server or a network device) to execute the methods in the embodiments of the present application.

Embodiment Two

In this embodiment, a method for determining information is provided. FIG. 10 is a flowchart of a method for determining information according to an embodiment of the present application. As shown in FIG. 10, this process includes step S1002 described below.

In step S1002, second information is determined according to first information.

The second information includes at least one of the following: a QCL parameter of a first signal, a manner of transmitting the first signal at a time-domain position where a second signal is located, or a manner of receiving the first signal at the time-domain position where the second signal is located; and the first information includes at least one piece of the following information: whether the second signal exists in a predetermined time window after a specified CORESET, a relationship between an interval and a predetermined threshold X1, where the interval is an interval between the first signal and a specified CORESET; a relationship between a time interval between the second signal and a specified CORESET and a predetermined threshold X2, a relationship between a time interval between the first signal and first control signaling and the predetermined threshold X1, a relationship between a time interval between the second signal and second control signaling and the predetermined threshold X2, or a relationship between a first Spatial Rx parameter corresponding to the first signal and a second Spatial Rx parameter corresponding to the second signal, where X1 and X2 are real numbers.

The specified CORESET denotes a predetermined CORESET, that is, the specified CORESET denotes a CORESET obtained according to a predetermined rule.

In the preceding step S1002, the second information is determined according to the first information, where the second information includes at least one of the following: the QCL parameter of the first signal, the manner of transmitting the first signal at the time-domain position where the second signal is located, or the manner of receiving the first signal at the time-domain position where the second signal is located; and the first information includes at least one piece of the following information: whether the second signal exists in the predetermined time window after the specified CORESET, the relationship between the interval between the first signal and the specified CORESET and the predetermined threshold X1, the relationship between the time interval between the second signal and the specified CORESET and the predetermined threshold X2, the relationship between the time interval between the first signal and the first control signaling and the predetermined threshold X1, the relationship between the time interval between the second signal and the second control signaling and the predetermined threshold X2, or the relationship between the first Spatial Rx parameter corresponding to the first signal and the second Spatial Rx parameter corresponding to the second signal, where X1 and X2 are real numbers. In an embodiment, the first signal is transmitted or received according to the determined second information. That is, the issue of multiplexing between two signals or the issue of receiving the two signals is determined through the signal and the control channel resource, or the relationship between the time interval between the signal and the control signaling scheduling the signal and the predetermined threshold. In this way, the following defects are overcome: in the related art, a delay exists when the terminal detects the control signaling; and the signal cannot be received correctly due to the limited radio frequency beams generated at the same time.

In an embodiment, the preceding step may, but is not limited to, be executed by a base station.

In an embodiment, at least one of the format of the first control signaling or the format of the second control signaling may be determined in conjunction with the method described in the preceding embodiment one.

In an embodiment, the first control signaling is physical layer dynamic control signaling scheduling the first signal and the second control signaling is physical layer dynamic control signaling scheduling the second signal.

In an implementation, the specified CORESET satisfies at least one of the following characteristics: the CORESET is a CORESET having the minimum CORESET ID in the time-domain symbol closest to the first signal; the CORESET is a CORESET having the minimum CORESET ID in the time unit closest to the first signal; in the CORESET, the terminal needs to detect at least one piece of DCI scheduling a downlink signal or a channel; the CORESET does not include information about control signaling scheduling the first signal; the CORESET includes information about control signaling scheduling the second signal; the CORESET is associated with at least one dedicated search space; the CORESET is a CORESET having the minimum CORESET ID in all CCs in the time unit closest to at least one of the first signal or the second signal; the CORESET is a CORESET having the minimum CORESET ID in a predetermined CC in the time unit closest to at least one of the first signal or the second signal; the CORESET is a CORESET having the minimum CORESET ID in a predetermined CC group in the time unit closest to at least one of the first signal or the second signal; or the CORESET is a CORESET in M predetermined time-domain symbols in a time unit, where M is less than or equal to the number of the time-domain symbols included in the time unit.

In an embodiment, in the case where the time interval between the first signal and the CORESET is less than the predetermined threshold X1, the QCL parameter of the first signal is acquired according to a QCL parameter of the CORESET; in the case where the interval between the first signal and the CORESET is greater than or equal to the predetermined threshold X1, the QCL parameter of the first signal is acquired according to a QCL parameter configured in configuration information of the first signal.

In an embodiment, in the case where the interval between the first signal and the CORESET is less than the predetermined threshold X1, the priority of the QCL parameter of the first signal is higher than the priority of the QCL parameter of the second signal; in the case where the interval between the first signal and the CORESET is greater than or equal to the predetermined threshold X1, the priority of the QCL parameter of the first signal is lower than the priority of the QCL parameter of the second signal.

In an embodiment, in the case where the interval between the first signal and the CORESET is less than the predetermined threshold X1, a manner of frequency-division multiplexing is not allowed to be adopted between the first signal and the second signal; in the case where the interval between the first signal and the CORESET is greater than or equal to the predetermined threshold X1, the manner of frequency-division multiplexing is allowed to be adopted between the first signal and the second signal.

In an embodiment, at least one of the first signal or the second signal includes at least one of the following signals: a downlink measurement reference signal, a downlink synchronization signal, a downlink demodulation reference signal, a downlink data channel signal, or a downlink control channel signal.

In an embodiment, the predetermined threshold X1 is equal to the predetermined threshold X2; and/or the QCL parameter of the second signal is determined according to the relationship between the interval between the control information scheduling the second signal and the second signal and the predetermined threshold X2.

In an embodiment, the first signal satisfies at least one of the following characteristics: the first signal is a downlink signal scheduled by physical layer dynamic control signaling; the first signal is a downlink physical control channel signal; or the interval between the control signaling scheduling the first signal and the first signal is less than the predetermined threshold X1.

In an embodiment, the second signal satisfies at least one of the following characteristics: the control signaling scheduling the second signal is before the time-domain symbol where the first signal is located; the interval between the control signaling scheduling the second signal and the time-domain symbol where the first signal is located is greater than or equal to a predetermined threshold X3; the interval between the control signaling scheduling the second signal and the starting time-domain symbol where the second signal is located is greater than or equal to the predetermined threshold X3; the second signal is a downlink signal scheduled by the physical layer dynamic control signaling; or the second signal is a periodic downlink measurement reference signal, where X3 is a real number.

In an embodiment, the control signaling includes at least one piece of the following signaling: physical layer control signaling, MAC-CE control signaling, or RRC signaling.

In an embodiment, in the case where the second signal exists in the predetermined time window after the CORESET, the QCL parameter of the first signal is determined according to the QCL parameter of the second signal; in the case where the second signal does not exist in the predetermined time window after the CORESET, the QCL parameter of the first signal is not determined according to the QCL parameter of the second signal; and/or in the case where the second signal exists in the predetermined time window after the CORESET and the interval between the first signal and the control signaling scheduling the first signal is less than the predetermined threshold X1, the QCL parameter of the first signal is not acquired according to the QCL parameter of the CORESET; in the case where the second signal does not exist in the predetermined time window after the CORESET and the interval between the first signal and the control signaling scheduling the first signal is less than the predetermined threshold X1, the QCL parameter of the first signal is acquired according to the QCL parameter of the CORESET.

In an embodiment, the first signal and the second signal satisfy at least one of the following characteristics: the Spatial Rx parameter of the second signal is different from the Spatial Rx parameter of the first signal; a spatial filter corresponding to the Spatial Rx parameter of the second signal and a spatial filter corresponding to the Spatial Rx parameter of the first signal are unable to be generated by the first communication node simultaneously; the second signal and the first signal belong to different CCs; an intersection between the time-domain position where the first signal is located and the time-domain position where the second signal is located is a non-empty set; the first signal and the second signal are located at the same time-domain position; or the priority of the second signal is higher than the priority of the first signal.

In an embodiment, in the case where the second information is the QCL parameter of the first signal, the step in which the second information is determined according to the first information includes the following step: at least one piece of the following information is determined according to the first information: the priority between the QCL parameter of the first signal and the QCL parameter of the second signal; the priority between the QCL parameter configured in the configuration information of the first signal and the QCL parameter of the specified CORESET; or in the case where the interval between the first signal and the control signaling scheduling the first signal is less than the predetermined threshold X1, whether the QCL parameter of the first signal is acquired according to the QCL parameter of the specified CORESET.

In an embodiment, in the case where the second information is the manner of receiving the first signal at the time-domain position where the second signal is located, the step in which the second information is determined according to the first information includes the following step: at least one piece of the following information is determined according to the first information: whether the first signal is received at the time-domain position where the second signal is located; whether a control channel is detected at the time-domain position where the second position is located; at the time-domain position where the second signal is located, the priority between the QCL parameter of the first signal and the QCL parameter of the second signal; whether frequency-division multiplexing is applicable between the first signal and the second signal; or whether the time-domain position where the first signal is able to be located includes the time-domain position where the second signal is located.

In an embodiment, in the case where the second information is the manner of transmitting the first signal at the time-domain position where the second signal is located, the step in which the second information is determined according to the first information includes the following step: at least one piece of the following information is determined according to the first information: whether the first signal is transmitted at the time-domain position where the second signal is located; whether a control channel is transmitted at the time-domain position where the second position is located; at the time-domain position where the second signal is located, the priority between the QCL parameter of the first signal and the QCL parameter of the second signal; whether frequency-division multiplexing is applicable between the first signal and the second signal; or whether the time-domain position where the first signal is able to be located includes the time-domain position where the second signal is located.

In an embodiment, the time-domain position where the second signal is located includes at least one of the following time-domain positions: the time-domain symbol where the second signal is located; or the time unit where the second signal is located.

In an embodiment, the method further includes the following step: a configuration satisfying the following characteristics is not received: in the case where the interval between the first control signaling scheduling the first signal and the first signal is greater than or equal to the predetermined threshold X1, and the interval between the second control signaling scheduling the second signal and the second signal is greater than or equal to the predetermined threshold X2, the first signal and the second signal do not satisfy a QCL relationship with respect to a Spatial Rx parameter; in the case where the interval between the first control signaling scheduling the first signal and the first signal is less than the predetermined threshold X1, and the interval between the second control signaling scheduling the second signal and the second signal is greater than or equal to the predetermined threshold X2, the QCL parameter of the first signal is determined according to the QCL parameter of the second signal; or in the case where the interval between the first control signaling scheduling the first signal and the first signal is less than the predetermined threshold X1, and the interval between the second control signaling scheduling the second signal and the second signal is less than the predetermined threshold X2, the priority of the QCL parameter of the first signal and the priority of the QCL parameter of the second signal are acquired according to an agreed rule or signaling information.

In an embodiment, the first information further includes at least one piece of the following information: whether the control signaling included in the specified CORESET includes a TCI field; a relationship between a carrier frequency where at least one of the first signal or the second signal is located and a predetermined threshold G; whether at least one of the predetermined threshold X1 or the predetermined threshold X2 is 0; whether at least one CORESET configured with Spatial Rx parameters exists in a specified CORESET; whether at least one CORESET configured with Spatial Rx parameters exists in a CORESET set required to be detected by the first communication node; whether at least one TCI state exists in a TCI state pool associated with the first signal or the second signal, where the QCL parameter corresponding to an RS set in the TCI state includes a Spatial Rx parameter; or whether at least one TCI state exists in an activation TCI state pool associated with the first signal or the second signal, where the QCL parameter corresponding to the RS set in the TCI state includes a Spatial Rx parameter. The first communication node is a communication node for receiving the first signal.

In an embodiment, in the case where the first information is the relationship between the first Spatial Rx parameter corresponding to the first signal and the second Spatial Rx parameter corresponding to the second signal, the step in which the second information is determined according to the first information includes at least one of the following manners: in the case where the first signal and the second signal satisfy the QCL relationship with respect to Spatial Rx parameters, the time-domain symbol where the first signal is able to be located includes the time-domain symbol where the second signal is located; in the case where the first signal and the second signal do not satisfy the QCL relationship with respect to the Spatial Rx parameters, the time-domain symbol where the first signal is able to be located does not include the time-domain symbol where the second signal is located; in the case where a spatial filter corresponding to the first Spatial Rx parameter and a spatial filter corresponding to the second Spatial Rx parameter are able to be generated by the first communication node simultaneously, the time-domain symbol where the first signal is able to be located includes the time-domain symbol where the second signal is located; or in the case where the spatial filter corresponding to the first Spatial Rx parameter and the spatial filter corresponding to the second Spatial Rx parameter are unable to be generated by the first communication node simultaneously, the time-domain symbol where the first signal is able to be located does not include the time-domain symbol where the second signal is located.

It is to be noted that, the case that the time-domain symbol where the first signal is able to be located does not include the time-domain symbol where the second signal is located may be that in the time-domain symbol where the second signal is located, the first signal is not transmitted and/or received for rate matching.

In an embodiment, in the case where the first information is the relationship between the time interval between the first signal and the first control signaling and the predetermined threshold X1 and the second information is the QCL parameter of the first signal, the step in which the second information is determined according to the first information includes at least one of the following: it is determined that QCL parameters of the first signal are same across different time-domain symbols in one time unit; it is determined that QCL parameters of the first signal are able to be different across different time units; a correspondence exists between B1 sets of QCL parameters of the first signal and A time units; the QCL parameter of the first signal in each time unit of the A time units where the first signal is located is acquired according to a QCL parameter of a CORESET having a predetermined characteristic in a time unit closest to the each time unit; or in the A time units where the first signal is located, the QCL parameter of the first signal in each time unit is determined according to the relationship between the time interval between the first signal in the each time unit and the first control signaling and the predetermined threshold X1, where the first signal is in the A time units, A is a natural number greater than 1, and B1 is a non-negative integer less than or equal to A.

It is to be noted that the preceding time unit may be a slot, or may be a subframe or another time unit.

In an embodiment, in the case where the first information is the relationship between the time interval between the first signal and the first control signaling and the predetermined threshold X1, and the second information is the QCL parameter of the first signal, the step in which the second information is determined according to the first information includes at least one of the following: the QCL parameter of the first signal is determined according to the relationship between the time interval between the first signal in the first unit of A time units and the first control signaling and the predetermined threshold X1, where QCL parameters of the first signal in the A time units keep unchanged; the QCL parameter of the first signal in each time unit of A1 time units where the first signal is located is acquired according to a QCL parameter of a CORESET having a predetermined characteristic in a time unit closest to the each time unit, where the interval between the first control signaling and the first signal in a last time unit of the A1 time units is less than the predetermined threshold X1; QCL parameters of the first signal in A2 time units where the first signal is located are kept unchanged; a correspondence exists between B2 sets of QCL parameters of the first signal and the A2 time units; or in the A2 time units where the first signal is located, the QCL parameters of the first signal are kept unchanged, and the QCL parameters of the first signal in the A2 time units are determined according to information notified in the first control signaling, where the interval between the first control signaling and the first signal in the first unit of the A2 time units is greater than or equal to the predetermined threshold X1, where the first signal is in the A time units, A is a natural number greater than 1, A1 and A2 are non-negative integers less than or equal to the value of A, and B2 is a non-negative integer less than or equal to A2.

The present embodiment will be described below by way of example in conjunction with exemplary embodiments.

Exemplary Embodiment Six

In the present embodiment, the base station and the terminal agree that multiple downlink signals in the same time-domain symbol satisfy the QCL relationship, that is, the terminal does not desire that the multiple downlink signals configured in the same time-domain symbol by the base station do not satisfy the QCL relationship; or each two of the multiple downlink signals in the same time-domain symbol satisfy the QCL relationship.

The multiple downlink signals include at least two signals of the following signals: a PDSCH data signal, a CORESET, a downlink measurement reference signal, or multiple downlink signals of the CC. For example, the terminal does not desire to receive that the downlink signals not satisfying the following configurations are in the same time-domain symbol: the multiple downlink signals do not satisfy the QCL relationship; or the multiple downlink signals in the same time-domain symbol and the DMRS of the minimum CORESET ID do not satisfy the QCL relationship.

Figure 6A:
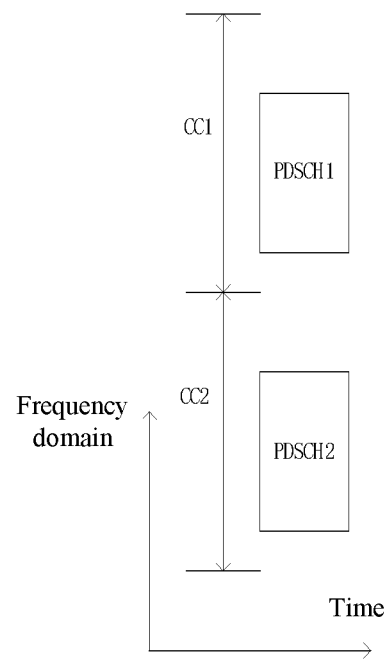
FIG. 6a is a schematic diagram illustrating that two PDSCHs of different component carriers (CCs) are of QCL according to an embodiment of the present application.
Figure 6B:
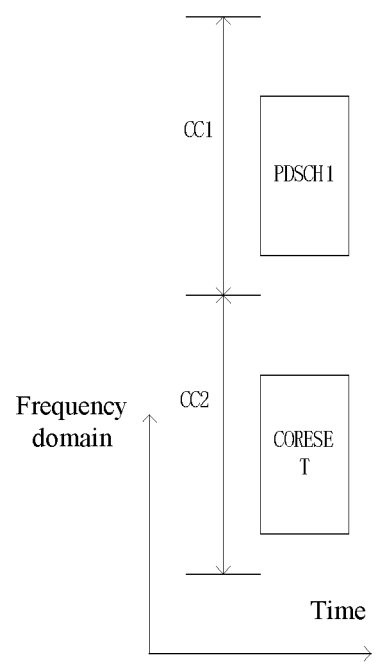
FIG. 6b is a schematic diagram illustrating that a PDSCH and a CORESET of different CCs are of QCL according to an embodiment of the present application.
Figure 6C:
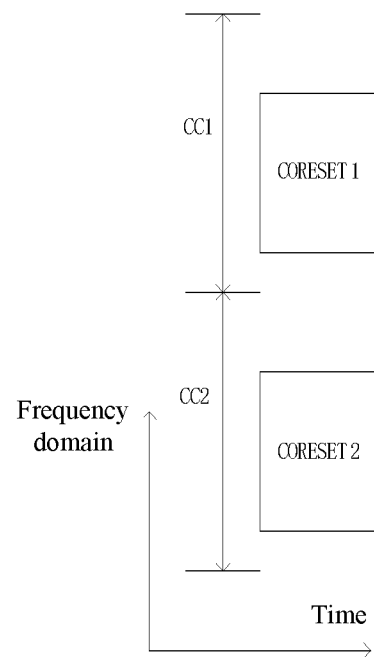
FIG. 6c is a schematic diagram illustrating that two CORESETs of different CCs are of QCL according to an embodiment of the present application.
Figure 6D:
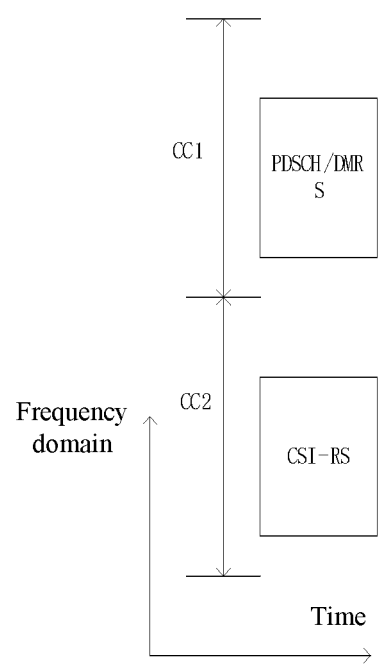
FIG. 6d is a schematic diagram illustrating that a PDSCH and a CSI-RS of different CCs are of QCL according to an embodiment of the present application.

As shown in FIG. 6a, the terminal desires that the DMRSs of two PDSCHs belonging to different CCs and configured at the same time need to satisfy the QCL relationship. As shown in FIG. 6b, the terminal desires that the PDSCH/DMRS in CC1 and the DMRS of the CORESET in CC2 configured at the same time satisfy the QCL relationship. As shown in FIG. 6c, the terminal desires that the DMRSs of two CORESETs belonging to different CCs configured at the same time need to satisfy the QCL relationship. As shown in FIG. 6d, the terminal desires that the PDSCH/DMRS in CC1 and the DMRS of the CORESET in CC2 configured at the same time need to satisfy the QCL relationship.

Figure 7A:
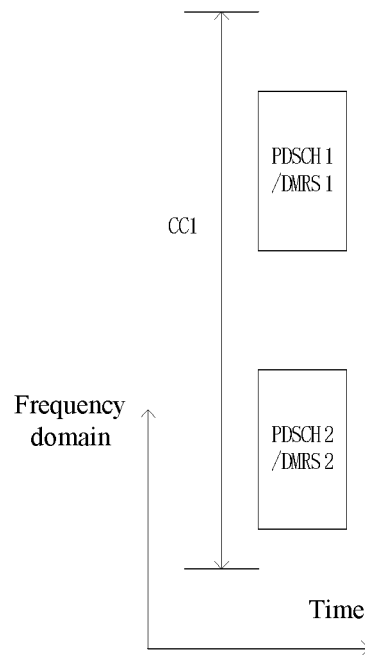
FIG. 7a is a schematic diagram illustrating that two PDSCHs belonging to the same CC are of QCL according to an embodiment of the present application.
Figure 7B:
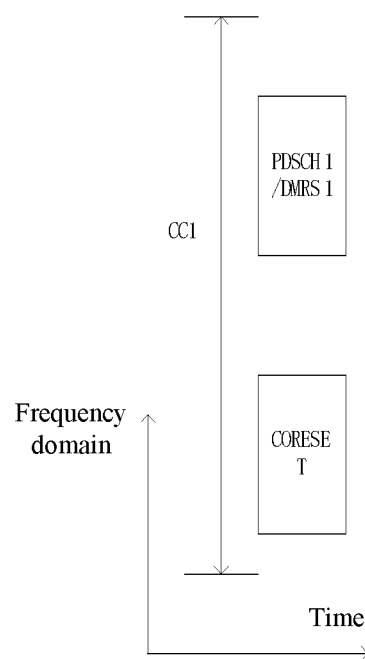
FIG. 7b is a schematic diagram illustrating that a PDSCH and a CORESET belonging to the same CC are of QCL according to an embodiment of the present application.
Figure 7C:
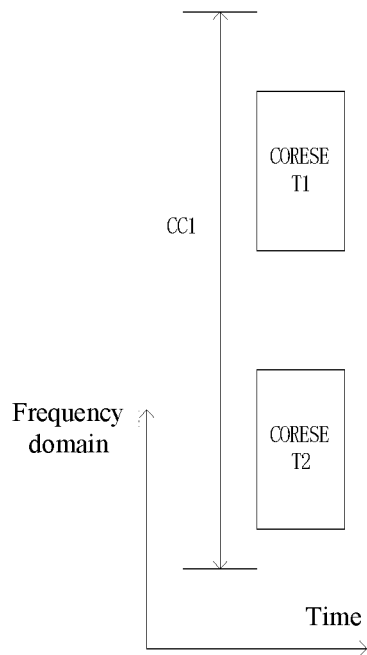
FIG. 7c is a schematic diagram illustrating that two CORESETs belonging to the same CC are of QCL according to an embodiment of the present application.
Figure 7D:
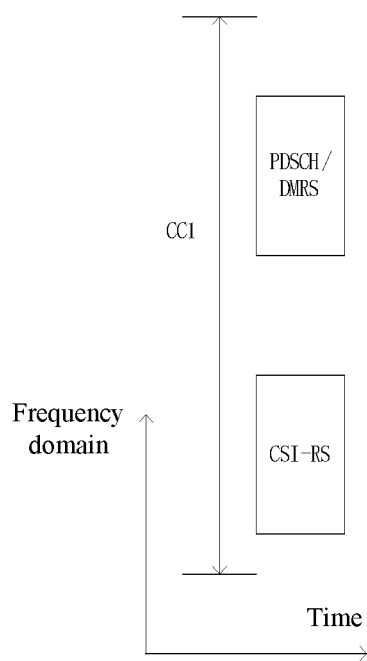
FIG. 7d is a schematic diagram illustrating that a PDSCH and a CSI-RS belonging to the same CC are of QCL according to an embodiment of the present application.
Figure 7E:
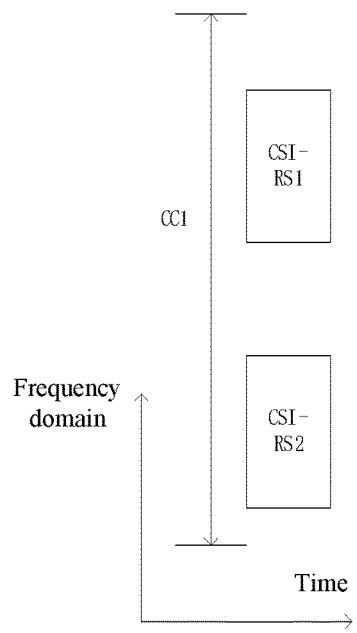
FIG. 7e is a schematic diagram illustrating that two CSI-RSs belonging to the same CC are of QCL according to an embodiment of the present application.

FIGS. 6a to 6d show that multiple downlink signals belonging to different CCs need to satisfy the QCL relationship. FIGS. 7a to 7d show that multiple downlink signals belonging to the same CC need to satisfy the QCL relationship. FIG. 7e shows that two CSI-RSs in one CC need to satisfy the QCL relationship. Similarly, CSI-RSs from different CCs in the same time-domain symbol need to be of QCL with respect to at least a Spatial Rx parameter.

In an embodiment, the minimum CORESET ID satisfies at least one of the following characteristics: the minimum CORESET ID is the minimum CORESET ID in a time-domain symbol closest to the time-domain symbol; the minimum CORESET ID is the minimum CORESET ID in a slot closest to the time-domain symbol; or the interval between the CORESET and the time-domain symbol is less than the predetermined threshold K.

In this embodiment, different CCs may correspond to different serving cell IDs.

Exemplary Embodiment Seven

In this exemplary embodiment, according to the relationship between the interval between the first signal and the specified CORESET and the predetermined threshold, at least one piece of the following information is determined: the QCL parameter of the first signal; the priority between the QCL parameter of the first signal and the QCL parameter of the second signal, where the first signal and the second signal are in the same time-domain symbol; the priority between the QCL parameter of the first signal and the QCL parameter of the specified CORESET; or whether frequency-division multiplexing is applicable between the first signal and the second signal in the same time-domain symbol.

In an embodiment, the specified CORESET satisfies at least one of the following characteristics: the CORESET is a CORESET having the minimum CORESET ID in a time-domain symbol closest to the downlink signal; the CORESET is a CORESET having the minimum CORESET ID in a slot closest to the downlink signal; in the CORESET, the terminal needs to detect at least one piece of DCI scheduling a downlink signal or a channel; the CORESET does not include the information about the control signaling scheduling the first signal; the CORESET includes the information about the control signaling scheduling the second signal; or the CORESET is associated with at least one dedicated search space.

In an embodiment, in the case where the interval between the first signal and the CORESET is less than the predetermined threshold, the QCL parameter of the first signal is acquired according to the QCL parameter of the CORESET; in the case where the interval between the first signal and the minimum CORESET ID is greater than or equal to the predetermined threshold, the QCL parameter of the first signal is acquired according to a QCL parameter configured in configuration information of the downlink signal.

In an embodiment, in the case where the interval between the first signal and the CORESET is less than the predetermined threshold, the priority of the QCL parameter of the first signal is higher than the priority of the QCL parameter of the second signal; in the case where the interval between the first signal and the CORESET is greater than or equal to the predetermined threshold, the priority of the QCL parameter of the first signal is lower than the priority of the QCL parameter of the second signal.

In an embodiment, in the case where the interval between the first signal and the CORESET is less than the predetermined threshold, frequency-division multiplexing is inapplicable between the first signal and the second signal; in the case where the interval between the first signal and the CORESET is greater than or equal to the predetermined threshold, frequency-division multiplexing is applicable between the first signal and the second signal.

The QCL parameter includes at least one of the following parameters: a Doppler shift, a Doppler spread, an average delay, a delay spread, an average gain, or a Spatial Rx parameter.

In an embodiment, the first signal includes at least one of the following signals: a downlink measurement reference signal, a downlink synchronization signal, a downlink demodulation reference signal, a downlink data channel signal, or a downlink control channel signal.

In an embodiment, the second signal includes at least one of the following signals: a downlink measurement reference signal, a downlink synchronization signal, a downlink demodulation reference signal, a downlink data channel signal, or a downlink control channel signal.

In an embodiment, the predetermined threshold is equal to the second predetermined threshold, where the QCL parameter of the second signal is determined according to the relationship between the interval between the second signal and the control information scheduling the second signal and the second predetermined threshold.

In an embodiment, in the related NR, it is stipulated that in the case where the interval between the DCI and the PDSCH is less than the predetermined threshold K, the PDSCH is received by using the Spatial Rx parameter of the minimum CORESET ID in the closest slot. When the terminal caches the PDSCH, the DCI is not decoded so that the PDSCH needs to be cached by using a known beam. The PDSCH may be stored at any position in a time window of K time-domain symbols after the DCI. In this case, the terminal needs to cache PDSCHs in the time window of the K time-domain symbols after the DCI by using the beam in the minimum CORESET ID. However, it is possible that these potential PDSCHs do not exist actually, and the terminal still needs to cache these PDSCHs. The problem is that if a periodic CSI-RS exists in this time window and a Spatial Rx parameter of the periodic CSI-RS are different from a Spatial Rx parameter of the PDSCH required to be cached by the terminal, the priority between the Spatial Rx parameter of the periodic CSI-RS and the Spatial Rx parameter of the PDSCH required to be cached by the terminal needs to be determined.

In manner one, the base station and the terminal agree that at least one of the Spatial Rx parameter of the downlink signal or the Spatial Rx parameter of the downlink channel in this time window is determined based on the Spatial Rx parameter of the CORESET having the minimum CORESET ID, and other QCL parameters of at least one of the downlink signal or the channel are also determined based on the minimum CORESET ID, or other QCL parameters are obtained according to configuration information of the downlink signal or the channel, for example, other QCL parameters are obtained according to the configuration information of the QCL parameter in the configuration information of the periodic CSI-RS.

In manner two, the base station and the terminal agree that in the case where the interval between the periodic CSI-RS and the CORESET having the minimum CORESET ID in the closest slot is less than the predetermined threshold K, the priority of the QCL parameter which is at least a Spatial Rx parameter of the periodic CSI-RS is higher than the priority of the Spatial Rx parameter of the potential PDSCH in the same time-domain symbol; in the case where the interval between the periodic CSI-RS and the CORESET having the minimum CORESET ID in the closest slot is greater than or equal to the predetermined threshold K, the priority of the Spatial Rx parameter of the PDSCH in the same time-domain symbol is higher than the priority of the Spatial Rx parameter of the CSI-RS in the same time-domain symbol.

Figure 2:
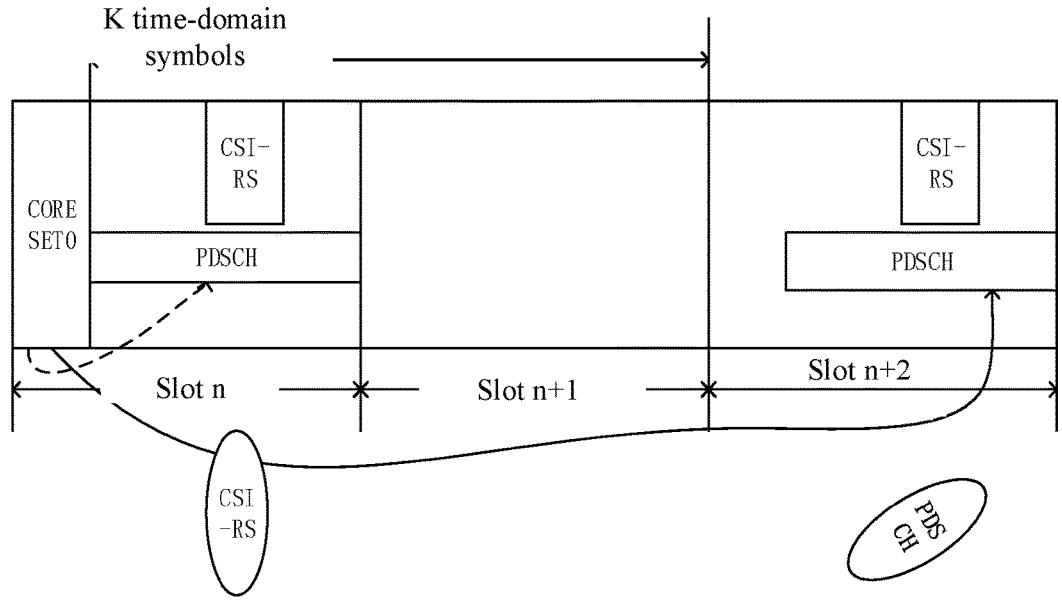
FIG. 2 is a schematic diagram illustrating that at least a Spatial Rx parameter of a periodic CSI-RS is determined according to a relationship between a predetermined threshold and a distance between the periodic CSI-RS and a CORESET having the minimum CORESET ID and closest to the periodic CSI-RS according to an embodiment of the present application.
Figure 3:
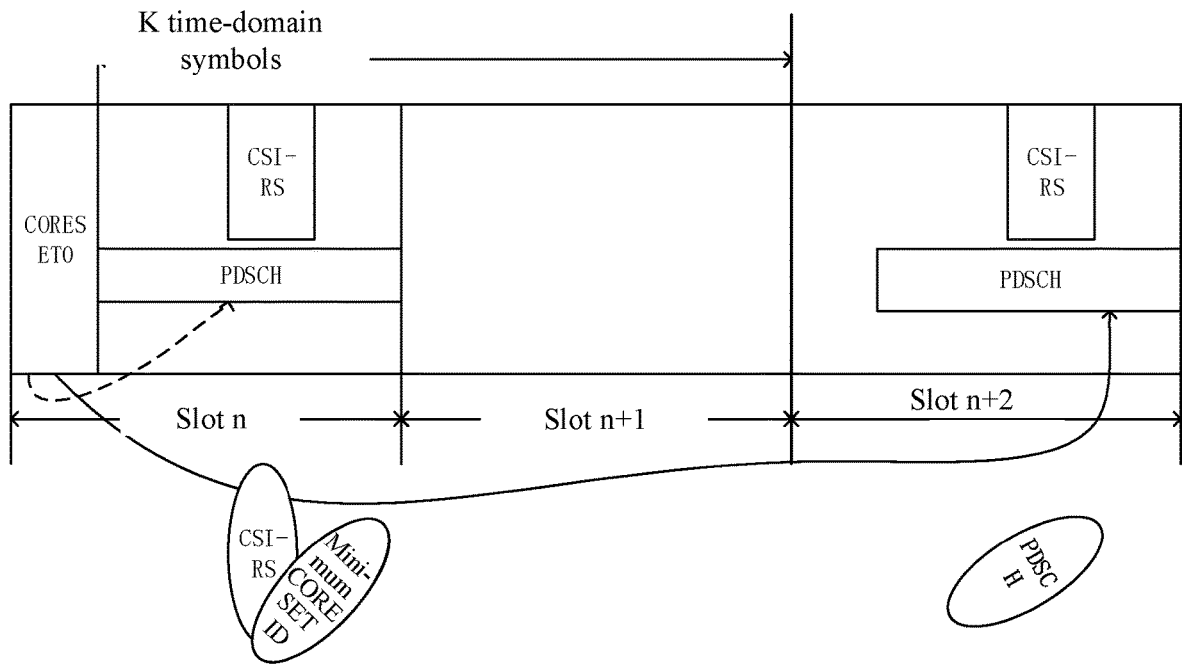
FIG. 3 is a schematic diagram illustrating that the priority of at least a Spatial Rx parameter of a periodic CSI-RS and a PDSCH is determined according to a relationship between a predetermined threshold and a distance between the periodic CSI-RS and a CORESET having the minimum CORESET ID and closest to the periodic CSI-RS according to an embodiment of the present application.

As shown in FIG. 2, the CORESET having the minimum CORESET ID in a slot closest to the periodic CSI-RS in slot n is CORESET 0 in slot n. In the case where the PDSCH and the CSI-RS in slot n are in the same time-domain symbol, the CSI-RS and the PDSCH are received by using the beam of the CSI-RS, that is, in this case, the priority of the Spatial Rx parameter of the PDSCH is lower than the priority of the Spatial Rx parameter of the periodic CSI-RS. In this case, in the case where the symbol of the periodic CSI-RS does not exist in slot n, in one manner, the PDSCH is received by using the Spatial Rx parameter of the periodic CSI-RS so that the number of times of switching the beam by the terminal in slot n is reduced; or the terminal and the base station agree that in the case where the time-domain symbol of the CSI-RS does not exist in slot n, the PDSCH is received by using the beam of the CORESET closest to the PDSCH, as shown in FIG. 3.

The minimum CORESET ID in the slot closest to the periodic CSI-RS in slot n+2 is still CORESET0 in slot n (in slot n+1 and slot n+2, the terminal does not need to detect the CORESET). In this case, the interval between the periodic CSI-RS in slot n+2 and CORESET0 is greater than the predetermined threshold, and in slot n+2, if the PDSCH and the CSI-RS are in the same time-domain symbol, then the PDSCH and the CSI-RS are received by using the beam of the PDSCH. That is, in this case, the priority of the Spatial Rx parameter of the PDSCH is higher than the priority of the Spatial Rx parameter of the periodic CSI-RS. Alternatively, in slot n+2, in the case where the receive beam of the PDSCH and the receive beam of the CSI-RS conflicts, where the PDSCH and the CSI-RS are in the same time-domain symbol, the measurement of the CSI-RS is given up. In slot n, when the terminal needs to cache the PDSCH scheduled by CORESET0, the DCI is not decoded, so that the PDSCH may be not exist, and then in this case, the periodic CSI-RS needs to be received in priority; in slot n+2, the terminal has decoded the DCI corresponding to the PDSCH that the terminal needs to cache, and then in this case, the PDSCH is determined by the terminal as having been scheduled by the base station.

Exemplary Embodiment Eight

In this embodiment, the second information is determined according to the first information, where the second information includes at least one piece of the following information: the QCL parameter of the first signal, whether a control channel is detected in the first signal, whether the first signal is received, or the time-domain symbol position where the first signal is able to be located; and the first information includes the following information: whether the second signal exists in a predetermined time window after the specified CORESET.

In an embodiment, the specified CORESET satisfies at least one of the following characteristics: the CORESET is a CORESET having the minimum CORESET ID in a time-domain symbol closest to the second signal; the specified CORESET is a CORESET having the minimum CORESET ID in a slot closest to the second signal; in the CORESET, the terminal needs to detect at least one piece of DCI scheduling a downlink signal or a channel; the CORESET is a CORESET having the minimum CORESET ID in a time-domain symbol closest to the first signal; or the specified CORESET is a CORESET having the minimum CORESET ID in a slot closest to the first signal.

In an embodiment, the first signal includes at least one of the following signals: an aperiodic downlink measurement reference signal, a downlink data channel signal scheduled by physical layer dynamic control signaling, a downlink signal scheduled by physical layer dynamic control signaling, or a downlink physical control channel signal.

In an embodiment, the second signal satisfies at least one of the following characteristics: the second signal is a previously scheduled signal; the second signal is a periodic downlink measurement reference signal; the second signal is an aperiodic downlink measurement reference signal, where the interval between the DCI scheduling an aperiodic measurement reference signal and the aperiodic measurement reference signal is greater than or equal to a predetermined threshold; the second signal is a semi-continuous PDSCH, where the interval between the DCI for activating semipersistent scheduling PDSCH (SPS-PDSCH) and the SPS-PDSCH is greater than or equal to the predetermined threshold; or the second signal is a dynamically-scheduled PDSCH, where the interval between the DCI dynamically scheduling the PDSCH and the PDSCH is greater than or equal to the predetermined threshold.

In an embodiment, in the case where the second signal exists in the predetermined time window after the specified CORESET, the QCL parameter of the first signal is acquired according to the QCL parameter of the second signal; in the case where the second signal does not exist in the predetermined time window after the specified CORESET, the QCL parameter of the first signal is not acquired according to the QCL parameter of the second signal.

In an embodiment, in the time-domain symbol where the second signal is located, it is agreed with a second communication node that the first signal does not exist.

In an embodiment, in the time-domain symbol where the second signal is located, it is agreed with the second communication node that the control channel is not detected in the first signal.

In an embodiment, the Spatial Rx parameter of the second signal and the Spatial Rx parameter of the first signal are different, or the spatial filter corresponding to the Spatial Rx parameter of the second signal and the spatial filter corresponding to the Spatial Rx parameter of the first signal are unable to be generated by the first communication node simultaneously.

In an embodiment, the second signal and the first signal belong to different CCs.

Figure 1A:
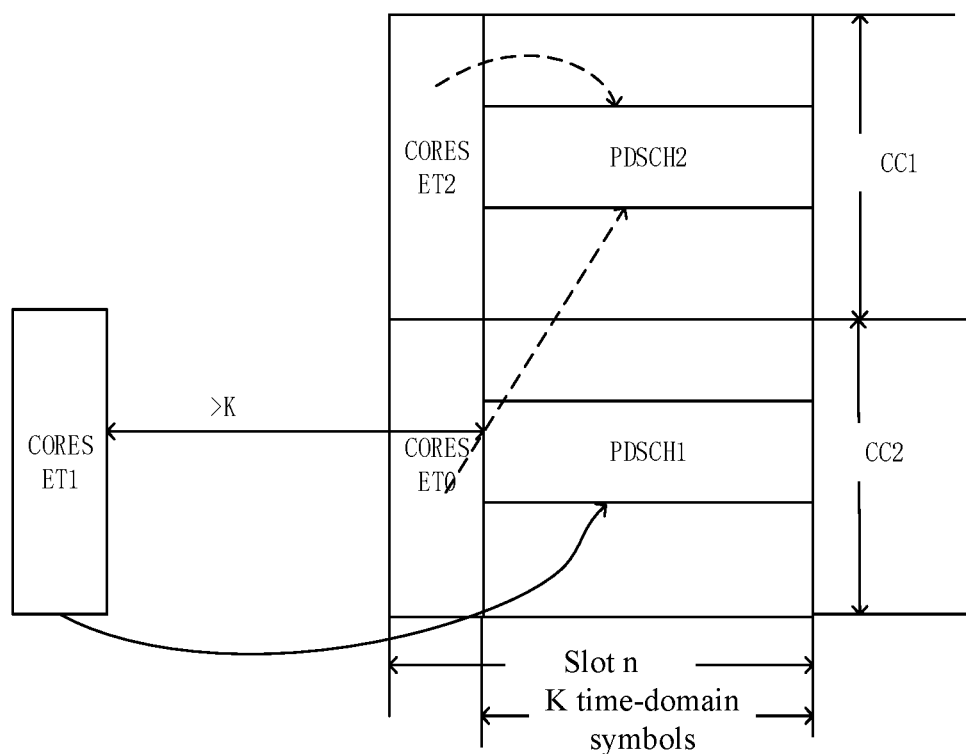
FIG. 1a is a schematic diagram illustrating that a Spatial Rx parameter of physical downlink share channel 2 (PDSCH2) is acquired according to a Spatial Rx parameter of PDSCH1 according to an embodiment of the present application.

In an embodiment, as shown in FIG. 1a, in slot n, the base station schedules PDSCH1 for the terminal, where the interval between DCI scheduling PDSCH1 (the DCI is in CORESET1 in FIG. 1a) and PDSCH1 is greater than the predetermined threshold K, so that in slot n, the terminal certainly knows that in slot n, the base station has scheduled PDSCH1 and then a QCL parameter of PDSCH1 may be acquired through information indicated in the DCI scheduling PDSCH1. In slot n, the terminal further needs to continue to detect at least one of CORESET0 or CORESET2. DCI in CORESET0 or CORESET2 may be used for scheduling PDSCH2 for the terminal. For example, PDSCH2 and PDSCH1 may be in different CCs, since while the potential PDSCH2 is received, the terminal has not decoded the DCI scheduling PDSCH2, according to the rule, the potential PDSCH2 needs to be received by using the beam of the minimum CORESET ID in all CCs in slot n, for example, PDSCH2 is received by using the beam of CORESET0. In the case where the dynamically-indicated receive beam (through the Spatial Rx parameter indicated in the DCI) of PDSCH1 and the beam of CORESET0 are different, the priority between the Spatial Rx parameter of PDSCH1 and the Spatial Rx parameter of PDSCH2 needs to be determined. Since PDSCH1 is determined to be scheduled and PDSCH2 may not exist, the beam of PDSCH1 is used in priority for receiving the potential PDSCH1 and PDSCH2.

Figure 1B:
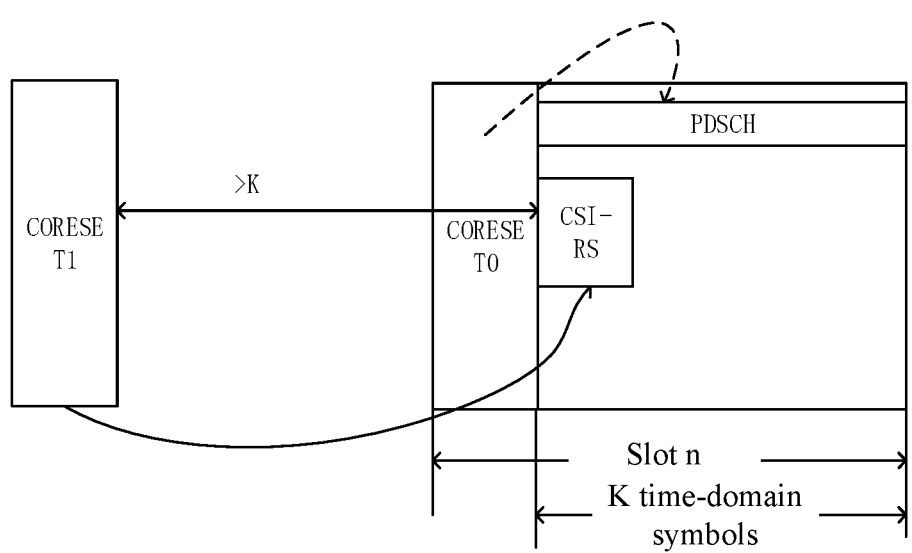
FIG. 1b is a schematic diagram illustrating that a Spatial Rx parameter of a PDSCH is acquired according to a Spatial Rx parameter of a channel-state information reference signal (CSI-RS) according to an embodiment of the present application.

As shown in FIG. 1b, in slot n, the base station schedules an aperiodic measurement reference signal (CSI-RS) for the terminal, where the interval between the DCI scheduling the aperiodic CSI-RS and the aperiodic measurement reference signal is greater than the predetermined threshold K. In slot n, the terminal further needs to detect CORESET0. CORESET0 may be used for scheduling the PDSCH for the terminal in slot n, and then in the case where the PDSCH and the CSI-RS in slot n are in the same time-domain symbol, the priority between the QCL parameter of the PDSCH and the QCL parameter of the CSI-RS needs to be determined. Similarly, since the aperiodic measurement reference signal is determined to be scheduled, the terminal receives the CSI-RS and the potential PDSCH by using the aperiodic measurement reference signal at least in the time-domain symbol where the CSI-RS is located. In the case where the time-domain symbol of the aperiodic measurement reference signal does not exist in slot n, the QCL parameter of the potential PDSCH may be acquired by using the QCL parameter of the CORESET having the minimum CORESET ID in slot n, or it is stipulated that in slot n, in the time-domain symbol where the potential PDSCH is located, PDSCHs are received by using the receive beam of the aperiodic CSI-RS.

It can be seen from FIG. 1a and FIG. 1b that even though the interval between the PDSCH and the DCI scheduling the PDSCH is less than the predetermined threshold K, the QCL parameter of the PDSCH is not necessarily acquired by using the QCL parameter of the CORESET having the minimum CORESET ID closest to the PDSCH, and whether the second signal exists in the time-domain symbol where the PDSCH is located also needs to be considered. In the case where the second signal exists in the time-domain symbol where the PDSCH is located, at least the Spatial Rx parameter of the first signal is determined according to the Spatial Rx parameter of the second signal; in the case where the second signal does not exist in the time-domain symbol where the PDSCH is located, the QCL parameter of the PDSCH is acquired according to the QCL parameter of the CORESET having the minimum CORESET ID closest to the PDSCH, where the QCL parameter at least includes the Spatial Rx parameter.

Figure 1C:
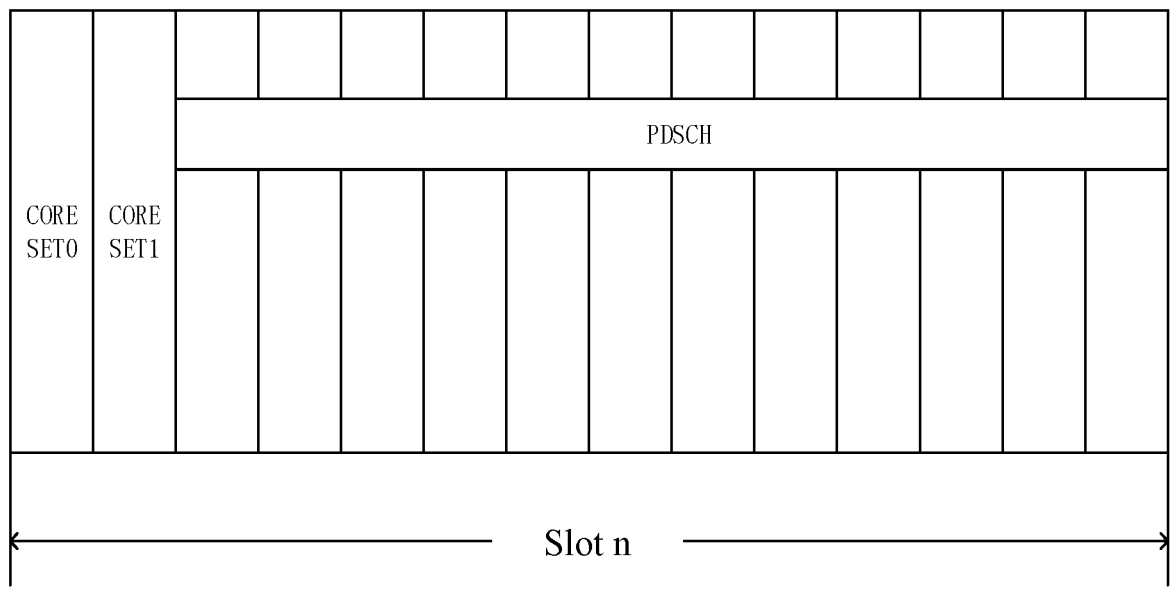
FIG. 1c is a schematic diagram illustrating that a Spatial Rx parameter of a PDSCH is acquired according to a Spatial Rx parameter of a CORESET having the minimum CORE- SET ID in a time-domain symbol closest to the PDSCH according to an embodiment of the present application.

As shown in FIG. 1c, in the case where the interval between the PDSCH and the DCI scheduling the PDSCH is less than the predetermined threshold K, at least the Spatial Rx parameter of the PDSCH is acquired according to the Spatial Rx parameter of the minimum CORESET ID in the time-domain symbol closest to the PDSCH (that is, the Spatial Rx parameter of the PDSCH is acquired according to the Spatial Rx parameter of CORESET1) rather than according to the Spatial Rx parameter of the CORESET having the minimum CORESET ID in the slot closest to the PDSCH, that is, the Spatial Rx parameter of the PDSCH is acquired not according to the Spatial Rx parameter of CORESET0.

Figure 1D:
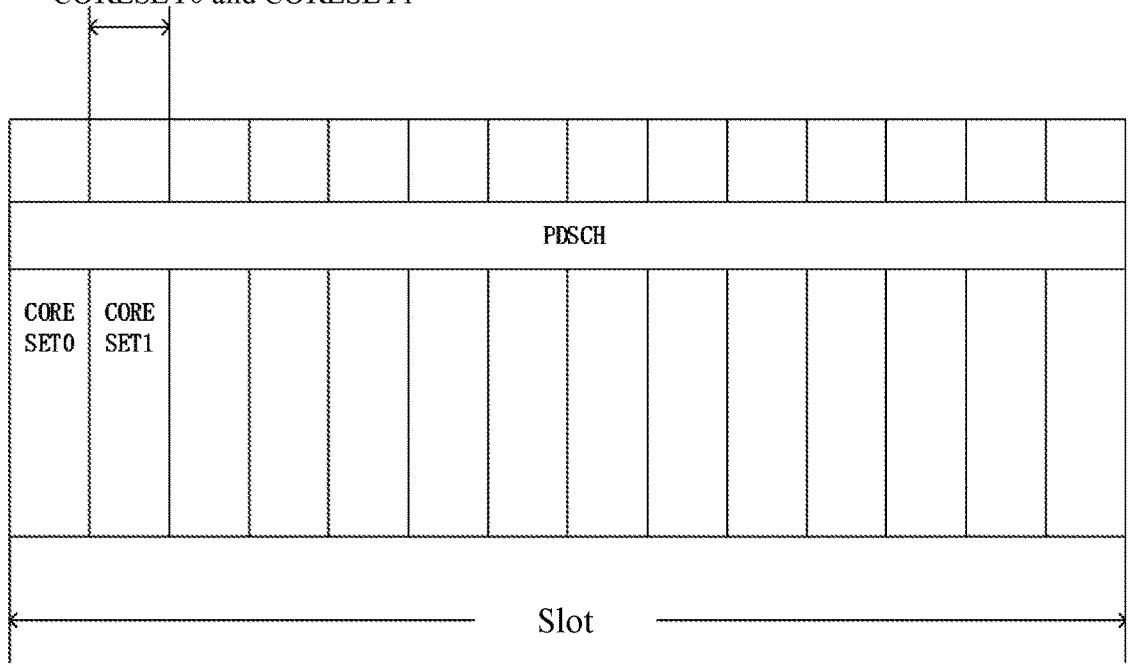
FIG. 1d is schematic diagram one illustrating that a receive beam corresponding to a Spatial Rx parameter of a PDSCH and a receive beam corresponding to a Spatial Rx parameter of a CORESET in the same time-domain symbol are different according to an embodiment of the present application.

As shown in FIG. 1d, in the case where the interval between the PDSCH and the DCI scheduling the PDSCH is less than the predetermined threshold K, the PDSCH needs to be receive by using the receive beam of the CORESET in the slot closest to the PDSCH, and the potential PDSCH may be stored in any time-domain symbol in the slot. In this way, in the time-domain symbol where CORESET1 is located, the potential PDSCH and CORESET1 need to be received simultaneously. In the case where the receive beam of CORESET1 and the receive beam of CORESET0 are different or the terminal cannot generate these two receive beams simultaneously, the priority between these two receive beams needs to be determined. In one manner, it is stipulated that the potential PDSCH in CORESET1 and CORESET1 are of QCL with respect to at least the Spatial Rx parameter. In the other manner, it is stipulated that the PDSCH does not exist in CORESET1, where the interval between the PDSCH and the DCI scheduling the PDSCH is less than the predetermined threshold K.

Figure 1E:
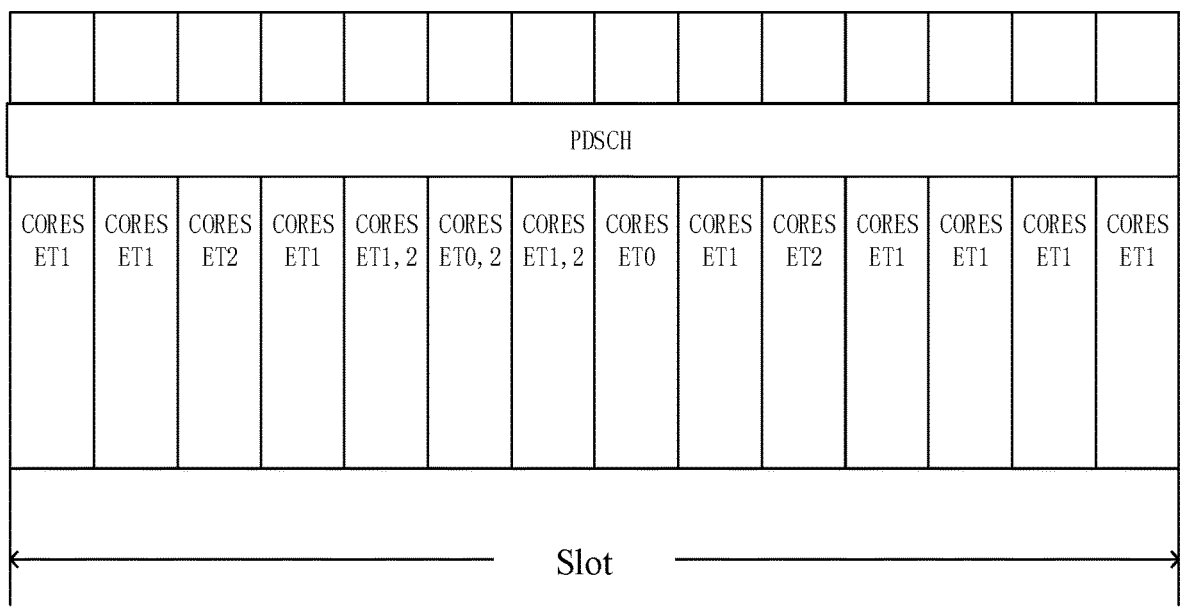
FIG. 1e is schematic diagram two illustrating that a receive beam corresponding to a Spatial Rx parameter of a PDSCH and a receive beam corresponding to a Spatial Rx parameter of a CORESET in the same time-domain symbol are different according to an embodiment of the present application.

As shown in FIG. 1e, in the case where in a slot, the terminal detects the CORESET in multiple time-domain symbols and the potential PDSCH needs to be cached, where the potential PDSCH denotes that the interval between the PDSCH and the DCI scheduling the PDSCH is less than the predetermined threshold K. In this case, the QCL parameter of the PDSCH is not acquired according to the QCL parameter of the CORESET having the minimum CORESET ID in the slot closest to the PDSCH (as shown in FIG. 1e, the QCL parameter of the PDSCH is not acquired according to the QCL parameter of CORESET0), but according to the QCL parameter of the CORESET having the minimum CORESET ID in the first 3 time-domain symbols in the slot closest to the PDSCH (as shown in FIG. 1e, the QCL parameter of the PDSCH is acquired according to the QCL parameter of CORESET1).

Figure 1F:
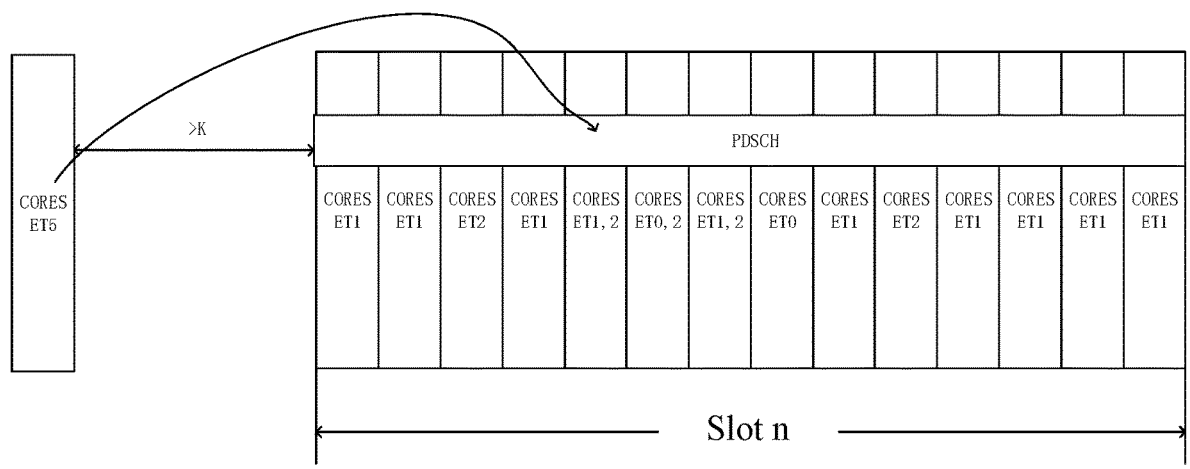
FIG. 1f is schematic diagram three illustrating that a receive beam corresponding to a Spatial Rx parameter of a PDSCH and a receive beam corresponding to a Spatial Rx parameter of a CORESET in the same time-domain symbol are different according to an embodiment of the present application.

As shown in FIG. 1f, in the case where in slot n, it is determined that the base station schedules the PDSCH for the terminal, that is, in this case, the interval between the DCI scheduling the PDSCH and the PDSCH is greater than the predetermined threshold K, and in slot n, the base station further semi-statically configures the CORESET required to be detected for the terminal. In this case, in one manner, it is stipulated that in the time-domain symbol where the PDSCH is located, the terminal does not need to receive and detect the CORESET in this time-domain symbol in the case where the Spatial Rx parameter of the CORESET and the Spatial Rx parameter of the PDSCH are different, or the terminal and the base station stipulate that in this case, the DMRS of the PDSCH and the CORESET in the same time-domain symbol as the PDSCH are of QCL with respect to at least the Spatial Rx parameter. Alternatively, the terminal and the base station agree that in the case where the PDSCH and the CORESET are in the same time-domain symbol and the receive beam corresponding to the Spatial Rx parameter of the PDSCH and the receive beam corresponding to the Spatial Rx parameter of the CORESET are different, the PDSCH and the CORESET are received through the receive beam corresponding to the Spatial Rx parameter of the CORESET.

Exemplary Embodiment Nine

In this embodiment, how to acquire the QCL parameter of the PDSCH in the case where the PDSCH occupies multiple slots is described.

Firstly, one problem is that how to acquire the interval between the PDSCH and the DCI scheduling the PDSCH, which includes two acquisition manners described below.

Figure 4A:
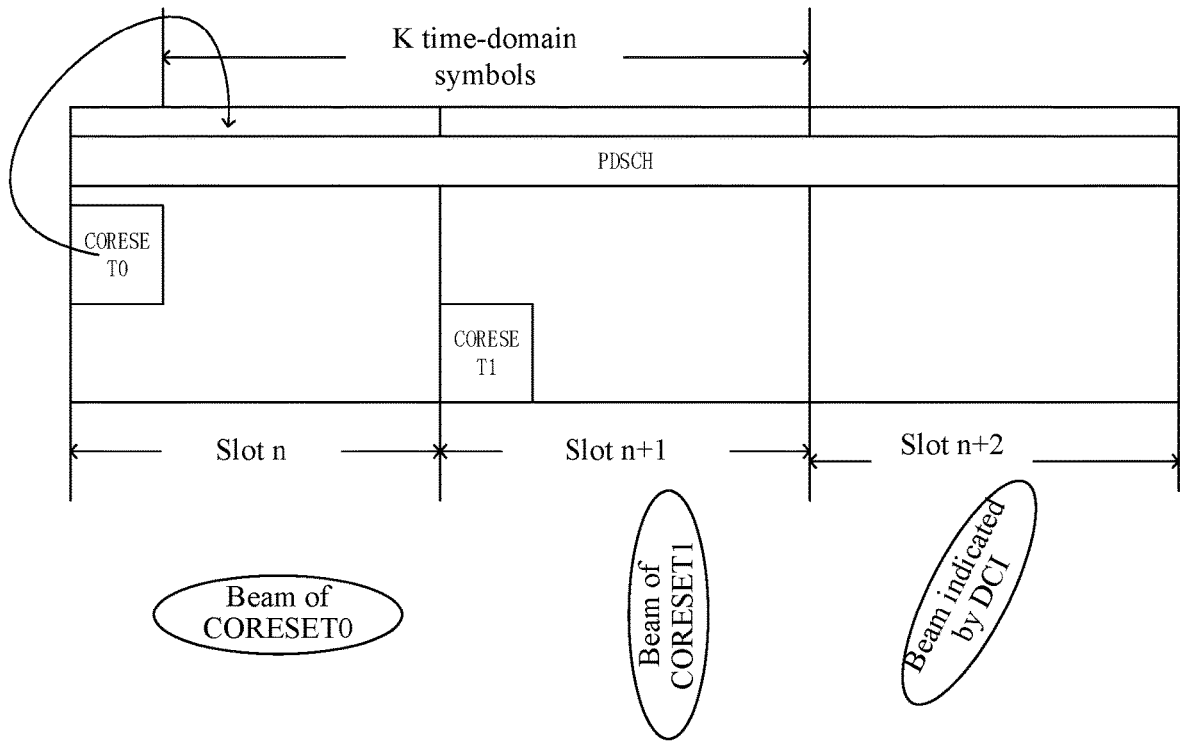
FIG. 4a is schematic diagram one illustrating an acquisition manner of a Spatial Rx parameter of a PDSCH in each slot in the case where one PDSCH occupies multiple slots according to an embodiment of the present application.
Figure 4B:
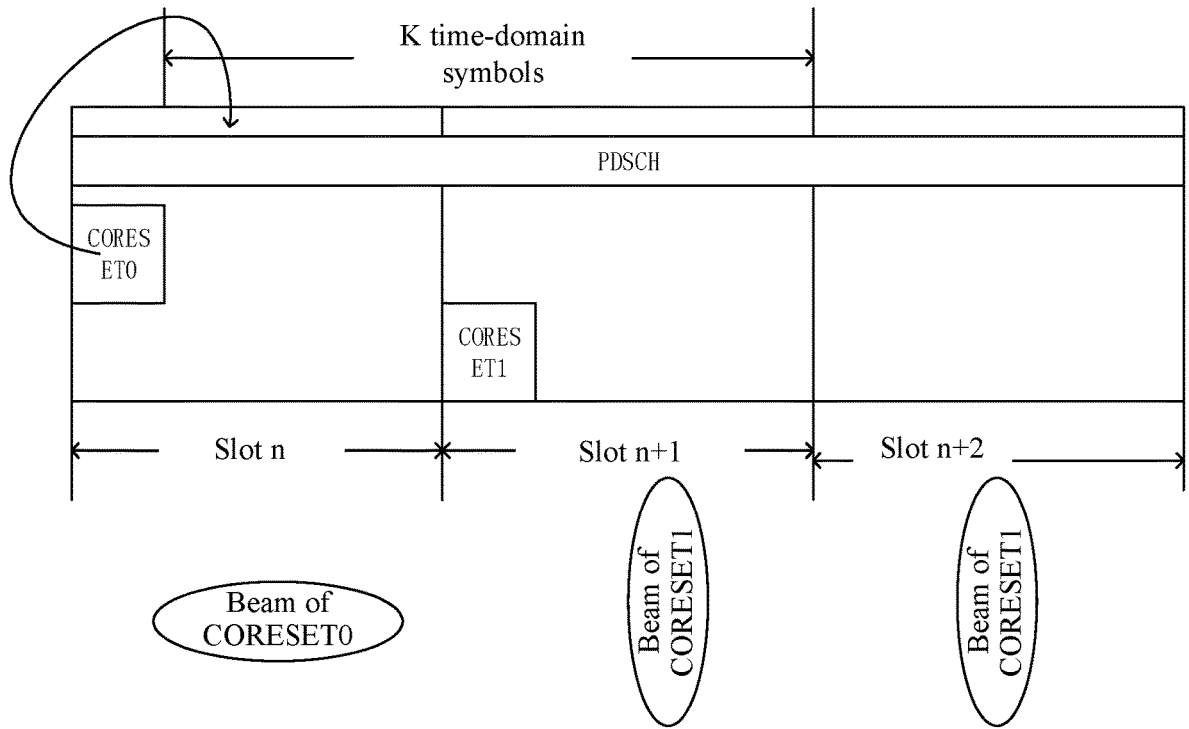
FIG. 4b is schematic diagram two illustrating an acquisition manner of a Spatial Rx parameter of a PDSCH in each slot in the case where one PDSCH occupies multiple slots according to an embodiment of the present application.

In manner one of acquiring the time interval, the acquisition manner of the QCL parameter of the PDSCH is obtained according to one time interval between the starting symbol position of the PDSCH in the first slot of A slots occupied by the PDSCH and the DCI and the predetermined threshold X1 (such as K; of course, the present application does not exclude the case where X1 and K are different). For example, if the time interval is less than the predetermined threshold X1, then the QCL parameter of the PDSCH is acquired according to the QCL parameter of a specified CORESET (such as a CORESET having the minimum CORESET ID in the slot) in the slot closest to the PDSCH; if the time interval is greater than or equal to the predetermined threshold X1, then the QCL parameter of the PDSCH is acquired according to the information indicated in the DCI, as shown in FIG. 4b.

In manner two of acquiring the time interval, the acquisition manner of the QCL parameter of the PDSCH in each slot is obtained according to A time intervals between the starting symbol position of the PDSCH in each slot of A slots occupied by the PDSCH and the DCI and the predetermined threshold X1 (such as K; of course, the present application does not exclude the case where X1 and K are different). For example, in the case where the interval between the PDSCH in each of the first A1 slots and the DCI is less than the predetermined threshold X1, then QCL parameters of the PDSCH in the A1 slots are acquired according to the QCL parameter of the specified CORESET (such as a CORESET having the minimum CORESET ID in the slot) in the slot closest to the PDSCH; in the case where the interval between the PDSCH in each of the last A2 slots and the DCI is greater than or equal to the predetermined threshold X1, then the QCL parameters of the PDSCH are acquired according to the information indicated in the DCI, as shown in FIG. 4a.

The other problem is that there are two understanding manners of the acquisition which is performed according to the QCL parameter of the CORESET having a predetermined characteristic in the slot closest to the PDSCH.

In manner one of acquiring the QCL parameter, QCL parameters of the PDSCH in A slots are acquired according to the QCL parameter of the CORESET having the minimum CORESET ID in the slot closest to the first slot of the A slots occupied by the PDSCH. The manner of acquiring the QCL parameters of the PDSCH in the A slots does not change, or the QCL parameters of the PDSCH in the A slots keeps unchanged.

In manner two of acquiring the QCL parameter, the QCL parameter of the PDSCH in each slot is acquired according to the QCL parameter of the CORESET having the minimum CORESET ID in a respective slot closest to each slot of A slots occupied by the PDSCH. The manner of acquiring the QCL parameters of the PDSCH in the A slots may not be the same, or the QCL parameters of the PDSCH in the A slots may change.

Manner one and manner two of acquiring the time interval may arbitrarily cooperate with manner one and manner two of acquiring the QCL parameter.

Figure 4C:
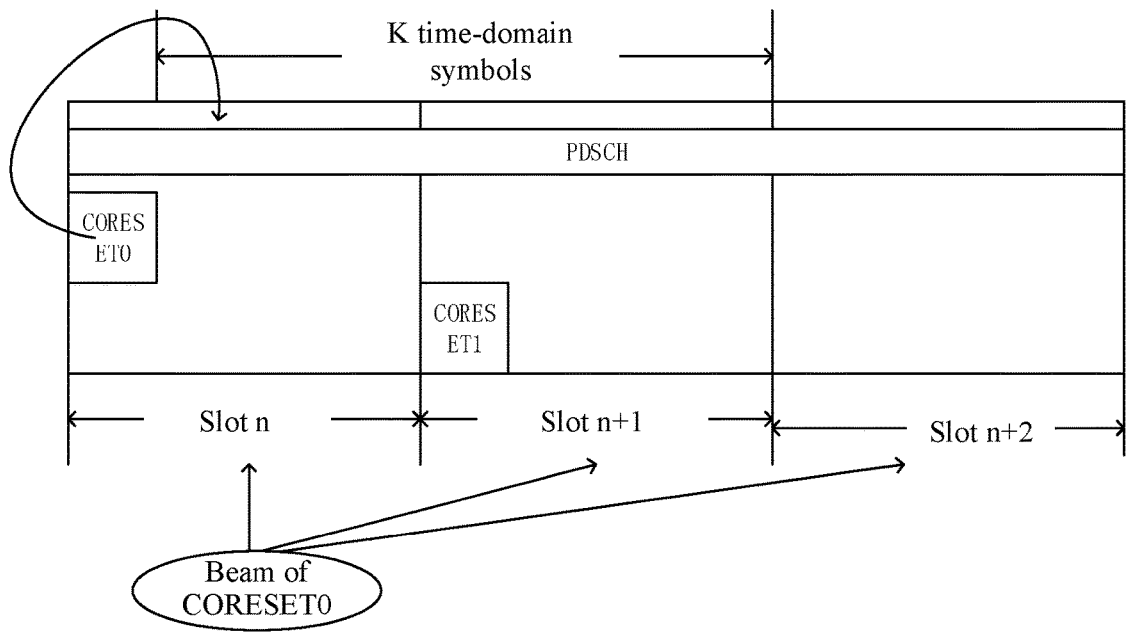
FIG. 4c is schematic diagram three illustrating an acquisition manner of a Spatial Rx parameter of a PDSCH in each slot in the case where one PDSCH occupies multiple slots according to an embodiment of the present application.

In an embodiment, in the case where manner one of acquiring the time interval and manner one of acquiring the QCL parameter are adopted, as shown in FIG. 4c, according to the time interval between the first slot of 3 slots occupied by the PDSCH and the DCI is less than the predetermined threshold K, the QCL parameters of the PDSCH in the 3 slots are acquired according to the QCL parameter of the CORESET having the minimum CORESET ID in the slot closest to the first slot (that is, in slot n, the QCL parameter of CORESET0), and the QCL parameters of the PDSCH in the 3 slots keep unchanged.

In the case where manner one of acquiring the time interval and manner two of acquiring the QCL parameter are adopted, as shown in FIG. 4b, according to the time interval between the first slot of 3 slots occupied by the PDSCH and the DCI is less than the predetermined threshold K, the QCL parameters of the PDSCH in the 3 slots are acquired according to the QCL parameter of the CORESET having the minimum CORESET ID in the slot closest to each slot, and the QCL parameters of the PDSCH in the 3 slots may be different or may be the same.

Figure 4D:
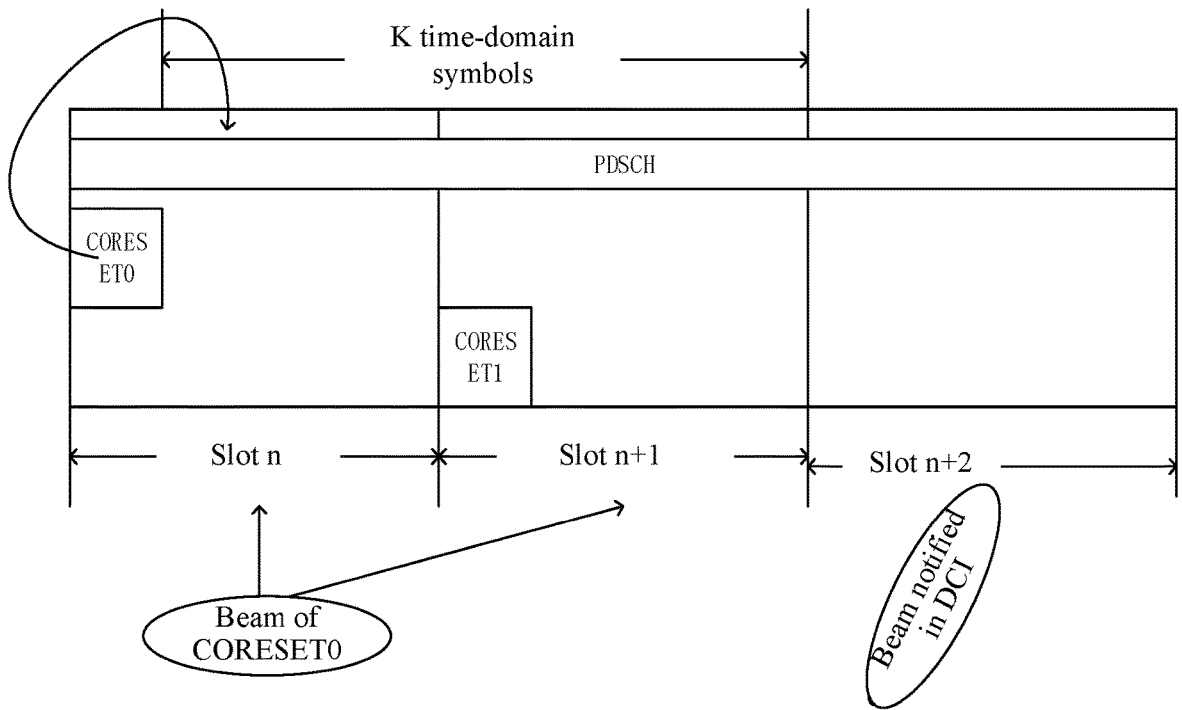
FIG. 4d is schematic diagram four illustrating an acquisition manner of a Spatial Rx parameter of a PDSCH in each slot in the case where one PDSCH occupies multiple slots according to an embodiment of the present application.

In the case where manner two of acquiring the time interval and manner one of acquiring the QCL parameter are adopted, as shown in FIG. 4d, according to the relationship between the time interval between each slot of 3 slots occupied by the PDSCH and the DCI and the predetermined threshold K, it is determined that whether the QCL parameter of each slot of the 3 slots is acquired according to the CORESET or according to information indicated in the DCI. In the case where the interval between each of multiple slots of the PDSCH and the DCI is less than the threshold K, the QCL parameters of the PDSCH in the multiple slots (that is, slot n and slot n+1 in FIG. 4d) keep unchanged and the QCL parameter of the PDSCH is acquired according to the QCL parameter of the CORESET having the minimum CORESET ID in the slot closest to the first slot of the multiple slots; in the case where the interval between the PDSCH in slot n+2 and the DCI is greater than K, the QCL parameter of the PDSCH in slot n+2 is acquired according to information indicated in the DCI.

In the case where manner two of acquiring the time interval and manner two of acquiring the QCL parameter are adopted, as shown in FIG. 4a, according to the relationship between the time interval between each slot of 3 slots occupied by the PDSCH and the DCI and the predetermined threshold K, it is determined that whether the QCL parameter of each slot of the 3 slots is acquired according to the CORESET or according to information indicated in the DCI. In the case where the interval between each of multiple slots of the PDSCH and the DCI is less than the threshold K, the QCL parameter of the PDSCH in each slot of the multiple slots (that is, slot n and slot n+1 in FIG. 4d) is acquired according to the QCL parameter of the CORESET having the minimum CORESET ID in the respective slot closest to the each slot; in the case where the interval between the PDSCH in slot n+2 and the DCI is greater than K, the QCL parameter of the PDSCH in slot n+2 is acquired according to information indicated in the DCI. The interval between the PDSCH in each slot of the 3 slots and the CORESET0 scheduling is determined. In the case where the interval is less than K, the QCL parameter of the PDSCH is acquired by using the QCL parameter of the CORESET having the minimum CORESET ID in the respective slot closest to the each slot. In the case where the interval is greater than K, the QCL parameter of the PDSCH is acquired by using the QCL parameter indicated in the DCI. As shown in FIG. 4a, in slot n, the PDSCH is received by using the beam of CORESET0 in slot n; in slot n+1, the PDSCH is received by using the beam of CORESET1 in slot n+1; and in slot n+2, the receive beam in slot n+2 is determined by using the QCL parameter indicated in the DCI transmitted in CORESET0 in slot n. The reason for this is that in K time-domain symbols, the terminal does not decode the DCI and needs to cache the PDSCH, and it is possible that data may be scheduled for the terminal in CORESET0 in slot n and CORESET1 in slot n+1. Before the terminal does not detect the DCI, in slot n+1, the terminal needs to cache at least one of CORESET0 or CORESET1 for the PDSCH scheduled by the terminal. In the case where the receiving capability of the terminal is limited, for example, terminal may generate only one receive beam, the QCL parameter of the PDSCH in each slot in the range where the interval between the DCI and the PDSCH is less than the predetermined threshold K is acquired by using the CORESET having the minimum CORESET ID in the slot closest to the PDSCH in the each slot.

Figure 4E:
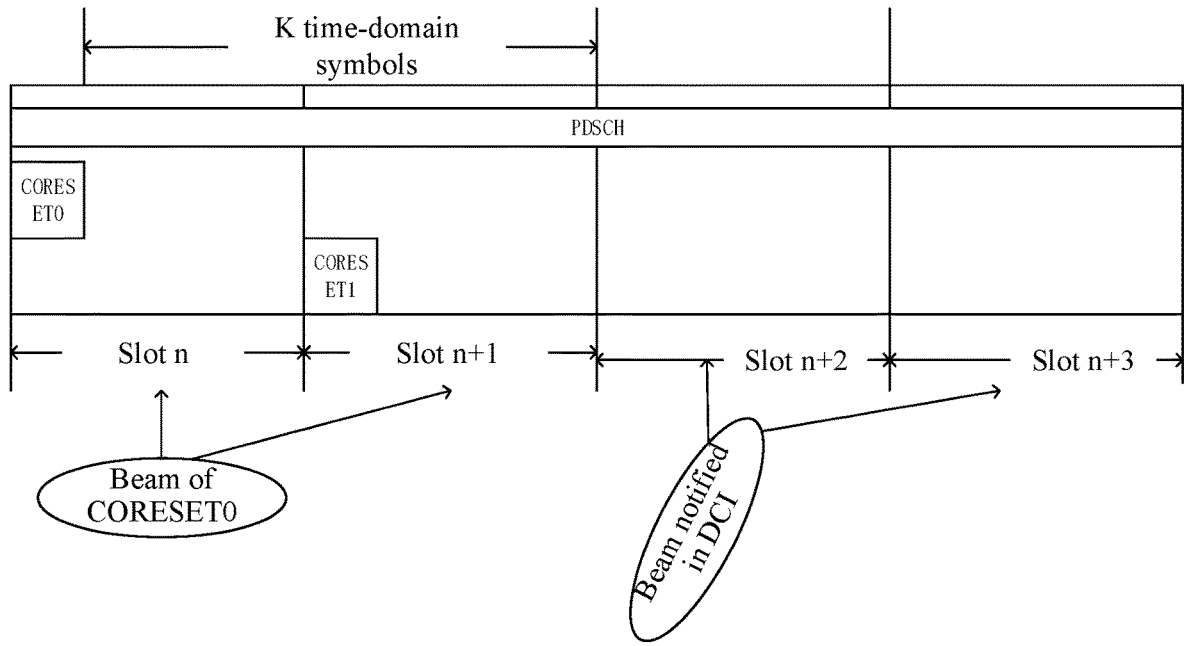
FIG. 4e is schematic diagram five illustrating an acquisition manner of a Spatial Rx parameter of a PDSCH in each slot in the case where one PDSCH occupies multiple slots according to an embodiment of the present application.
Figure 4F:
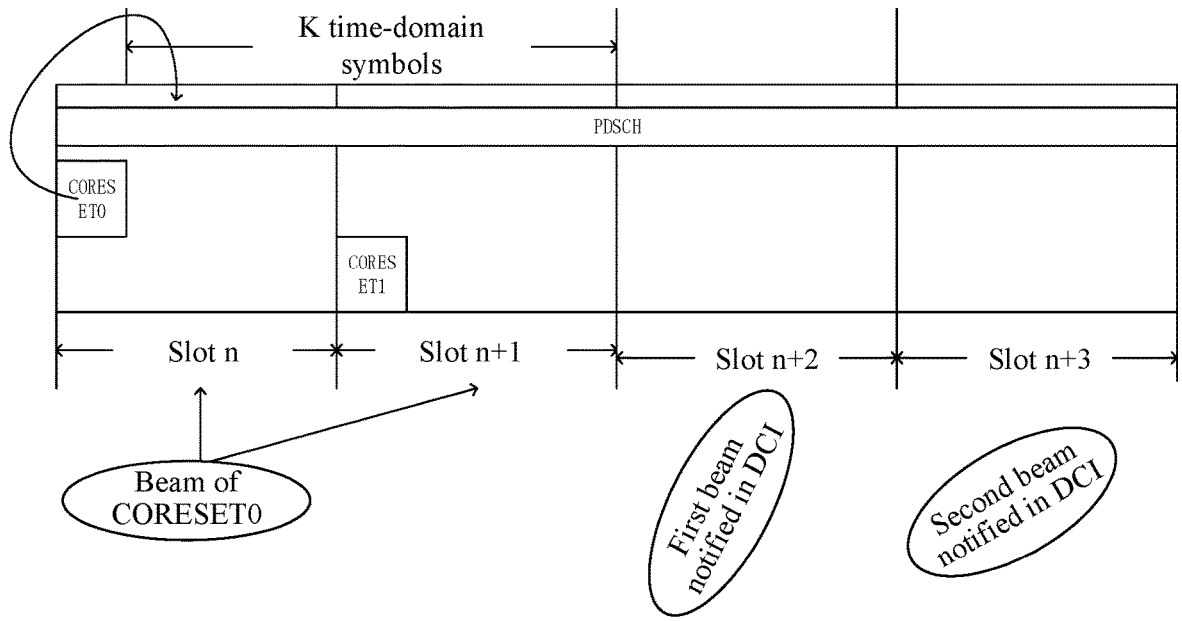
FIG. 4f is schematic diagram six illustrating an acquisition manner of a Spatial Rx parameter of a PDSCH in each slot in the case where one PDSCH occupies multiple slots according to an embodiment of the present application.

In particular, in the case where the interval between the PDSCH and the DCI is greater than 1, whether A2 slots correspond to one set of QCL parameters (as shown in FIG. 4e) or whether each of A2 slots corresponds to a respective set of QCL parameters (as shown in FIG. 4f) is further agreed by the base station and the terminal or is notified by the base station through signaling information.

Which combination of the specific manner of acquiring the time interval and the specific manner of acquiring the QCL parameter is adopted may be agreed by the terminal and the base station, or may be notified by the base station through signaling information.

As shown in FIGS. 4a to 4d, K denotes 26 time-domain symbols and in slot n, the PDSCH scheduled by CORESET0 spans 3 slots, that is, {slot n, slot n+1, slot n+2}.

In FIG. 4f, in the case where the interval between the PDSCH and the DCI are greater than two slots of the predetermined threshold K, the DCI notifies different QCL parameters for different slots, so that in the DCI, the QCL parameter corresponding to each slot needs to be configured. Of course, the present embodiment does not exclude that, the base station configures a QCL parameter of one of multiple slots for the multiple slots in the DCI (such as configuring the QCL parameter in slot n+2, that is, configuring the QCL parameter in the first slot), the QCL parameters in other slots are configured through high-layer signaling, or the QCL parameters in other slots are obtained according to the QCL parameter configured by the DCI. For example, the polling manner is adopted in multiple slots. For example, there are only two sets of QCL parameters notified by at least one of the DCI or the high-layer signaling; and the PDSCH occupies 4 slots, and then the two sets of QCL parameters poll in the 4 slots. In FIGS. 4a to 4f, different QCL parameters correspond to different beams. The high-layer signaling may be RRC signaling or may be MAC-CE command. The high-layer signaling may be high-layer signaling used for notifying a candidate TCI state in the DCI. For example, in the case where the TCI in slot n+2 notified by the DCI is TCI state 2 (the TCI field notified in the DCI includes 3 bits and corresponding to 8 active TCI states), the TCI state of the PDSCH in slot n+3 corresponds to TCI state 3.

In this exemplary embodiment, data may be transmitted repeatedly in multiple slots occupied by one PDSCH, or different data may be transmitted in multiple slots.

Exemplary Embodiment Ten

In this embodiment, one state in the TCI field notified in the DCI corresponds to multiple relationships; different relationships correspond to different time units occupied by the PDSCH or different time unit sets; each relationship corresponds to one of the time units occupied by the PDSCH or one time unit set; one relationship includes the relationship between Z DMRS groups and Z RS sets; the Z DMRS groups are in one-to-one correspondence with the Z RS sets; and the DMRS group and the corresponding RS set, in the corresponding time unit or time unit set, satisfy a QCL relationship with respect to QCL parameters.

Exemplary Embodiment Eleven

In this embodiment, in the case where the QCL parameter of the PDSCH/AP-CSI-RS is acquired according to the QCL parameter of the CORESET having the minimum CORESET ID in the slot closest to the PDSCH/AP-CSI-RS, it is to be further clear that the CORESET satisfies at least one of the characteristics described below.

The CORESET having the minimum CORESET ID is the CORESET having the minimum CORESET ID in all the CORESETs required to be detected by the terminal included in all CCs in the time unit.

The CORESET having the minimum CORESET ID is the CORESET having the minimum CORESET ID in all the CORESETs required to be detected by the terminal included in the corresponding Primary cell (PCell) in the time unit.

The CORESET having the minimum CORESET ID is the CORESET having the minimum CORESET ID in all the CORESETs required to be detected by the terminal included in the serving cell where the corresponding PDSCH is located in the time unit.

The CORESET having the minimum CORESET ID is the CORESET having the minimum CORESET ID in all the CORESETs required to be detected by the terminal included in the serving cell where the corresponding DCI scheduling the PDSCH is located in the time unit.

The CORESET having the minimum CORESET ID is the CORESET having the minimum CORESET ID in all the CORESETs required to be detected by the terminal included in the serving cell where a predetermined CC (such as the CC having the minimum CC ID) is located in the time unit.

The CORESET having the minimum CORESET ID is the CORESET having the minimum CORESET ID in all the CORESETs required to be detected by the terminal included in a predetermined CC group in the time unit.

Exemplary Embodiment Twelve

In this embodiment, the QCL parameter of one CORESET is associated with whether the first communication node detects a beam recovery response signal.

Figure 8A:
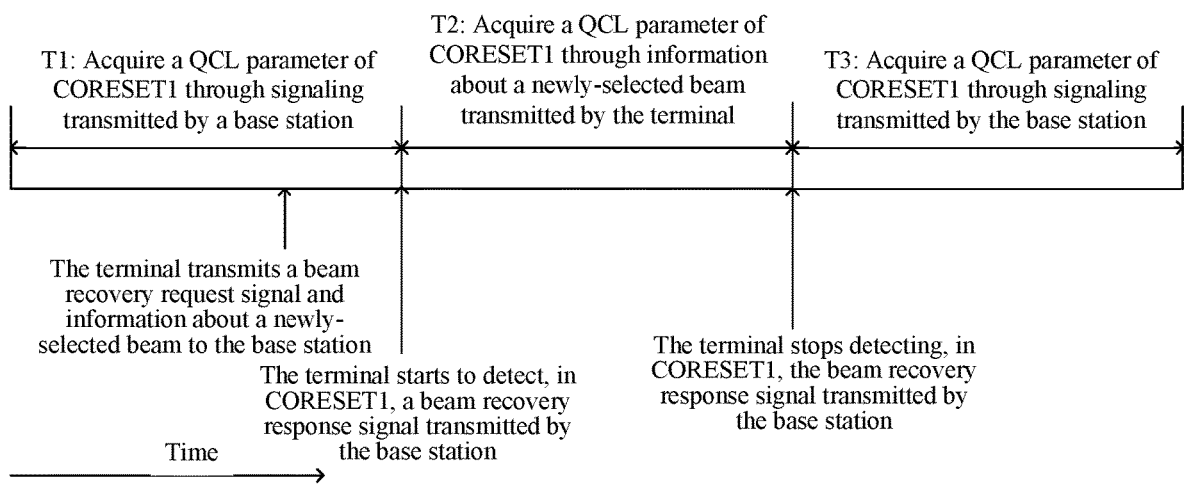
FIG. 8a is a schematic diagram illustrating that a QCL parameter of a CORESET is associated with whether a terminal detects a beam recovery request signal according to an embodiment of the present application.

In an embodiment, the base station configures one CORESET for the terminal. When the terminal does not detect the beam recovery response signal, the base station notifies the QCL parameter of the CORESET to the terminal through signaling. When the terminal needs to detect the beam recovery response signal (for example, in 4 slots after the terminal transmits a beam recovery request signal to the base station, the terminal detects the beam recovery response signal of the base station in the CORESET; in the case where the predetermined time window is exceeded and the terminal has not successfully detect the beam recovery response signal transmitted by the base station, the terminal stops detecting the beam recovery request signal in the CORESET), the QCL parameter of the CORESET is acquired according to the beam found by the terminal in the beam recovery request signal transmitted by the terminal. As shown in FIG. 8a, in T1 time period, the QCL parameter of CORESET1 is acquired according to the signaling information notified by the base station. In T2 time period, the terminal starts to detect, in CORESET1, the beam recovery request response signal transmitted by the base station. The QCL parameter of CORESET1 is obtained according to reference signal indication information $q_{new}$ included in the beam recovery request signal transmitted by the terminal, where $q_{new}$ denotes the reference signal indication information (that is, denoting the beam newly selected by the terminal) selected by the terminal in an RS set. In T3 time period, the QCL parameter of CORESET1 is acquired according to the signaling information transmitted by the base station, where in T1 time period and T3 time period, the signaling information of the QCL parameter with respect to CORESET1 transmitted by the base station to the terminal may be different signaling information, that is, the base station may update the QCL parameter of CORESET1 in T2 time period through the signaling information. The new beam found by the terminal in the beam recovery request signal transmitted by the terminal is obtained through the reference signal indication information transmitted by the terminal, where the reference signal indication information denotes the reference signal selected by the terminal in an RS set. The reference signal includes at least one of a measurement reference signal or a synchronization reference signal.

Exemplary Embodiment Thirteen

In this embodiment, physical layer dynamic control signaling scheduling an aperiodic measurement reference signal may be after the aperiodic measurement reference signal.

In an embodiment, the aperiodic measurement reference signal and the physical layer dynamic control signaling are in the same time unit.

Figure 8B:
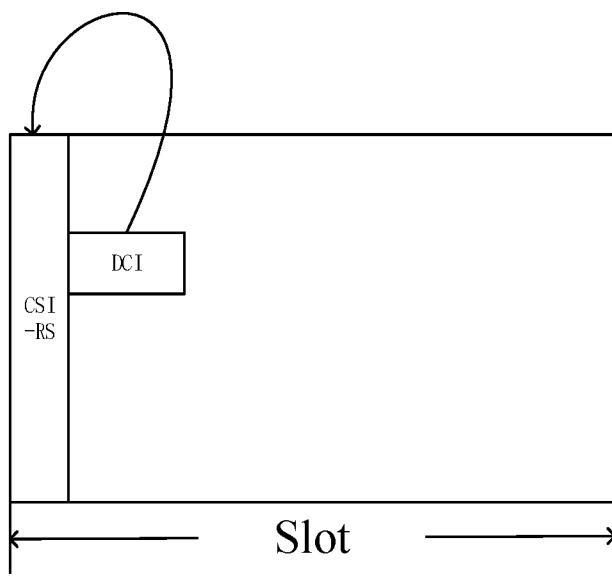
FIG. 8b is schematic diagram one illustrating that DCI scheduling an aperiodic measurement reference signal is after the aperiodic measurement reference signal according to an embodiment of the present application.
Figure 8C:
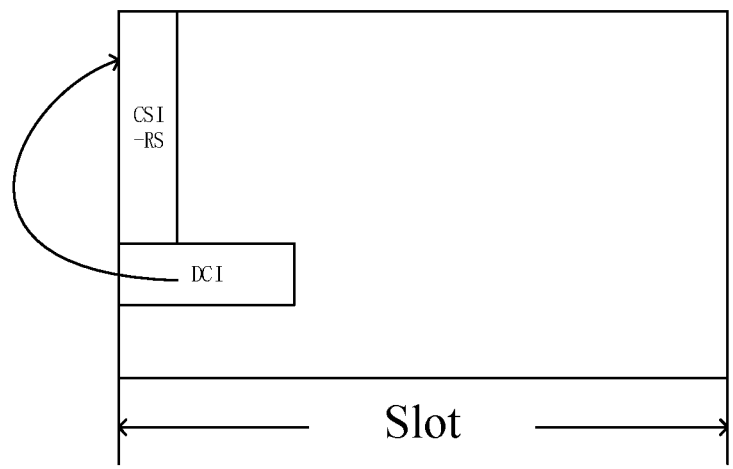
FIG. 8c is schematic diagram two illustrating that DCI scheduling an aperiodic measurement reference signal is after the aperiodic measurement reference signal according to an embodiment of the present application.

As shown in FIG. 8b, the starting time-domain symbol where the DCI scheduling the aperiodic measurement reference signal is located is after the aperiodic measurement reference signal. As shown in FIG. 8c, part of time-domain symbols where the DCI scheduling the aperiodic measurement reference signal are after the aperiodic measurement reference signal, that is, for example, the DCI is in 3 time-domain symbols and the CSI-RS is in the first symbol of time-domain symbols where the DCI is located.

In an exemplary embodiment, the TCI indication information is used for indicating the QCL relationship between the DMRS group/CSI-RS port group and the DL-RS set, that is, one piece of TCI index information corresponds to one state; one state includes the correspondence between Q DMRS groups and Q DL-RS sets; one DL-RS set includes one or more DL-RSs; and each DL-RS associates with one QCL parameter set, indicating that the reference signal in the DMRS group/CSI-RS port group and one DL-RS in the DL-RS set associated with the DMRS group/CSI-RS port group satisfy the QCL relationship with respect to the QCL parameter set. Two reference signals satisfy the QCL relationship with respect to one QCL parameter, indicating that the QCL parameter of one reference signal may be acquired through the QCL parameter of the two reference signals. The QCL parameter includes at least one of the following parameters: a Doppler shift, a Doppler spread, an average delay, a delay spread, an average gain or a Spatial Rx parameter.

In this exemplary embodiment, two reference signals are of QCL, indicating that the two reference signals are of QCL with respect to at least the Spatial Rx parameter and whether the two reference signals are of QCL with respect to other QCL parameters is not limited.

In an exemplary embodiment, a channel may also be a signal, that is, the signal is transmitted in the channel. For example, a data signal is transmitted in a data channel.

In an exemplary embodiment, different CCs may be associated through different serving cell IDs.

Exemplary Embodiment Fourteen

In this exemplary embodiment, the terminal does not desire to receive the configuration satisfying the following characteristic: the PDSCH and the CSI-RS in the same time symbol does not satisfy the QCL relationship with respect to the Spatial Rx parameter.

In an embodiment, the interval between the PDSCH and the control signaling scheduling the PDSCH is less than the predetermined threshold K.

From the description of the preceding implementations, it will be apparent to those skilled in the art that the method of the preceding embodiments may be implemented by software plus a necessary general-purpose hardware platform, or may, of course, be implemented by hardware. However, in many cases, the former is a preferred implementation. Based on this understanding, the technical solution in the present application substantially, or the part contributing to the related art, may be embodied in the form of a software product. The computer software product is stored on a storage medium (such as an ROM/RAM, a magnetic disk or an optical disk) and includes several instructions for enabling a terminal device (which may be a mobile phone, a computer, a server or a network device) to perform the method of each embodiment of the present application.

Embodiment Three

In this embodiment, an apparatus for transmitting control signaling is further provided. The apparatus is configured to implement the preceding embodiments and preferred implementations. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceivable.

FIG. 11 is a block diagram illustrating the structure of an apparatus for transmitting control signaling according to an embodiment of the present application. The apparatus is applied to a first communication node. As shown in FIG. 11, the apparatus includes a first determination module 112 and a first transmission module 114.

The first determination module 112 is configured to determine second information according to first information.

The second information includes at least one of the following: the number N of bits used in first control signaling to notify a first transmission parameter, a correspondence mapping table between an index value referenced by the first transmission parameter in the first control signaling and the value of the first transmission parameter, the type of the first transmission parameter notified by a predetermined indication field in the first control signaling, or position information of the bits used in the first control signaling to notify the first transmission parameter; and the first information includes a relationship between a transmission time interval between the first control signaling and a first signal and a predetermined threshold K, where N and K are non-negative integers.

The first transmission module 114 is configured to transmit the first control signaling.

Through the apparatus shown in FIG. 11, the second information is determined according to the first information, where the second information includes at least one of the following: the number N of the bits used in the first control signaling to notify the first transmission parameter, the correspondence mapping table between the index value referenced by the first transmission parameter in the first control signaling and the value of the first transmission parameter, the type of the first transmission parameter notified by the predetermined indication field in the first control signaling, or the position information of the bits used in the first control signaling to notify the first transmission parameter; and where the first information includes the relationship between the transmission time interval between the first control signaling and the first signal and the predetermined threshold K, where N and K are non-negative integers; and the first control signaling is transmitted. That is, the format of the control signaling is determined through the second information, and then new control signaling is transmitted. In this way, the following defect is overcome: in the related art, part of resources in the related control signaling is idle so that the resource utilization is relatively low; and the following technical effect is achieved: the resource utilization of the control signaling is improved.

In an embodiment, in the case where the relationship between the transmission time interval between the first control signaling and the first signal and the predetermined threshold K is a first relationship, the value of N includes N1; in the case where the relationship between the transmission time interval between the first control signaling and the first signal and the predetermined threshold K is a second relationship, the value of N includes N2, where N1 and N2 are integers.

The relationship between N1 and N2 satisfies at least one of the following: N1 is greater than N2; the difference between N1 and N2 is less than or equal to the number of bits occupied by a TCI field; or the difference between N1 and N2 is less than or equal to the number of bits required to notify information about a second transmission parameter.

In an embodiment, in the case where the relationship between the transmission time interval between the first control signaling and the first signal and the predetermined threshold K is the first relationship, the correspondence mapping table is a first correspondence mapping table; in the case where the relationship between the transmission time interval between the first control signaling and the first signal and the predetermined threshold K is the second relationship, the correspondence mapping table is a second correspondence mapping table.

In an embodiment, any one of the first correspondence mapping table, the second correspondence mapping table, transmission parameter value set one and transmission parameter value set two is determined in at least one of the following manners: in manner one, the content included in transmitted signaling information; or in manner two, the rule pre-agreed by a transmitting end and a receiving end. The transmission parameter value set one corresponds to a value set of the first transmission parameter included in the first correspondence mapping table and the transmission parameter value set two corresponds to a value set of the first transmission parameter included in the second correspondence mapping table.

In an implementation, in the case where the type of the first transmission parameter is a TCI, a DL-RS set formed by DL-RSs associated with Spatial Rx parameters in each state in the first correspondence mapping table includes only one DL-RS; in the case where the type of the first transmission parameter is the TCI, each two DL-RSs in the DL-RS set formed by the DL-RSs associated with the Spatial Rx parameters in each state in the first correspondence mapping table satisfy a QCL relationship with respect to the Spatial Rx parameters.

In the case where the type of the first transmission parameter is the TCI, the DL-RSs in the DL-RS set formed by the DL-RSs associated with the Spatial Rx parameters in each state in the first correspondence mapping table are able to be received by a first communication node simultaneously; in the case where the type of the first transmission parameter is the TCI, the DL-RS set formed by the DL-RSs associated with the Spatial Rx parameters in each state in the first correspondence mapping table is an empty set. The first communication node is a communication node for receiving at least one of the first signal or the first control signaling.

In an embodiment, the type of the first transmission parameter includes one or more transmission parameter types, except for a transmission parameter type of the TCI, included in the first control signaling; or the type of the first transmission parameter is a transmission parameter of the TCI.

In an embodiment, the first transmission parameter satisfies at least one of the following: the first transmission parameter is the transmission parameter of the first signal; or the first transmission parameter is the transmission parameter of a second signal.

In an embodiment, the first signal or the second signal includes at least one of the following signals: a demodulation reference signal, a measurement reference signal, a control channel signal, or a data channel signal; and the first control signaling is physical layer control signaling.

In an implementation, the first information further includes at least one piece of the following information: information included in second control signaling; information about whether a TCI-PresentInDCI corresponding to a CORESET where the first control signaling is located is enabled; a relationship between a carrier frequency where the first signal or the second signal is located and a predetermined threshold G; a supported frequency range capability fed back by the first communication node; whether the predetermined threshold K is 0; whether at least one CORESET configured with Spatial Rx parameters exists in a CORESET required to be detected by the first communication node; whether at least one CORESET configured with Spatial Rx parameters exists in a CORESET set associated with a dedicated search space required to be detected by the first communication node; whether a CORESET having the minimum CORESET ID in a time unit closest to the first signal or the second signal is configured with Spatial Rx parameters; whether a CORESET having the minimum CORESET ID in a time-domain symbol closest to the first signal or the second signal is configured with Spatial Rx parameters; whether at least one TCI state exists in a TCI state pool associated with the first signal or the second signal, where a QCL parameter corresponding to an RS set in the TCI state includes a Spatial Rx parameter; or whether at least one TCI state exists in an activation TCI state pool associated with the first signal or the second signal, where the QCL parameter corresponding to the RS set in the TCI state includes the Spatial Rx parameter. The first communication node is a communication node for receiving at least one of the first signal or the second signal.

In an embodiment, in the case where the relationship between the transmission time interval between the first control signaling and the first signal and the predetermined threshold K is the first relationship, the type of the first transmission parameter notified by the predetermined indication field in the first control signaling is a first type of transmission parameter; in the case where the relationship between the transmission time interval between the first control signaling and the first signal and the predetermined threshold K is the second relationship, the type of the first transmission parameter notified by the predetermined indication field in the second control signaling is a second type of transmission parameter.

In an embodiment, in the case where the transmission time interval between the first control signaling and the first signal is less than the predetermined threshold K, the relationship between the transmission time interval between the first control signaling and the first signal and the predetermined threshold K is the first relationship; in the case where the transmission time interval between the control signaling and the first signal is greater than or equal to the predetermined threshold K, the relationship between the transmission time interval between the first control signaling and the first signal and the predetermined threshold K is the second relationship. Alternatively, in the case where the transmission time interval between the control signaling and the first signal is less than or equal to the predetermined threshold K, the relationship between the transmission time interval between the first control signaling and the first signal and the predetermined threshold K is the first relationship; in the case where the transmission time interval between the control signaling and the first signal is greater than the predetermined threshold K, the relationship between the transmission time interval between the first control signaling and the first signal and the predetermined threshold K is the second relationship. Alternatively, in the case where the transmission time interval between the control signaling and the first signal is greater than or equal to the predetermined threshold K, the relationship between the transmission time interval between the first control signaling and the first signal and the predetermined threshold K is the first relationship; in the case where the transmission time interval between the control signaling and the first signal is less than the predetermined threshold K, the relationship is the second relationship.

In this embodiment, an apparatus for receiving control signaling is further provided. FIG. 12 is a block diagram illustrating the structure of an apparatus for receiving control signaling according to an embodiment of the present application. The apparatus is applied to a second communication node. As shown in FIG. 12, the apparatus includes a second determination module 122 and a reception module 124.

The second determination module 122 is configured to determine second information according to first information.

The reception module 124 is configured to receive first control signal according to the second information.

The second information is information determined according to the first information, where the second information includes at least one of the following: the number N of bits used in the first control signaling to notify a first transmission parameter, a correspondence mapping table between an index value referenced by the first transmission parameter in the first control signaling and the value of the first transmission parameter, the type of the first transmission parameter notified by a predetermined indication field in the first control signaling, or position information of the bits used in the first control signaling to notify the first transmission parameter; and where the first information includes a relationship between a transmission time interval between the first control signaling and a first signal and a predetermined threshold K, where N and K are non-negative integers.

It is to be noted that the preceding modules may be implemented by software or hardware. Implementation by hardware may, but is not limited to, be performed in the following manner: the preceding modules are located in the same processor or the preceding modules are respectively located in different processors in any combination manner.

Embodiment Four

This embodiment further provides an apparatus for determining information. The apparatus is used for implementing the preceding embodiments and preferred implementations. What has been described will not be repeated. As used below, the term "module" may be at least one of software, hardware or a combination thereof capable of implementing predetermined functions. The apparatus in the embodiment described below is preferably implemented by software, but implementation by hardware or by a combination of software and hardware is also possible and conceivable.

FIG. 13 is a block diagram illustrating an apparatus for determining information according to an embodiment of the present application. The apparatus is applied to a first communication. As shown in FIG. 13, the apparatus includes a third determination module 132.

The third determination module 132 is configured to determine second information according to first information.

The second information includes at least one of the following: a QCL parameter of a first signal, a manner of transmitting the first signal at a time-domain position where a second signal is located, or a manner of receiving the first signal at the time-domain position where the second signal is located; and the first information includes at least one of the following: whether the second signal exists in a predetermined time window after a specified CORESET, a relationship between an interval between the first signal and the specified CORESET and a predetermined threshold X1, a relationship between a time interval between the second signal and the specified CORESET and a predetermined threshold X2, a relationship between a time interval between the first signal and first control signaling and the predetermined threshold X1, a relationship between a time interval between the second signal and second control signaling and the predetermined threshold X2, or a relationship between a first Spatial Rx parameter corresponding to the first signal and a second Spatial Rx parameter corresponding to the second signal, where X1 and X2 are real numbers.

Through the apparatus shown in FIG. 13, that is, the issue of multiplexing between two signals or the issue of receiving the two signals is determined through the signal or the control channel resource, or the relationship between the time interval between the signal and the control signaling scheduling the signal and a predetermined threshold. The following defects are overcome: in the related art, a delay exists when the terminal detects the control signaling; and the signal cannot be received correctly due to the limited radio frequency beams generated at the same time.

In an implementation, the specified CORESET satisfies at least one of the following characteristics: the CORESET is a CORESET having the minimum CORESET ID in a time-domain symbol closest to the first signal; the CORESET is a CORESET having the minimum CORESET ID in a time unit closest to the first signal; in the CORESET, the terminal needs to detect at least one piece of DCI scheduling a downlink signal or a channel; the CORESET does not include information about control signaling scheduling the first signal; the CORESET include information about control signaling scheduling the second signal; the CORESET is associated with at least one dedicated search space; the CORESET is a CORESET having the minimum CORESET ID in all CCs in a time unit closest to at least one of the first signal or the second signal; the CORESET is a CORESET having the minimum CORESET ID in a predetermined CC in the time unit closest to at least one of the first signal or the second signal; the CORESET is a CORESET having the minimum CORESET ID in a predetermined CC group in the time unit closest to at least one of the first signal or the second signal; or the CORESET is a CORESET in M predetermined time-domain symbols in a time unit, where M is less than or equal to the number of the time-domain symbols included in the time unit.

In an embodiment, in the case where the time interval between the first signal and the CORESET is less than the predetermined threshold X1, the QCL parameter of the first signal is acquired according to the QCL parameter of the CORESET; in the case where the interval between the first signal and the CORESET is greater than or equal to the predetermined threshold X1, the QCL parameter of the first signal is acquired according to a QCL parameter configured in configuration information of the first signal.

In an embodiment, in the case where the interval between the first signal and the CORESET is less than the predetermined threshold X1, the priority of the QCL parameter of the first signal is higher than the priority of the QCL parameter of the second signal; in the case where the interval between the first signal and the CORESET is greater than or equal to the predetermined threshold X1, the priority of the QCL parameter of the first signal is lower than the priority of the QCL parameter of the second signal.

In an embodiment, in the case where the interval between the first signal and the CORESET is less than the predetermined threshold X1, a manner of frequency-division multiplexing is not allowed to be adopted between the first signal and the second signal; in the case where the interval between the first signal and the CORESET is greater than or equal to the predetermined threshold X1, the manner of frequency-division multiplexing is allowed to be adopted between the first signal and the second signal.

In an embodiment, at least one of the first signal or the second signal includes at least one of the following signals: a downlink measurement reference signal, a downlink synchronization signal, a downlink demodulation reference signal, a downlink data channel signal, or a downlink control channel signal.

In an embodiment, the predetermined threshold X1 is equal to the predetermined threshold X2; and/or the QCL parameter of the second signal is determined according to the relationship between the interval between the control information scheduling the second signal and the second signal and the predetermined threshold X2.

In an embodiment, the first signal satisfies at least one of the following characteristics: the first signal is a downlink signal scheduled by physical layer dynamic control signaling; the first signal is a downlink physical control channel signal; or the interval between the control signaling scheduling the first signal and the first signal is less than the predetermined threshold 1.

In an embodiment, the second signal satisfies at least one of the following characteristics: the control signaling scheduling the second signal is before the time-domain symbol where the first signal is located; the interval between the control signaling scheduling the second signal and the time-domain symbol where the first signal is located is greater than or equal to a predetermined threshold X3; the interval between the control signaling scheduling the second signal and the starting time-domain symbol where the second signal is located is greater than or equal to the predetermined threshold X3; the second signal is a downlink signal scheduled by the physical layer dynamic control signaling; or the second signal is a periodic downlink measurement reference signal, where X3 is a real number.

In an embodiment, in the case where the second signal exists in the predetermined time window after the CORESET, the QCL parameter of the first signal is determined according to the QCL parameter of the second signal; in the case where the second signal does not exist in the predetermined time window after the CORESET, the QCL parameter of the first signal is not determined according to the QCL parameter of the second signal; and/or in the case where the second signal exists in the predetermined time window after the CORESET, and the interval between the first signal and the control signaling scheduling the first signal is less than the predetermined threshold X1, the QCL parameter of the first signal is not acquired according to the QCL parameter of the CORESET; in the case where the second signal does not exist in the predetermined time window after the CORESET, and the interval between the first signal and the control signaling scheduling the first signal is less than the predetermined threshold X1, the QCL parameter of the first signal is acquired according to the QCL parameter of the CORESET.

In an embodiment, the first signal and the second signal satisfy at least one of the following characteristics: the Spatial Rx parameter of the second signal is different from the Spatial Rx parameter of the first signal; a spatial filter corresponding to the Spatial Rx parameter of the second signal and a spatial filter corresponding to the Spatial Rx parameter of the first signal are unable to be generated by a first communication node simultaneously; the second signal and the first signal belong to different CCs; an intersection between the time-domain position where the first signal is located and the time-domain position where the second signal is located is a non-empty set; the first signal and the second signal are located at the same time-domain position; or the priority of the second signal is higher than the priority of the first signal.

In an embodiment, in the case where the second information is the QCL parameter of the first signal, the step in which the second information is determined according to the first information includes the following step: at least one piece of the following information is determined according to the first information: the priority between the QCL parameter of the first signal and the QCL parameter of the second signal; the priority between the QCL parameter configured in the configuration information of the first signal and the QCL parameter of the specified CORESET; or in the case where the interval between the first signal and the control signaling scheduling the first signal is less than the predetermined threshold X1, whether the QCL parameter of the first signal is acquired according to the QCL parameter of the specified CORESET.

In an embodiment, in the case where the second information is the manner of receiving the first signal at the time-domain position where the second signal is located, the step in which the second information is determined according to the first information includes the following step: at least one piece of the following information is determined according to the first information: whether the first signal is received at the time-domain position where the second signal is located; whether a control channel is detected at the time-domain position where the second position is located; at the time-domain position where the second signal is located, the priority between the QCL parameter of the first signal and the QCL parameter of the second signal; whether frequency-division multiplexing is applicable between the first signal and the second signal; or whether the time-domain position where the first signal is able to be located includes the time-domain position where the second signal is located.

In an embodiment, in the case where the second information is the manner of transmitting the first signal at the time-domain position where the second signal is located, the step in which the second information is determined according to the first information includes the following step: at least one piece of the following information is determined according to the first information: whether the first signal is transmitted at the time-domain position where the second signal is located; whether a control channel is transmitted at the time-domain position where the second position is located; at the time-domain position where the second signal is located, the priority between the QCL parameter of the first signal and the QCL parameter of the second signal; whether frequency-division multiplexing is applicable between the first signal and the second signal; or whether the time-domain position where the first signal is able to be located includes the time-domain position where the second signal is located.

In an embodiment, the time-domain position where the second signal is located includes at least one of the following time-domain positions: a time-domain symbol where the second signal is located; or a time unit where the second signal is located.

In an embodiment, the method further includes the following step: a configuration satisfying the following characteristics is not received: in the case where the interval between the first control signaling scheduling the first signal and the first signal is greater than or equal to the predetermined threshold X1, and the interval between the second control signaling scheduling the second signal and the second signal is greater than or equal to the predetermined threshold X2, the first signal and the second signal do not satisfy the QCL relationship with respect to a Spatial Rx parameter; in the case where the interval between the first control signaling scheduling the first signal and the first signal is less than the predetermined threshold X1, and the interval between the second control signaling scheduling the second signal and the second signal is greater than or equal to the predetermined threshold X2, the QCL parameter of the first signal is determined according to the QCL parameter of the second signal; or in the case where the interval between the first control signaling scheduling the first signal and the first signal is less than the predetermined threshold X1, and the interval between the second control signaling scheduling the second signal and the second signal is less than the predetermined threshold X2, the priority of the QCL parameter of the first signal and the priority of the QCL parameter of the second signal are acquired according to an agreed rule or signaling information.

In an embodiment, the first information further includes at least one piece of the following information: whether the control signaling included in the specified CORESET includes a TCI field; a relationship between a carrier frequency where at least one of the first signal or the second signal is located and a predetermined threshold G; whether at least one of the predetermined threshold X1 or the predetermined threshold X2 is 0; whether at least one CORESET configured with Spatial Rx parameters exists in a specified CORESET; whether at least one CORESET configured with Spatial Rx parameters exists in a CORESET set required to be detected by the first communication node; whether at least one TCI state exists in a TCI state pool associated with the first signal or the second signal, where the QCL parameter corresponding to an RS set in the TCI state includes a Spatial Rx parameter; or whether at least one TCI state exists in an activation TCI state pool associated with the first signal or the second signal, where the QCL parameter corresponding to the RS set in the TCI state includes the Spatial Rx parameter. The first communication node is a communication node for receiving the first signal.

In an embodiment, in the case where the first information is the relationship between the first Spatial Rx parameter corresponding to the first signal and the second Spatial Rx parameter corresponding to the second signal, the step in which the second information is determined according to the first information include at least one of the following manners: in the case where the first signal and the second signal satisfy the QCL relationship with respect to Spatial Rx parameters, the time-domain symbol where the first signal is able to be located includes the time-domain symbol where the second signal is located; in the case where the first signal and the second signal do not satisfy the QCL relationship with respect to the Spatial Rx parameters, the time-domain symbol where the first signal is able to be located does not include the time-domain symbol where the second signal is located; in the case where a spatial filter corresponding to the first Spatial Rx parameter and a spatial filter corresponding to the second Spatial Rx parameter are able to be generated by the first communication node simultaneously, the time-domain symbol where the first signal is able to be located includes the time-domain symbol where the second signal is located; or in the case where the spatial filter corresponding to the first Spatial Rx parameter and the spatial filter corresponding to the second Spatial Rx parameter are unable to be generated by the first communication node simultaneously, the time-domain symbol where the first signal is able to be located does not include the time-domain symbol where the second signal is located.

It is to be noted that, the case that the time-domain symbol where the first signal is able to be located does not include the time-domain symbol where the second signal is located may be that in the time-domain symbol where the second signal is located, the first signal is not transmitted and/or received for rate matching.

In an embodiment, in the case where the first information is the relationship between the time interval between the first signal and the first control signaling and the predetermined threshold X1, and the second information is the QCL parameter of the first signal, the step in which the second information is determined according to the first information includes at least one of the following: it is determined that QCL parameters of the first signal are same across different time-domain symbols in one time unit; it is determined that QCL parameters of the first signal are able to be different across different time units; a correspondence exists between B1 sets of QCL parameters of the first signal and A time units; the QCL parameter of the first signal in each time unit of the A time units where the first signal is located is acquired according to a QCL parameter of a CORESET having a predetermined characteristic in a time unit closest to the each time unit; or in the A time units where the first signal is located, the QCL parameter of the first signal in each time unit is determined according to the relationship between the time interval between the first signal in the each time unit and the first control signaling and the predetermined threshold X1, where the first signal is in the A time units, A is a natural number greater than 1, and B1 is a non-negative integer less than or equal to A.

It is to be noted that the preceding time unit may be a slot, or may be a subframe or another time unit.

In an embodiment, in the case where the first information is the relationship between the time interval between the first signal and the first control signaling and the predetermined threshold X1, and the second information is the QCL parameter of the first signal, the step in which the second information is determined according to the first information includes at least one of the following: the QCL parameter of the first signal is determined according to the relationship between the time interval between the first signal in the first unit of A time units and the first control signaling and the predetermined threshold X1, where QCL parameters of the first signal in the A time units keeps unchanged; the QCL parameter of the first signal in each time unit of A1 time units where the first signal is located is acquired according to the QCL parameter of a CORESET having a predetermined characteristic in a time unit closest to the each time unit, where the interval between the first signal in the last time unit of the A1 time units and the first control signaling is less than the predetermined threshold X1; the QCL parameters of the first signal in A2 time units where the first signal is located are kept unchanged; a correspondence exists between B2 sets of QCL parameters of the first signal and the A2 time units; or in the A2 time units where the first signal is located, the QCL parameters of the first signal are kept unchanged, and the QCL parameters of the first signal in the A2 time units are determined according to information notified in the first control signaling, where the interval between the first signal in the first unit of the A2 time units and the first control signaling is greater than or equal to the predetermined threshold X1, where the first signal is in the A time units, A is a natural number greater than 1, A1 and A2 are non-negative integers less than or equal to the value of A, and B2 is a non-negative integer less than or equal to A2.

It is to be noted that the preceding modules may be implemented by software or hardware. Implementation by hardware may, but is not limited to, be performed in the following manner: the preceding modules are located in the same processor or the preceding modules are respectively located in different processors in any combination manner.

Embodiment Five

This embodiment of the present application further provides a storage medium. The storage medium stores a computer program. The computer program is configured to, when executed, perform the steps of any one of the preceding method embodiments.

In an embodiment, in this embodiment, the storage medium may be configured to store a computer program for performing step S1 and step S2 described below.

In step S1, second information is determined according to first information.

The second information includes at least one of the following: the number N of bits used in first control signaling to notify a first transmission parameter, a correspondence mapping table between an index value referenced by the first transmission parameter in the first control signaling and the value of the first transmission parameter, the type of the first transmission parameter notified by a predetermined indication field in the first control signaling, or position information of the bits used in the first control signaling to notify the first transmission parameter; and the first information includes a relationship between a transmission time interval between the first control signaling and a first signal and a predetermined threshold K, where N and K are non-negative integers.

In step S2, the first control signaling is transmitted.

In an embodiment, the storage medium is further configured to store a computer program for performing step S1 described below.

In step S1, second information is determined according to first information, where the second information includes at least one of the following: a QCL parameter of a first signal, a manner of transmitting the first signal at a time-domain position where a second signal is located, or a manner of receiving the first signal at the time-domain position where the second signal is located; and where the first information includes at least one piece of the following information: whether the second signal exists in a predetermined time window after a specified CORESET, a relationship between an interval between the first signal and the specified CORESET and a predetermined threshold X1, a relationship between a time interval between the second signal and the specified CORESET and a predetermined threshold X2, a relationship between a time interval between the first signal and first control signaling and the predetermined threshold X1, a relationship between a time interval between the second signal and second control signaling and the predetermined threshold X2, or a relationship between a first Spatial Rx parameter corresponding to the first signal and a second Spatial Rx parameter corresponding to the second signal, where X1 and X2 are real numbers.

In an embodiment, the storage medium is further configured to store a computer program for performing step S1 and step S2 described below.

In step S1, second information is determined according to first information.

In step S2, first control signaling is received according to the second information, where the second information includes at least one of the following: the number N of bits used in first control signaling to notify a first transmission parameter, a correspondence mapping table between an index value referenced by the first transmission parameter in the first control signaling and the value of the first transmission parameter, the type of the first transmission parameter notified by a predetermined indication field in the first control signaling, or position information of the bits used in the first control signaling to notify the first transmission parameter; and where the first information includes a relationship between a transmission time interval between the first control signaling and a first signal and a predetermined threshold K, where N and K are non-negative integers.

In an embodiment, in this embodiment, the storage medium may include, but is not limited to, a universal serial bus drive, an ROM, an RAM, a mobile hard disk, a magnetic disk, an optical disk or another medium capable of storing a computer program.

The embodiment of the present application further provides an electronic device that includes a memory and a processor. The memory stores a computer program and the processor is configured to execute the computer program to perform the steps of any one of the preceding method embodiments.

In an embodiment, the electronic device may further include a transmission device and an input and output device. The transmission device is connected to the processor. The input and output device is connected to the processor.

In an embodiment, in this embodiment, the preceding processor may be configured to perform steps S1 and S2 described below through a computer program.

In step S1, second information is determined according to first information. The second information includes at least one of the following: the number N of bits used in first control signaling to notify a first transmission parameter, a correspondence mapping table between an index value referenced by the first transmission parameter in the first control signaling and the value of the first transmission parameter, the type of the first transmission parameter notified by a predetermined indication field in the first control signaling, or position information of the bits used in the first control signaling to notify the first transmission parameter; and the first information includes a relationship between a transmission time interval between the first control signaling and a first signal and a predetermined threshold K, where N and K are non-negative integers.

In step S2, the first control signaling is transmitted.

In an embodiment, the preceding processor is further configured to store a computer program for performing step S1 described below.

In step S1, second information is determined according to first information, where the second information includes at least one of the following: a QCL parameter of a first signal, a manner of transmitting the first signal at a time-domain position where a second signal is located, or a manner of receiving the first signal at the time-domain position where the second signal is located; and where the first information includes at least one piece of the following information: whether the second signal exists in a predetermined time window after a specified CORESET, a relationship between an interval between the first signal and the specified CORESET and a predetermined threshold X1, a relationship between a time interval between the second signal and the specified CORESET and a predetermined threshold X2, a relationship between a time interval between the first signal and first control signaling and the predetermined threshold X1, a relationship between a time interval between the second signal and second control signaling and the predetermined threshold X2, or a relationship between a first Spatial Rx parameter corresponding to the first signal and a second Spatial Rx parameter corresponding to the second signal, where X1 and X2 are real numbers.

In an embodiment, the preceding electronic device is further configured to store a computer program for performing step S1 and step S2 described below.

In step S1, second information is determined according to first information.

In step S2, first control signaling is received according to the second information, where the second information includes at least one of the following: the number N of bits used in first control signaling to notify a first transmission parameter, a correspondence mapping table between an index value referenced by the first transmission parameter in the first control signaling and the value of the first transmission parameter, the type of the first transmission parameter notified by a predetermined indication field in the first control signaling, or position information of the bits used in the first control signaling to notify the first transmission parameter; and where the first information includes a relationship between a transmission time interval between the first control signaling and a first signal and a predetermined threshold K, where N and K are non-negative integers.

In an embodiment, specific examples in the present embodiment may refer to the examples described in the preceding embodiments and optional implementations, which is not repeated in this embodiment.

Embodiment Six

Figure 14:
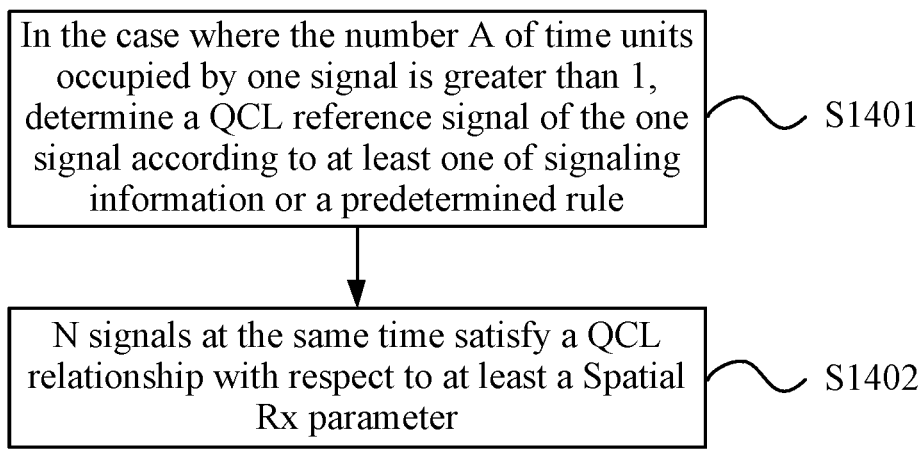
FIG. 14 is a flowchart of a method for determining a QCL reference signal according to an embodiment of the present application.
Figure 15:
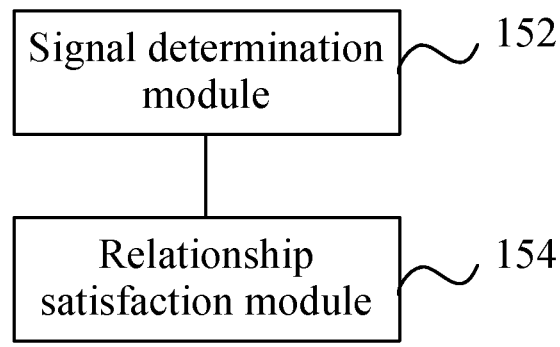
FIG. 15 is a block diagram illustrating the structure of an apparatus for determining a QCL reference signal according to an embodiment of the present application.

The embodiment of the present application further provides a method for determining a QCL reference signal. As shown in FIG. 14, the method includes at least one of step S1401 or step S1402 described below.

In step S1401, in the case where the number of time units occupied by one signal is greater than 1, a QCL reference signal of the one signal is determined according to at least one of signaling information or a predetermined rule.

In step S1402, N signals at the same time satisfy a QCL relationship with respect to Spatial Rx parameters, where N is a positive integer greater than or equal to 2.

The one signal includes any one of the following: a data channel signal, a control channel signal or a reference signal. The step in which the QCL parameter of the one signal is determined includes the following step: a QCL reference signal is acquired and the QCL parameter is acquired according to the QCL reference signal.

In an embodiment, "the N signals at the same time satisfy the QCL relationship with respect to the Spatial Rx parameters" denotes at least one of the following: a communication node does not desire to receive configuration information that the N signals at the same time does not satisfy the QCL relationship with respect to the Spatial Rx parameters; or only in the case where the N signals satisfy the QCL relationship with respect to the Spatial Rx parameters, the N signals can be at the same time, otherwise, the N signals cannot be at the same time.

In an embodiment, the one signal is the signal occupying A time units and scheduled in control signaling. The one signal may be transmitted in the A time units in a repeating manner or in a non-repeating manner.

In an embodiment, the N signals at the same time satisfy the QCL relationship with respect to at least the Spatial Rx parameter, where the N signals include at least one of the following: downlink signals in different CCs; or at least two of the following signals: a data channel signal, a control channel signal, a downlink measurement reference signal, or a demodulation reference signal.

In an embodiment, the step in which in the case where the number A of the time units occupied by the one signal is greater than 1, the QCL reference signal of the one signal is determined according to at least one of the signaling information or the predetermined rule includes at least one of the following: in the case where the one signal is in different time-domain symbols of one time unit, QCL reference signals are kept unchanged; in the case where the one signal is in different time units, it is determined that the QCL parameters are able to be different; a correspondence exists between B1 sets of QCL reference signals of the one signal and A time units; the QCL reference signal of the one signal in each time unit of A time units where the one signal is located is acquired according to the QCL reference signal of a CORESET having a predetermined characteristic in a time unit closest to the each time unit; or in each time unit of the A time units where the one signal is located, the QCL reference signal of the one signal in each time unit is determined according to the relationship between the time interval between the one signal in the each time unit and control signaling scheduling the one signal and a predetermined threshold X1, where B1 is a non-negative integer less than or equal to A, and X1 is a non-negative number or X1 is a non-negative integer indicating the number of time-domain symbols.

In an embodiment, the step in which in the case where the number A of the time units occupied by the one signal is greater than 1, the QCL reference signal of the one signal is determined according to at least one of the signaling information or the predetermined rule includes at least one of the steps described below.

The QCL reference signal of the one signal is determined according to a relationship between a time interval between the one signal in the first unit of A time units and the control signaling scheduling the one signal and the predetermined threshold X1, where the QCL reference signals of the one signal in the A time units are kept unchanged.

The QCL reference signal of the one signal in each time unit of A1 time units where the one signal is located is acquired according to the QCL parameter of a CORESET having a predetermined characteristic in a time unit closest to the each time unit, where the interval between the one signal in the last time unit of the A1 time units and the control signaling scheduling the one signal is less than the predetermined threshold X1.

The QCL reference signals of the one signal in A2 time units where the one signal is located are kept unchanged.

A correspondence exists between B2 sets of QCL reference signals of the one signal and the A2 time units.

The QCL reference signals of the one signal in the A2 time units are determined according to information notified in control signaling scheduling a first signal, where the interval between the one signal in the first unit of the A2 time units and the control signaling is greater than or equal to the predetermined threshold X1.

A1 and A2 are non-negative integers less than or equal to A and B2 is a non-negative integer less than or equal to A2.

In an embodiment, the step in which in the case where the number A of the time units occupied by the one signal is greater than 1, the QCL reference signal of the one signal is determined according to at least one of the signaling information or the predetermined rule includes the following steps: in the case where the time interval between the one signal and the control signaling scheduling the one signal is less than the predetermined threshold X1, the QCL reference signal of the one signal is acquired according to a QCL reference signal of a control channel resource satisfying a predetermined characteristic in a time unit closest to the one signal, where the time interval between the one signal and the control signaling scheduling the one signal includes one of the following: the time interval between the one signal in the first unit of the A time units and the control signaling scheduling the one signal; or the time interval between the one signal in each time unit of the A time units where the one signal is located and the control signaling scheduling the one signal.

In an embodiment, the step in which the QCL reference signal of the one signal is acquired according to the QCL reference signal of the control channel resource satisfying the predetermined characteristic in the time unit closest to the one signal includes one of the steps described below.

The QCL reference signal of the one signal in each time unit of the A1 time unit where the one signal is located is acquired according to the QCL reference signal of the control channel resource having the predetermined characteristic in the time unit closest to the one signal in the each time unit.

The QCL reference signal of the one signal in each time unit of the A1 time units where the one signal is located is acquired according to the QCL reference signal of the control channel resource having the predetermined characteristic in the time unit closest to the one signal in the first unit of the A time units.

The A1 time units are the A time units occupied by the one signal, or the time interval between the one signal in each time unit of the A1 time units and the control signaling scheduling the one signal is less than the predetermined threshold X1.

In an embodiment, the step in which in the case where the number A of the time units occupied by the one signal is greater than 1, the QCL reference signal of the one signal is determined according to at least one of the signaling information or the predetermined rule includes at least one of the steps described below.

A correspondence exists between B2 sets of QCL reference signals of the one signal and A2 time units.

The B2 sets of QCL reference signals of the one signal correspond to the A2 time units in a polling manner.

The control signaling scheduling the one signal includes B3 relationships, a relationship corresponds to a time unit set of the A time units, and a relationship includes a relationship between Z DMRS groups and Z RS sets, where Z is a positive integer greater than or equal to 1.

The B2 sets of QCL reference signals are included in the control signaling scheduling the one signal, or B4 sets of the B2 sets of QCL reference signals are included in the control signaling scheduling the one signal and B5 sets of the B2 sets of QCL reference signals are included in high-layer signaling, where B2 and B3 are non-negative integers less than or equal to A2.

The time interval between the one signal in each time unit of the A2 time units and the control signaling scheduling the one signal is greater than or equal to the predetermined threshold X1, or the A2 time units are the A time units occupied by the one signal.

The TCI is used for notifying the QCL reference signal of the signal and the QCL parameter of the signal is acquired according to the QCL reference signal of the signal.

One set of QCL reference signals includes at least one RS set, and a QCL relationship exists between each RS set and one DMRS group.

Embodiment Seven

The embodiment of the present application further provides an apparatus for determining a QCL reference signal. The apparatus includes at least one of a signal determination module 152 or a relationship satisfaction module 154.

The signal determination module 152 is configured to, in the case where the number A of time units occupied by one signal is greater than 1, determine a QCL reference signal of the one signal according to at least one of signaling information or a predetermined rule.

The relationship satisfaction module 154 is configured to enable N signals at the same time to satisfy a QCL relationship with respect to Spatial Rx parameters, where N is a positive integer greater than or equal to 2.

In an embodiment, the relationship satisfaction module 154 is further configured to enable the N signals include downlink signals in different CCs; at least two of the following signals: a data channel signal, a control channel signal, a downlink measurement reference signal, or a demodulation reference signal.

In an embodiment, the signal determination module 152 is further configured to perform at least one of the following operations: in the case where the one signal is in different time-domain symbols of one time unit. keep QCL reference signals unchanged; in the case where the one signal is in different time units, determine that QCL reference signals are able to be different; exist a correspondence between B1 sets of QCL reference signals of the one signal and A time units; acquire the QCL reference signal of the one signal in each time unit of the A time units where the one signal is located according to the QCL reference signal of a CORE-SET having a predetermined characteristic in a time unit closest to the each time unit; or in each time unit of the A time units where the one signal is located, determine the QCL reference signal of the one signal in each time unit according to the relationship between the time interval between the one signal in the each time unit and the control signaling scheduling the one signal and the predetermined threshold X1, where B1 is a non-negative integer less than or equal to A, and X1 is a non-negative number or X1 is a non-negative integer indicating the number of time-domain symbols.

In an embodiment, the signal determination module 152 is further configured to perform at least one of the operations described below.

The QCL reference signal of the one signal is determined according to the relationship between the time interval between the one signal in the first unit of A time units and the control signaling scheduling the one signal and the predetermined threshold X1, where QCL reference signals of the one signal in the A time units keep unchanged.

The QCL reference signal of the one signal in each time unit of A1 time units where the one signal is located is acquired according to the QCL reference signal of a CORE-SET having a predetermined characteristic in a time unit closest to the each time unit, where the interval between the one signal in the last time unit of the A1 time units and the control signaling scheduling the one signal is less than the predetermined threshold X1.

QCL reference signals of the one signal in A2 time units where the one signal is located keep unchanged.

A correspondence exists between B2 sets of QCL reference signals of the one signal and the A2 time units.

The QCL reference signals of the one signal in the A2 time units are determined according to information notified in the control signaling scheduling a first signal, where the interval between the one signal in the first unit of the A2 time units and the control signaling is greater than or equal to the predetermined threshold X1.

A1 and A2 are non-negative integers less than or equal to A and B2 is a non-negative integer less than or equal to A2.

In an embodiment, the signal determination module 152 is further configured to perform the following operation: in the case where the time interval between the one signal and the control signaling scheduling the one signal is less than the predetermined threshold X1, the QCL reference signal of the one signal is acquired according to the QCL reference signal of a control channel resource satisfying a predetermined characteristic in the time unit closest to the one signal, where the time interval between the one signal and the control signaling scheduling the one signal includes one of the following: the time interval between the one signal in the first unit of the A time units and the control signaling scheduling the one signal; or the time interval between the one signal in each time unit of the A time units where the one signal is located and the control signaling scheduling the one signal.

In an embodiment, the step in which the QCL reference signal of the one signal is acquired according to the QCL reference signal of the control channel resource satisfying the predetermined characteristic in the time unit closest to the one signal includes one of the steps described below.

The QCL reference signal of the one signal in each time unit of the A1 time units where the one signal is located is acquired according to the QCL reference signal of the control channel resource having the predetermined characteristic in the time unit closest to the one signal in the each time unit.

The QCL reference signal of the one signal in each time unit of the A1 time units where the one signal is located is acquired according to the QCL reference signal of the control channel resource having the predetermined characteristic in the time unit closest to the one signal in the first unit of the A time units.

The A1 time units are the A time units occupied by the one signal, or the time interval between the one signal in each time unit of the A1 time units and the control signaling scheduling the one signal is less than the predetermined threshold X1.

In an embodiment, the signal determination module 152 is configured to perform at least one of the operations described below.

A correspondence exists between B2 sets of QCL reference signals of the one signal and A2 time units.

The B2 sets of QCL reference signals of the one signal correspond to the A2 time units in a polling manner.

The control signaling scheduling the one signal includes B3 relationships, a relationship corresponds to a time unit set of the A time units, and a relationship includes a relationship between Z DMRS groups and Z RS sets, where Z is a positive integer greater than or equal to 1.

The B2 sets of QCL reference signals are included in the control signaling scheduling the one signal, or B4 sets of the B2 sets of QCL reference signals are included in the control signaling scheduling the one signal and B5 sets of the B2 sets of QCL reference signals are included in high-layer signaling.

B2 and B3 are non-negative integers less than or equal to A2.

The time interval between the one signal in each time unit of the A2 time units and the control signaling scheduling the one signal is greater than or equal to the predetermined threshold X1, or the A2 time units are the A time units occupied by the one signal.

The embodiment of the present application further provides a storage medium. The storage medium stores a computer program. The computer program is configured to, when executed, perform the steps of any one of the preceding method embodiments.

The embodiment of the present application provides an electronic device that includes a memory and a processor. The memory stores a computer program and the processor is configured to execute the computer program to perform the steps of any one of the preceding method embodiments.

Apparently, it is to be understood by those skilled in the art that the modules or steps in the preceding present application may be implemented by a general-purpose computing device and may be concentrated on a single computing device or distributed in a network formed by multiple computing devices. In an embodiment, these modules or steps may be implemented by program codes executable by the computing device. Thus, these modules or steps may be stored in a storage device and executed by the computing device. Moreover, in some cases, the illustrated or described steps may be executed in a sequence different from the sequence described herein. Alternatively, these modules or steps may be implemented by being made into integrated circuit modules separately or multiple ones of these modules or steps may be implemented by being made into a single integrated circuit module. In this way, the present application is not limited to any specific combination of hardware and software.

We claim:

1. A method for receiving control signaling and for determining information, comprising:
   receiving a first signal and a first physical dynamical control signaling scheduling the first signal, wherein the first signal includes a first aperiodic downlink measurement reference signal, a first time interval between the first signal and the first physical dynamical control signaling being less than a predetermined threshold X1;
   receiving a second signal and a second physical dynamical control signaling scheduling the second signal, wherein the second signal includes a second aperiodic downlink measurement reference signal, a second time interval between the second signal and the second physical dynamical control signaling being greater than or equal to a predetermined threshold X2, and
   wherein the first signal and the second signal are received at a same time-domain symbol; and
   determining a quasi co-location (QCL) parameter of the first signal based on a QCL parameter of the second signal.

2. The method of claim 1, wherein the QCL parameter of the first signal is not acquired according to a QCL parameter of a specified control resource set (CORESET).

3. The method of claim 1, wherein a transmission configuration indication (TCI) state pool associated with the first signal contains at least one TCI state and wherein a QCL parameter corresponding to a reference signal, RS, set in the at least one TCI state comprises a spatial receiver parameter.

4. The method of claim 1, wherein the second signal is a downlink data channel signal, a transmission configuration indication (TCI) state pool associated the second signal contains at least one TCI state, wherein a spatial receiver parameter is not configured in the at least one TCI state.

5. The method of claim 1, wherein the second signal further comprises at least one of following signals: a downlink synchronization signal, a periodic downlink demodulation reference signal, or a downlink control channel signal.

6. The method of claim 1, wherein the first signal and the second signal are not received at a same time-domain symbol, and the QCL parameter of the first signal is acquired according to a QCL parameter of a specified CORESET.

7. A method for transmitting control signaling, comprising:
   transmitting a first signal and a first physical dynamical control signaling scheduling the first signal, wherein the first signal includes a first aperiodic downlink measurement reference signal, a first time interval between the first signal and the first physical dynamical control signaling being less than a predetermined threshold X1; and
   transmitting a second signal and a second physical dynamical control signaling scheduling the second signal,
   wherein the second signal includes a second aperiodic downlink measurement reference signal, a second time interval between the second signal and the second physical dynamical control signaling being greater than or equal to a predetermined threshold X2, and
   wherein the first signal and the second signal are transmitted at a same time-domain symbol, a QCL parameter of the first signal being based on a QCL parameter of the second signal.

8. The method of claim 7, wherein the QCL parameter of the first signal is not determined according to a QCL parameter of a specified CORESET.

9. The method of claim 7, wherein a TCI state pool associated with the first signal contains at least one TCI state and wherein a QCL parameter corresponding to a reference signal, RS, set in the at least one TCI state comprises a spatial receiver parameter.

10. The method of claim 7, wherein the second signal is a downlink data channel signal, a TCI state pool associated the second signal contains at least one TCI state, wherein a spatial receiver parameter is not configured in the at least one TCI state.

11. The method of claim 7, wherein the first signal and the second signal are not transmitted at a same time-domain symbol, and the QCL parameter of the first signal is determined according to a QCL parameter of a specified CORESET.

12. An apparatus for receiving control signaling and for determining information, the apparatus comprising a processor, the processor being configured to:

receive a first signal and a first physical dynamical control signaling scheduling the first signal, wherein the first signal includes a first aperiodic downlink measurement reference signal, a first time interval between the first signal and the first physical dynamical control signaling being less than a predetermined threshold X1;

receive a second signal and a second physical dynamical control signaling scheduling the second signal, wherein the second signal includes a second aperiodic downlink measurement reference signal, a second time interval between the second signal and the second physical dynamical control signaling being greater than or equal to a predetermined threshold X2, and wherein the first signal and the second signal are received at a same time-domain symbol; and determining a quasi co-location (QCL) parameter of the first signal based on a QCL parameter of the second signal.

13. The apparatus of claim 12, wherein the QCL parameter of the first signal is not acquired according to a QCL parameter of a specified control resource set (CORESET).

14. The apparatus of claim 12, wherein a transmission configuration indication (TCI) state pool associated with the first signal contains at least one TCI state and wherein a QCL parameter corresponding to a reference signal, RS, set in the at least one TCI state comprises a spatial receiver parameter.

15. The apparatus of claim 12, wherein the second signal is a downlink data channel signal, a transmission configuration indication (TCI) state pool associated the second signal contains at least one TCI state, wherein a spatial receiver parameter is not configured in the at least one TCI state.

16. The apparatus of claim 12, wherein the second signal further comprises at least one of following signals: a downlink synchronization signal, a periodic downlink demodulation reference signal, or a downlink control channel signal.

17. The apparatus of claim 12, wherein the first signal and the second signal are not received at a same time-domain symbol, and the QCL parameter of the first signal is acquired according to a QCL parameter of a specified CORESET.

* * * * *